US012780550B2

(12) United States Patent
Aggarwal et al.

(10) Patent No.: US 12,780,550 B2
(45) Date of Patent: Nov. 3, 2026

(54) WAREHOUSING SYSTEM FOR STORING AND RETRIEVING GOODS IN CONTAINERS

(71) Applicant: Symbotic LLC, Wilmington, MA (US)

(72) Inventors: Ashish Aggarwal, Wilmington, MA (US); Rick Youping Huang, Westford, MA (US); Andrew Goodwin, Wilmington, MA (US); Aaron Vande Ven, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 591 days.

(21) Appl. No.: 18/323,758

(22) Filed: May 25, 2023

(65) Prior Publication Data

US 2023/0382644 A1 Nov. 30, 2023

Related U.S. Application Data

(60) Provisional application No. 63/365,368, filed on May 26, 2022.

(51) Int. Cl.
*B65G 1/137* (2006.01)
*B65G 1/04* (2006.01)
(Continued)

(52) U.S. Cl.
CPC ......... *B65G 1/1375* (2013.01); *B65G 1/0492* (2013.01); *B65G 1/065* (2013.01); (Continued)

(58) Field of Classification Search
CPC .... B65G 1/1375; B65G 1/065; B65G 1/1378; B65G 1/0492; G06Q 10/087
See application file for complete search history.

(56) References Cited

U.S. PATENT DOCUMENTS 9,725,242 B2 8/2017 Issing et al.
10,274,953 B1 * 4/2019 Agarwal .............. G05D 1/0027
(Continued)

FOREIGN PATENT DOCUMENTS

CN 112396369 A * 2/2021 ......... G06Q 10/0631

OTHER PUBLICATIONS

CN-112396369-A (Year: 2021).*
International Search Report for application No. PCT/US2023/067535 dated Nov. 9, 2023.

*Primary Examiner* — Ernesto A Suarez
*Assistant Examiner* — Laurence R Brothers
(74) *Attorney, Agent, or Firm* — Perman & Green, LLP

(57) ABSTRACT

A product order fulfillment system of mixed product units, the product order fulfillment system comprising a storage array, with at least one elevated storage level, wherein mixed product units are input and distributed in the storage array in cases, of product units of common kind per case, an automated transport system, with at least one asynchronous transport system, for level transport, and a lift for between level transport, communicably connected to the storage array so as to automatically retrieve and output, from the storage array, product units distributed in the cases in the at least one elevated storage level of the storage array, the output product units being one or more of mixed singulated product units, in mixed packed groups, and in mixed cases, wherein the at least one asynchronous transport system, and the lift are configured so as to form more than one transport channel.

24 Claims, 30 Drawing Sheets

(51) Int. Cl.

| | |
|---|---|
| ***B65G 1/06*** | (2006.01) |
| ***G06Q 10/08*** | (2024.01) |
| ***G06Q 10/087*** | (2023.01) |
| ***G06Q 10/0875*** | (2023.01) |

(52) U.S. Cl.
CPC ........... *B65G 1/1378* (2013.01); *G06Q 10/08* (2013.01); *G06Q 10/087* (2013.01); *G06Q 10/08743* (2025.08); *G06Q 10/0875* (2013.01)

(56) References Cited

U.S. PATENT DOCUMENTS

| | | | | |
|---|---|---|---|---|
| 2010/0274610 | A1* | 10/2010 | Andersen ............. | G06Q 10/087 705/28 |
| 2012/0186192 | A1 | 7/2012 | Toebes et al. | |
| 2014/0199150 | A1* | 7/2014 | Razumov ............. | B65G 1/1378 414/800 |
| 2014/0214436 | A1* | 7/2014 | Utech .................. | G06Q 10/087 705/2 |
| 2016/0101940 | A1* | 4/2016 | Grinnell ............... | G05D 1/0289 700/218 |
| 2017/0200117 | A1* | 7/2017 | High ..................... | G06F 3/1423 |
| 2018/0082162 | A1 | 3/2018 | Durham et al. | |
| 2020/0302391 | A1 | 9/2020 | Li et al. | |
| 2021/0147146 | A1* | 5/2021 | Conrad ................ | B65G 1/0492 |
| 2022/0002081 | A1 | 1/2022 | Medford et al. | |

* cited by examiner

| SKU | WHPK/VNPK | DEPT | CAT |
|---|---|---|---|
| 201071 | 4 | 2 | 4121 |
| 201778 | 4 | 46 | 0 |
| 202114 | 4 | 2 | 3907 |
| 202823 | 4 | 2 | 4113 |
| 206435 | 8 | 2 | 4121 |
| 207185 | 2 | 2 | 0 |
| 207199 | 2 | 2 | 0 |
| 208614 | 6 | 2 | 829 |
| 209908 | 2 | 2 | 0 |
| 210139 | 2 | 2 | 0 |
| 210553 | 3 | 2 | 504 |
| 210641 | 4 | 2 | 886 |
| 210972 | 3 | 2 | 504 |
| 210979 | 3 | 2 | 504 |
| 210986 | 3 | 2 | 504 |
| 211646 | 2 | 2 | 0 |
| 212834 | 2 | 2 | 504 |
| 212841 | 2 | 2 | 504 |
| 212848 | 2 | 2 | 504 |

FIG.6

WAREHOUSING SYSTEM FOR STORING AND RETRIEVING GOODS IN CONTAINERS

CROSS-REFERENCE TO RELATED APPLICATIONS

This application is a non-provisional of and claims the benefit of U.S. provisional patent application No. 63/365,368 filed on May 26, 2022, the disclosure of which is incorporated herein by reference in its entirety.

BACKGROUND

1. Field

The disclosed embodiment generally relates to material handling systems, and more particularly, to transport and storage of items within the material handling system.

2. Brief Description of Related Developments

It is well recognized that integration of automated storage and retrieval systems into a logistic chain, particularly goods to man systems, are highly advantageous throughout efficiency and cost of the logistics chain. Conventional systems, even with a high level of automated storage and retrieval system integration in a logistic facility operate generally by storing product (e.g., supply) containers, where the supply containers include cases, packs, etc. that contain a common type of goods (also referred to as products) in the supply containers. The product containers may arrive on pallets (e.g., of common supply containers) or as truck loads, and are either depalletized or unloaded from trucks, and stored in the logistics facility, distributed throughout the storage volume (e.g., in a three-dimensional array of storage racks) of the logistic facility by the automated storage and retrieval system.

With advancement of e-commerce and just-in-time inventory systems, logistics facility customers may purchase small quantities of particular items rather than purchasing full cases of those particular items resulting in mixed product containers. Generally, order fulfillment from the logistic facility, particularly in the event that mixed product containers are desired (e.g., wherein any given order container may have mixed/different products or product types held by a common container such as in cases of direct to consumer fulfillment, or if indirect to consumer, such as via a retail order pick up location, the ordered mix of products in the order container is generated, at least in part, at the logistic facility prior to output from the logistic facility) conventionally, generation of mixed product containers is effected with the automated storage and retrieval system goods to person configuration by the automated storage and retrieval system outputting the product/supply containers (each containing one or more goods items of a common good type, i.e. each goods item in the product container is the same or substantially similar) from storage locations throughout the three-dimensional array of storage racks to workstations, manual or automated, to pick and remove goods from the different product/supply containers, fed by the automated storage and retrieval system to the given workstation, pursuant to a given fulfillment (or fill) order, and to place the different picked goods (mixed or common if a given order contained is so filled) into order containers. Such workstations may be referred to as breakpack stations, wherein the product container is "broken" down and its contents may be placed in order containers in whole or in part, or into what may be referred to as a breakpack storage container (e.g., totes) such as where the product container is unsuitable for continued holding of remaining product items after the breakpack operation, and such remaining products (i.e., the remainder of products in the "broken" down product container) should be returned to storage in the three-dimensional array of storage racks by the automated storage and retrieval system. In order to increase efficiency, order containers may also be entered into the three-dimensional array of storage racks, and potentially to storage locations on the storage racks storing product containers, until such time as order output is desired, both entry and output from the three-dimensional array of storage racks is otherwise effected by the automated storage and retrieval system. An improved system for processing of the broken down product into at least mixed product cases is desired.

BRIEF DESCRIPTION OF THE DRAWINGS

The foregoing aspects and other features of the disclosed embodiment are explained in the following description, taken in connection with the accompanying drawings, wherein:

FIG. 6 is an exemplary illustration of product assignment to merchant category and merchant department in accordance with the aspects of the disclosed embodiment;

DETAILED DESCRIPTION

Figure 1A:
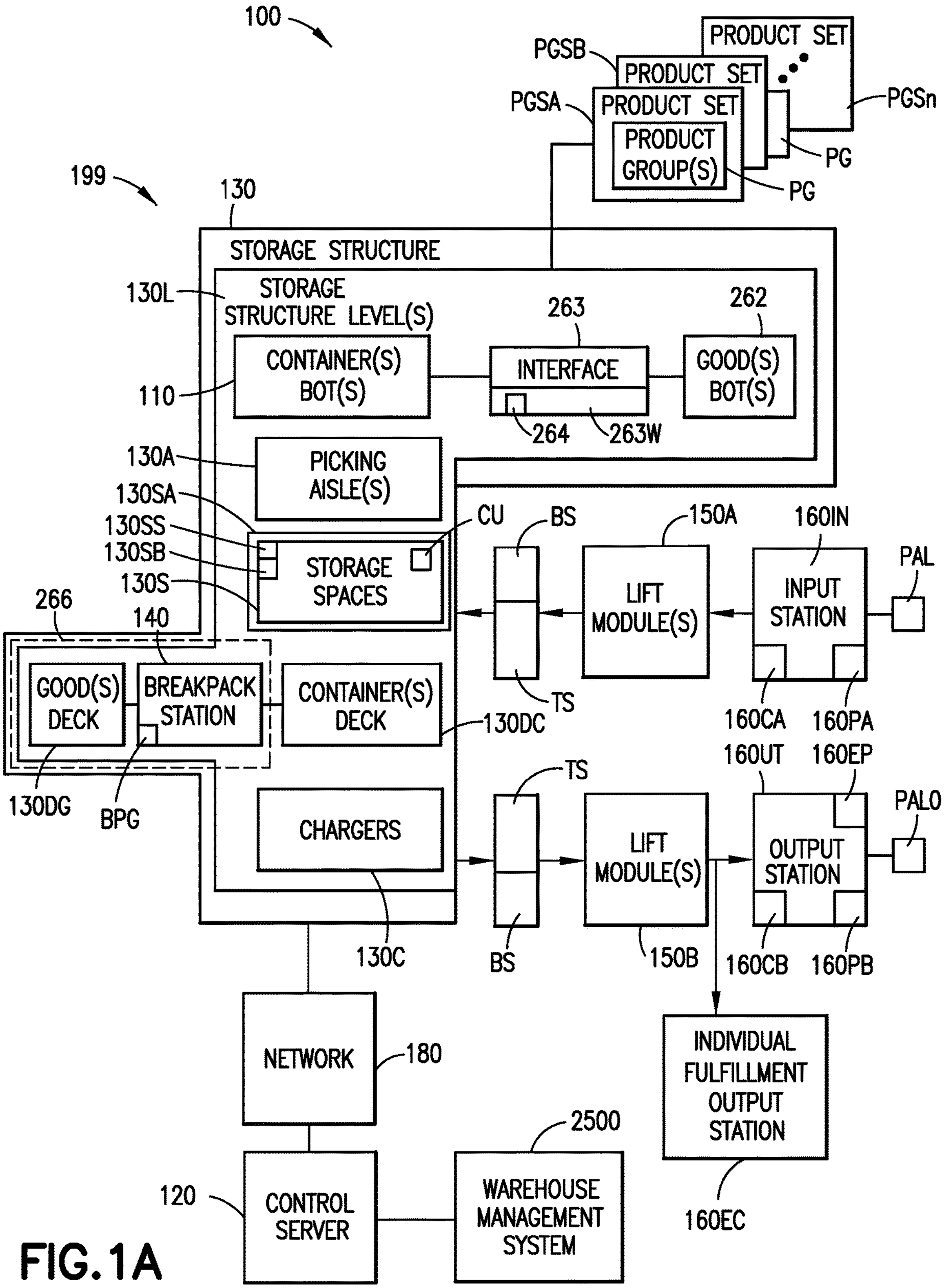
FIG. 1A is a schematic illustration of an automated storage and retrieval system in accordance with aspects of the disclosed embodiment.

FIG. 1A is a schematic illustration of an automated storage and retrieval system (also referred to herein as a warehousing system or product order fulfillment system) 100 in accordance with aspects of the disclosed embodiment. The automated storage and retrieval system may be disposed in a warehouse 199 or in any other suitable location. Although the aspects of the disclosed embodiment will be described with reference to the drawings, it should be understood that the aspects of the disclosed embodiment can be embodied in many forms. In addition, any suitable size, shape or type of elements or materials could be used.

Figure 2:
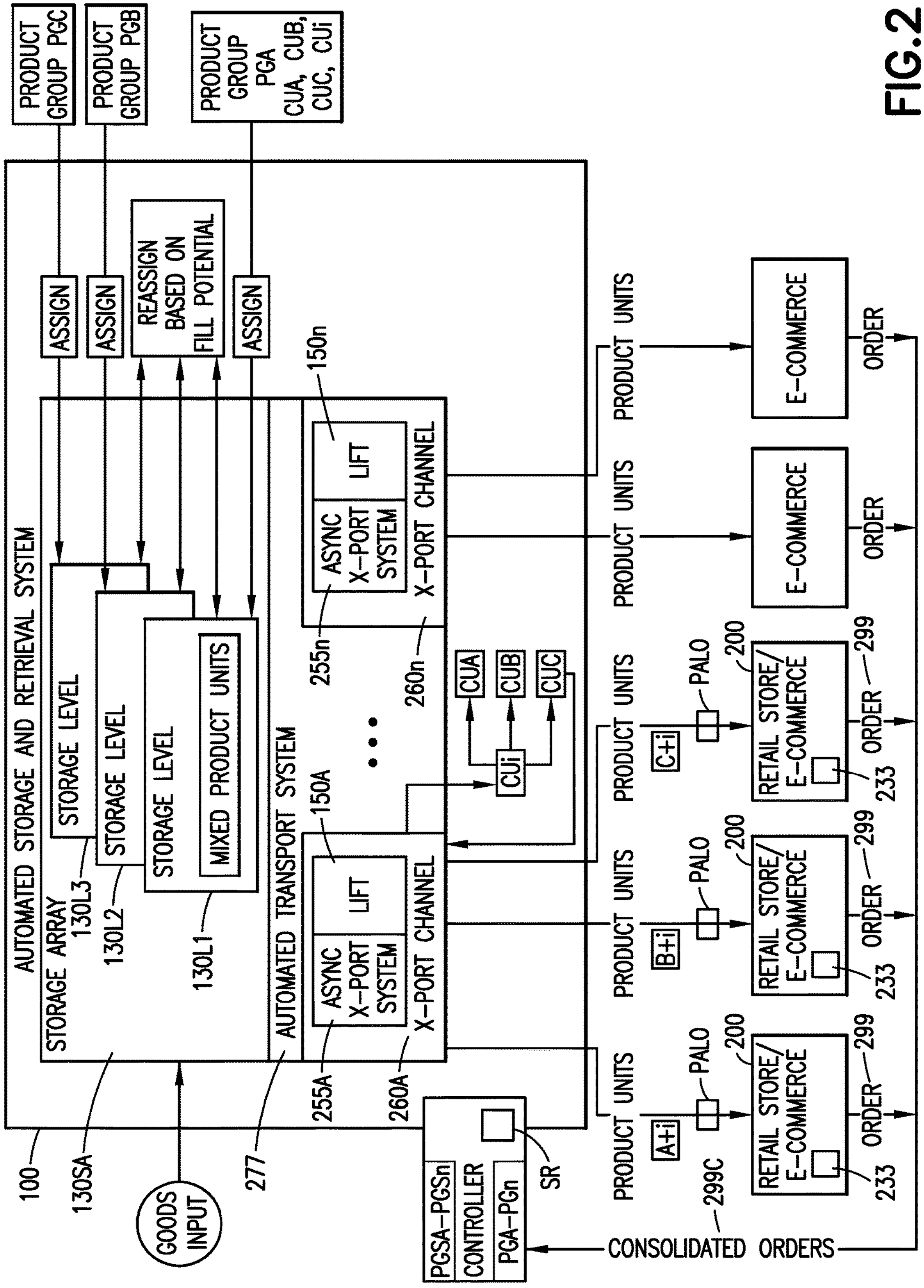
FIG. 2 is a schematic illustration of a portion of the automated storage and retrieval system of FIG. 1A in accordance with aspects of the disclosed embodiment.

As described herein, the aspects of the disclosed embodiment provide a breakpack system with containerization and sequencing that is optimized for end user (e.g., customer/consumer) requests or order fulfillment. The aspects of the disclosed embodiment effect grouping of product units BPG (also referred to as vendor packs, eaches or breakpack goods, each of which have a respective three-dimensional shape) in bounded regions (such as any suitable transport container) based on one or more of product group characteristics and predetermined rules associated with a customer order 299 (see FIG. 2). As an example, controller 120 of the storage and retrieval system 100 is programmed with store/customer rules SR (e.g., merchandise characteristics framework—see FIG. 2) defining product (merchandise) groups PGA-PGn and a complementing of, an affinity of, and/or a mergeability of product groups PGA-PGn to each other.

In accordance with the aspects of the disclosed embodiment, warehouse packs or case units CU holding product units BPG are input into the automated storage and retrieval system 100 (e.g., as described herein) and are grouped into product groups PGA, PGB, PGC (see FIG. 2 where three product groups are illustrated for exemplary purposes only—noting there may be any number of product groups), each product group having a unique predetermined product group characteristic that provides for (e.g., biases) merging of product units BPG (e.g., for containerization) of one product group PGA, PGB, PGC with product units BPG of the same product group PGA, PGB, PGC or product units BPG of a different product group PGA, PGB, PGC. These product groups PGA, PGB, PGC are assigned to and distributed on respective storage or pick levels 130L (also referred to herein as elevated storage levels or elevated storage and transport levels) of the storage structure 130, based at least on the mergeability of the product units BPG, to effect orthogonal processing of the product groups PGA, PGB, PGC on the respective storage levels 130L (where "orthogonal" as used herein means uncorrelated or lacking a mutual relationship or connection, independent). Here, the mergeability of the product units BPG in the product groups PGA, PGB, PGC decouples or normalizes merchandise categories (e.g., personal hygiene, housewares, cleaners, clothing, small appliances, groceries, etc.) from a customer order 299 (see FIG. 2) to effect the orthogonal processing of the product groups PGA, PGB, PGC. It is noted that each of the at least one elevated storage and transport level 130L, is (or may be) separate and distinct from each other elevated storage and transport level 130L, where each elevated storage and transport level 130L effects orthogonal transport output, relative to each other elevated storage and transport level 130L, of the product units distributed in the storage array 130SA. As will be described herein, product groups PGA, PGB, PGC may be dynamically reassigned between product levels (e.g., based on mergeability (as described herein) of the different product groups). For example, where there are excess or a plentiful number product on one transport level (such as transport level 130L1 for example), some of the warehouse packs CUA, CUB, CUC, Cui holding that product may be dynamically reassigned to another transport level 130 (such as one or more of transport levels 130L2, 130L3 for example) where the product group PGA is (or at least one of the warehouse packs CU thereof is) mergeable with one or more of product groups PGB, PGC of the other storage levels 130L2, 130L3. Reassignment of the product groups between transport levels may maintain a substantially equal division of work (e.g., transport transaction rate) between transport levels.

The product units BPG of the warehouse packs CU from the product groups PGA, PGB, PGC are virtually containerized by a controller 120 of the automated storage and retrieval system 100 to effect a fill plan for a given shipping container (referred to herein as a container). The product units BPG are batched with each other in the container based on, for example, an application of the mergeability of the product units BPG with each other. With the fill plan established, the product units BPG from the product groups PGA, PGB, PGC are picked from the respective storage level(s) 130L of a storage array 130SA (e.g., of the storage structure 130) and transported to a breakpack station 140 to effect filling of one or more given containers. The product units BPG are sequenced in any suitable manner (such as during transport of the products units from the storage level 130L to the breakpack station 140 and/or from the breakpack station 140 to the container) for filling the container.

The grouping of the warehouse packs CU based at least on mergeability of the product units BPG held therein may appear to increase the number of autonomous transport vehicle 110 trips from a storage space 130S in the storage array 130SA to, e.g., the breakpack station 140 for filling a container (e.g., the aspects of the disclosed embodiment increase the number of merchandise categories on each level where each vehicle 110 transports one case unit CU, corresponding to a respective merchandise category, per trip); however, counterintuitively, arranging the warehouse packs CU on the storage levels 130L based on mergeability of the product units BPG optimizes the case unit transfer (e.g., reduces the number of trips) as the product units BPG of one warehouse pack CU may be utilized for filling more than one container for any given transport of that warehouse pack CU. It is noted that mergeability of the product units BPG is a measure of and effects batching of the product units BPG in any given container.

Orthogonally processing the warehouse packs CU of a product group PGA, PGB, PGC, in which the warehouse packs CU are grouped, at least based on mergeability of the product units BPG held therein, effects matching mergeable product units BPG with each other, where for a given warehouse pack transport the existence of suitable product units for batching is known. For example, also referring to FIG. 2, a product group PGA may include warehouse packs (or case units) CUA, CUB, CUC, CUi including respective product units A, B, C, and i. Customer orders may be placed for product units A+i, B+i, and C+i. Here, vehicles 110 on storage level(s) 130L corresponding to product group PGA respectively transport warehouse packs CUA, CUB, CUC, CUi holding product units A, B, C, i to the breakpack station 140. Knowing that product units A, B, C, i are mergeable with each other based on the product group PGA to which the warehouse packs are assigned, product unit i can be batched with each of product units A, B, C, where the three customer orders are fulfilled with only a single transport trip of warehouse pack CUi from the storage array 130SA to the breakpack station 140. In effect, the known mergeability of the product units BPG in a given product group increases the probability (or "hit rate") that any given warehouse pack CU of that given product group will be employed, for any given single transport trip, in more than one containerization fill.

Still referring to FIG. 1, in accordance with aspects of the disclosed embodiment the automated storage and retrieval system 100 may operate in a retail distribution center or warehouse to, for example, fulfill orders received from different customers (such as those described herein) for breakpack goods BPG and/or warehouse packs (also referred to herein as case units) CU. Suitable examples of automated storage and retrieval systems that incorporate or are capable of incorporating breakpack goods systems are described in, for example, U.S. Pat. No. 10,822,168 issued on Nov. 3, 2020; U.S. provisional patent application Ser. No. 17/657,705 filed on Apr. 1, 2022 and titled "Warehousing System for Storing and Retrieving Goods in Containers"; and U.S. provisional patent application Ser. No. 17/358,383 filed on Jun. 25, 2021 and titled "Warehousing System for Storing and Retrieving Goods in Containers", the disclosures of which are incorporated by reference herein in their entireties.

As an example, the warehouse packs CU are cases or units of goods not stored in trays, on totes or on pallets (e.g. uncontained). In other examples, the warehouse packs CU are cases or units of goods that are contained in any suitable manner such as in trays, on totes, in containers (such as containers of remainder goods after breakpack where the broken down warehouse pack structure is unsuitable for transport of the remainder goods as a unit) or on pallets. In still other examples, the warehouse goods CU are a combination of uncontained and contained items. It is noted that the warehouse packs CU, for example, include cased units of goods (e.g. case of soup cans, boxes of cereal, etc.) or individual goods that are adapted to be taken off of or placed on a pallet. In accordance with the aspects of the disclosed embodiment, shipping cases for warehouse packs CU (e.g. cartons, barrels, boxes, crates, jugs, or any other suitable device for holding case units) may have variable sizes and may be used to hold case units in shipping and may be configured so they are capable of being palletized for shipping.

It is noted that when, for example, bundles or pallets of warehouse packs CU (e.g., mixed product units) arrive at the storage and retrieval system 100 (see the "goods input" in FIG. 2) the content of each pallet may be uniform (e.g. each pallet holds a predetermined number of the same item—one pallet holds soup and another pallet holds cereal) and as pallets leave the storage and retrieval system the pallets may contain any suitable number and combination of different warehouse packs CU or containerized product units BPG (e.g. a mixed pallet where each mixed pallet holds different types of warehouse packs and/or containerized product units BPG—a pallet holds a combination of soup and cereal) that are provided to, for example the palletizer in a sorted arrangement (e.g., effected by at least a pallet output sort 185 echelon of the automated storage and retrieval system 100 where at least one or more of the container bots 110 and lift modules 150B transport the case units for sortation) for forming the mixed pallet. In the aspects of the disclosed embodiment the storage and retrieval system 100 described herein may be applied to any environment in which warehouse packs CU are stored and retrieved.

Figure 1B:
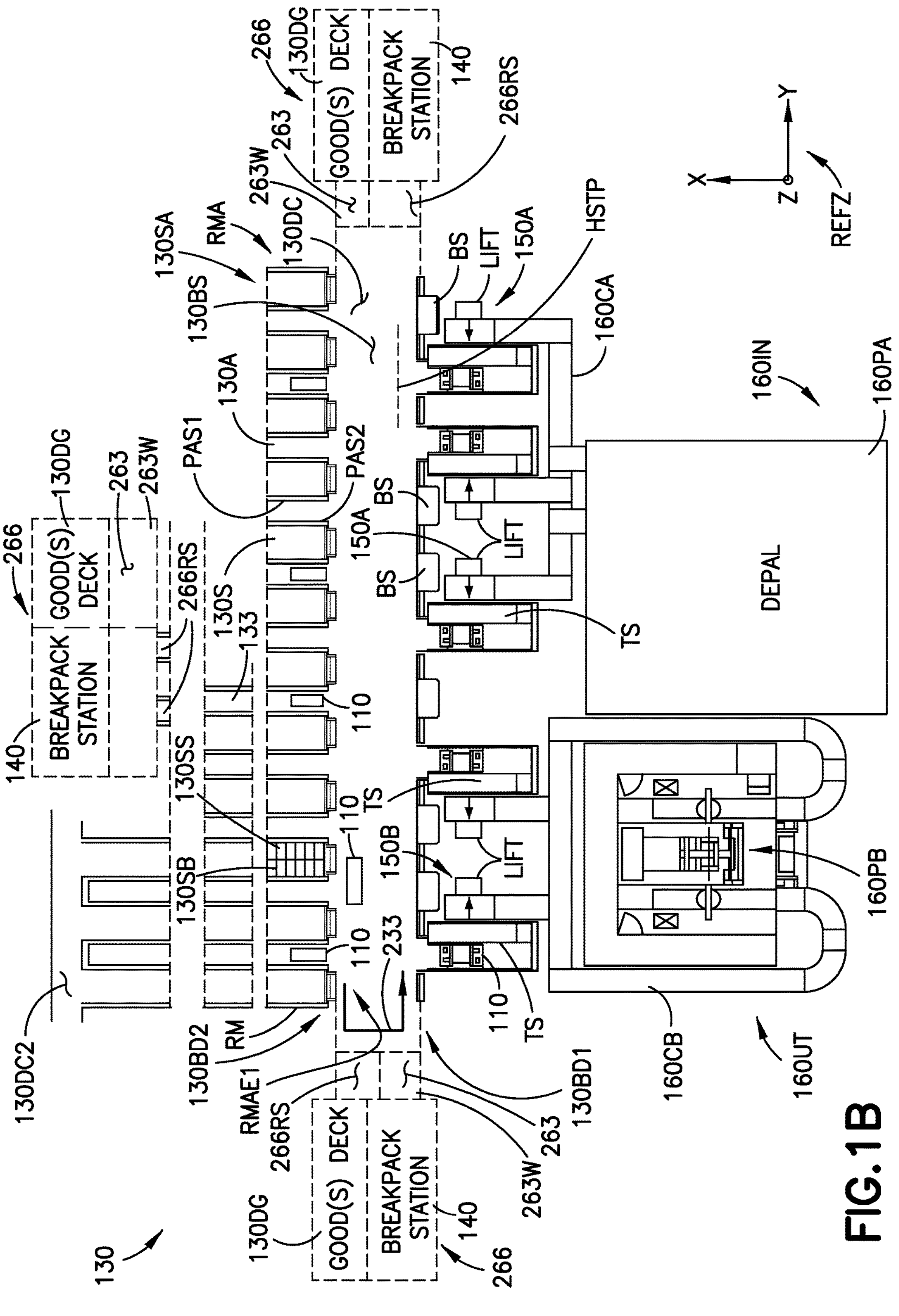
FIG. 1B is a schematic illustration of a portion of the automated storage and retrieval system of FIG. 1A in accordance with aspects of the disclosed embodiment.

Referring to FIGS. 1A and 1B, in accordance with the aspects of the disclosed embodiment, the automated storage and retrieval system 100 includes one or more breakpack modules 266 (see FIG. 1B) configured to break down product containers or warehouse packs CU (which may generally be referred to as supply goods containers or supply containers 265) into breakpack goods containers 264 (which are used for shipping the breakpack goods, e.g., shipping containers) for order fulfillment in a manner similar to that described in U.S. provisional patent application Ser. No. 17/657,705 filed on Apr. 1, 2022 and titled "Warehousing System for Storing and Retrieving Goods in Containers" and U.S. provisional patent application Ser. No. 17/358,383 filed on Jun. 25, 2021 and titled "Warehousing System for Storing and Retrieving Goods in Containers", the disclosures of which were previously incorporated by reference herein in their entireties. One or more breakpack modules 266 may be communicably coupled to one or more stacked (storage) levels 130L of the automated storage and retrieval system 100, where the one or more levels 130L of the automated storage and retrieval system 100 include at least one breakpack module 266. The breakpack module(s) 266 may be plug and play modules that may be coupled to any suitable portion of the structure of the automated storage and retrieval system 100. For example, the breakpack module(s) may be coupled to a container transfer deck 130DC (see also container transfer deck 130DC2 in FIG. 1B) or picking (or pick) aisle(s) 130A of the automated storage and retrieval system 100. The breakpack module(s) 266 may be disposed on any suitable number of stacked storage levels of the automated storage and retrieval system 100.

Any suitable controller 120 is configured to effect the operations of the automated storage and retrieval system 100 described herein. For example, the controller 120 is configured to effect operations of at least one container bot or autonomous guided autonomous vehicle 110 and at least one goods bot or autonomous guided breakpack goods transport vehicle 262, as well as any lifts 310A, 310B, and other components of the automated storage and retrieval system 100 described herein, for assembling orders of breakpack goods or product units BPG from supply containers or case units (also referred to herein as warehouse packs) CU into breakpack goods containers 264 (see FIG. 1A) and outfeed of breakpack goods containers 264 through container outfeed stations TS to an output station 16OUT. For example, the controller 120 is configured to effect operation of the container bot(s) 110 between the container storage locations 130S, the breakpack operation station 140, and a breakpack goods container 264 located at a putwall 263W along a breakpack goods transfer deck or goods deck 130DG (e.g., a breakpack goods container 264 located at a breakpack goods interface station/container station 263L of a putwall 263W). As another example, the controller 120 is configured to effect operation of the goods bot(s) 262 so that transport of the breakpack goods BPG, by the goods bot 262 traverse on the goods transfer deck 130DG, sorts (e.g., in a breakpack order sort 188 echelon of the automated storage and retrieval system 100, as described herein) the breakpack goods BPG to corresponding breakpack goods containers 264. As a further example, the controller 120 is configured to effect operation of the container bot(s) 110 so that the container bot(s) 110 accesses, from the putwall 263W, corresponding breakpack goods containers 264 at the goods transfer deck 130DG and transports the breakpack goods containers 264 via traverse along the container transfer deck 130DC to at least one of a container output/transfer station TS and a corresponding container storage location 130SB of storage shelves of a corresponding level 130L of the multilevel storage array e.g., to effect at least in part a breakpack output sort 189 echelon as described herein).

The controller 120 is also configured to effect operation of the container bot(s) 110 and lifts 150 (e.g., to form a container supply system) so as to introduce empty breakpack goods containers 264 into the automated storage and retrieval system so that the container bot(s) 110 transport the empty breakpack goods containers 264, along the transport/travel loops 233BP of the container transfer deck(s) 130DC and into a breakpack module for placement at a breakpack goods interface location(s) 263L of a breakpack goods interface 263 for transfer of breakpack goods BPG into the breakpack goods containers 264 in a manner similar to that described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which were incorporated herein by reference in their entireties. It is noted that the breakpack goods interface 263 may be substantially similar to one or more of the transfer stations TS and buffer stations BS described herein and include an undeterministic surface (similar to that of the rack storage spaces 130S described herein) upon which breakpack goods containers 264 are placed so as to form an undeterministic interface between a goods transfer deck 130DG and the container transfer deck 130DC (e.g., or otherwise a container bot travel surface(s) 266RS that forms part of or is communicably coupled to the container transfer deck 130DC). In other aspects, empty breakpack goods containers 264 may be transferred to (in a manner similar to that noted above with the lifts and container bots) and stored in the storage spaces 130SB, 130S (FIG. 1B) of the rack modules RM or buffered at an infeed station, where the controller 120 is configured to effect transfer of the empty breakpack goods containers 264 from the storage spaces 130SB, 130S or buffer location to the breakpack goods interface 263 in a manner similar to that described above.

In one or more aspects, the controller 120 is configured to effect operation of the container bot(s) 110 and lifts 150 (e.g., forming a container supply system) so as to introduce empty supply containers 265 or standardized containers (as described herein) into the automated storage and retrieval system (in a manner similar to that described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which were previously incorporated herein by reference in their entireties) so that the container bot(s) 110 transport the empty supply containers 265 or standardized containers 265S, along the transport/travel loops 233, 233A of the container transfer deck(s) 130DC and to the breakpack operation station 140 of a breakpack.

As may be realized, the container bots 110, goods bots 262, lift modules 150, breakpack modules 266, and other suitable features of the storage and retrieval system 100 described herein are controlled in any suitable manner such as by, for example, one or more central system control computers (e.g. control server) 120 through, for example, any suitable network 180 to effect the operations described herein. In one aspect the network 180 is a wired network, a wireless network or a combination of wireless and wired networks using any suitable type and/or number of communication protocols. In one aspect, the control server 120 includes a collection of substantially concurrently running programs (e.g. non-transitory computer program code/system management software) for substantially automatic control of the automated storage and retrieval system 100 as described herein. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein.

Figure 1C:
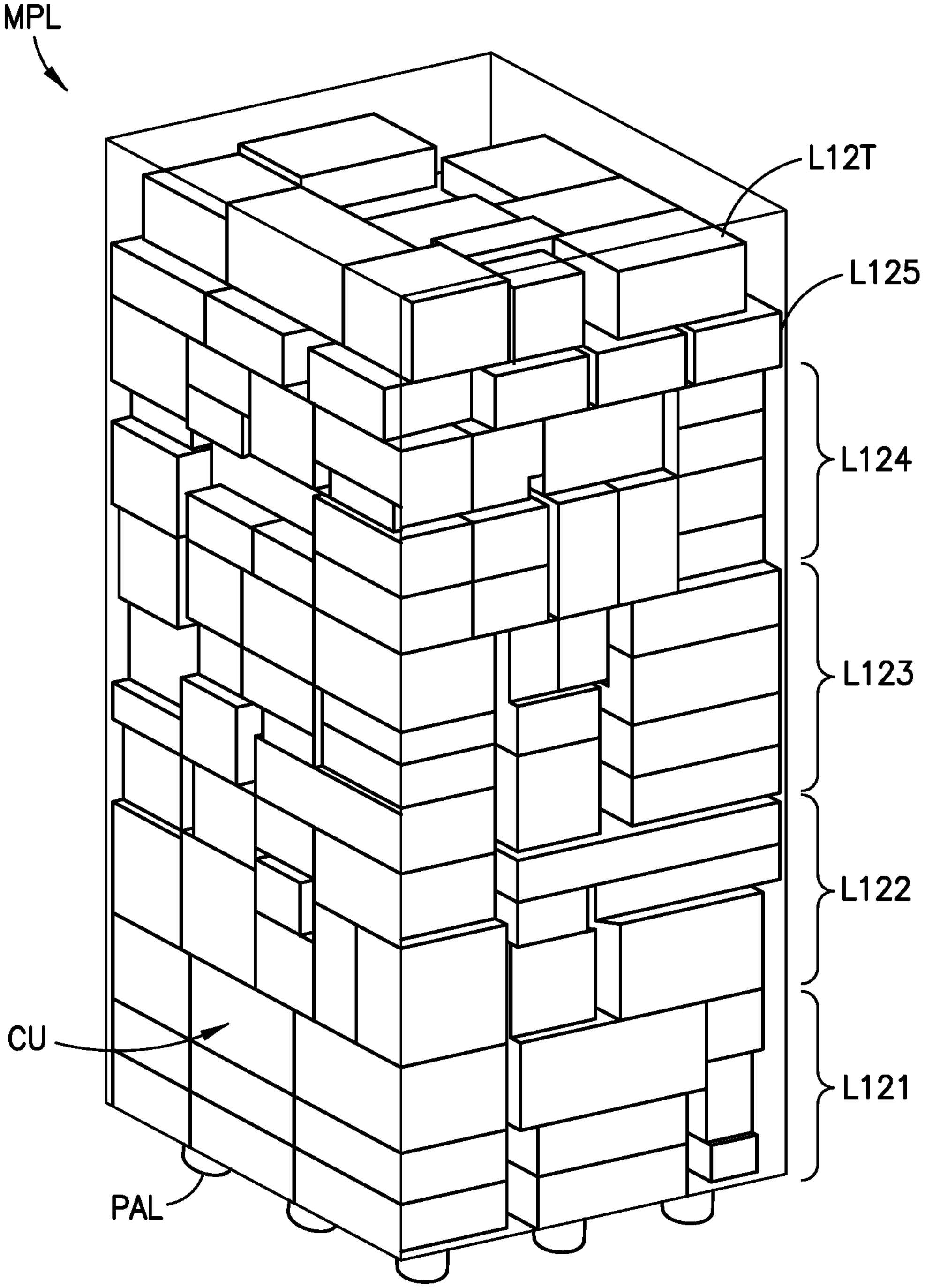
FIG. 1C is a schematic illustration of a mixed pallet load formed by the automated storage and retrieval system of FIG. 1A in accordance with aspects of the disclosed embodiment.

Also referring to FIG. 1C, it is noted that when, for example, incoming bundles or pallets (e.g. from manufacturers or suppliers of case units arrive at the storage and retrieval system for replenishment of the automated storage and retrieval system 100 (again, e.g., see the goods input in FIG. 2), the content of each pallet may be uniform (e.g. each pallet holds a predetermined number of the same item—one pallet holds soup and another pallet holds cereal). As may be realized, the warehouse pack or case units CU of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling customer replenishment orders, the pallets PAL may contain any suitable number and combination of different case units CU (inclusive of whole, i.e., not decommissioned, supply containers 265) and/or breakpack goods containers 264 (collectively referred to as "shipping containers" or "cases" where, e.g., each pallet may hold different types of shipping containers with different types of merchandise categories—a pallet may holds a combination of canned soup, cereal, beverage packs, cosmetics and household cleaners). The cases combined onto a single pallet may have different dimensions and/or different SKU's.

In one aspect of the disclosed embodiment, the storage and retrieval system 100 may be configured to generally include an in-feed section, a storage and sortation section (where, in one aspect, storage of items is optional and sortation is effected with one or more of different orthogonal sortations as described herein) and an output section (e.g., that also may provide sortation effected with one or more of different orthogonal sortations as described herein) as will be described in greater detail below. As may be realized, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases in the manner described in U.S. Pat. No. 9,856,083 issued on Jan. 2, 2018 and having application Ser. No. 14/997,920, the disclosure of which is incorporated herein by reference in its entirety.

The automated storage and retrieval system 100 is configured as described in U.S. provisional patent application No. 63/044,721 filed on Jun. 26, 2020 and U.S. non-provisional patent application Ser. No. 17/358,383 filed on Jun. 25, 2021 both being titled "Warehousing System for Storing and Retrieving Goods In Containers," the disclosures of which were previously incorporated herein by reference in their entireties, to assemble an appropriate group of ordered cases, that may be different in SKU, dimensions, etc. into mixed case pallet loads (that include one or more of case units and/or breakpack containers 264) and/or breakpack containers 264. For example, where a mixed case pallet load is assembled, an output section of the automated storage and retrieval system 100 generates the pallet load in what may be referred to as a structured architecture of mixed case stacks. The structured architecture of the pallet load described herein is representative and in other aspects the pallet load may have any other suitable configuration. For example, the structured architecture may be any suitable predetermined configuration such as a truck bay load or other suitable container or load container envelope holding a structural load. The structured architecture of the pallet load may be characterized as having several flat case layers L121-L125, L12T as described in U.S. Pat. No. 9,856,083, previously incorporated by reference herein in its entirety. As a further example, the breakpack containers 264 may be assembled and output by the output section of the automated storage and retrieval system 100 for individual shipment to a customer or shipment with other breakpack containers 264 to one or more customers.

Figure 3A:
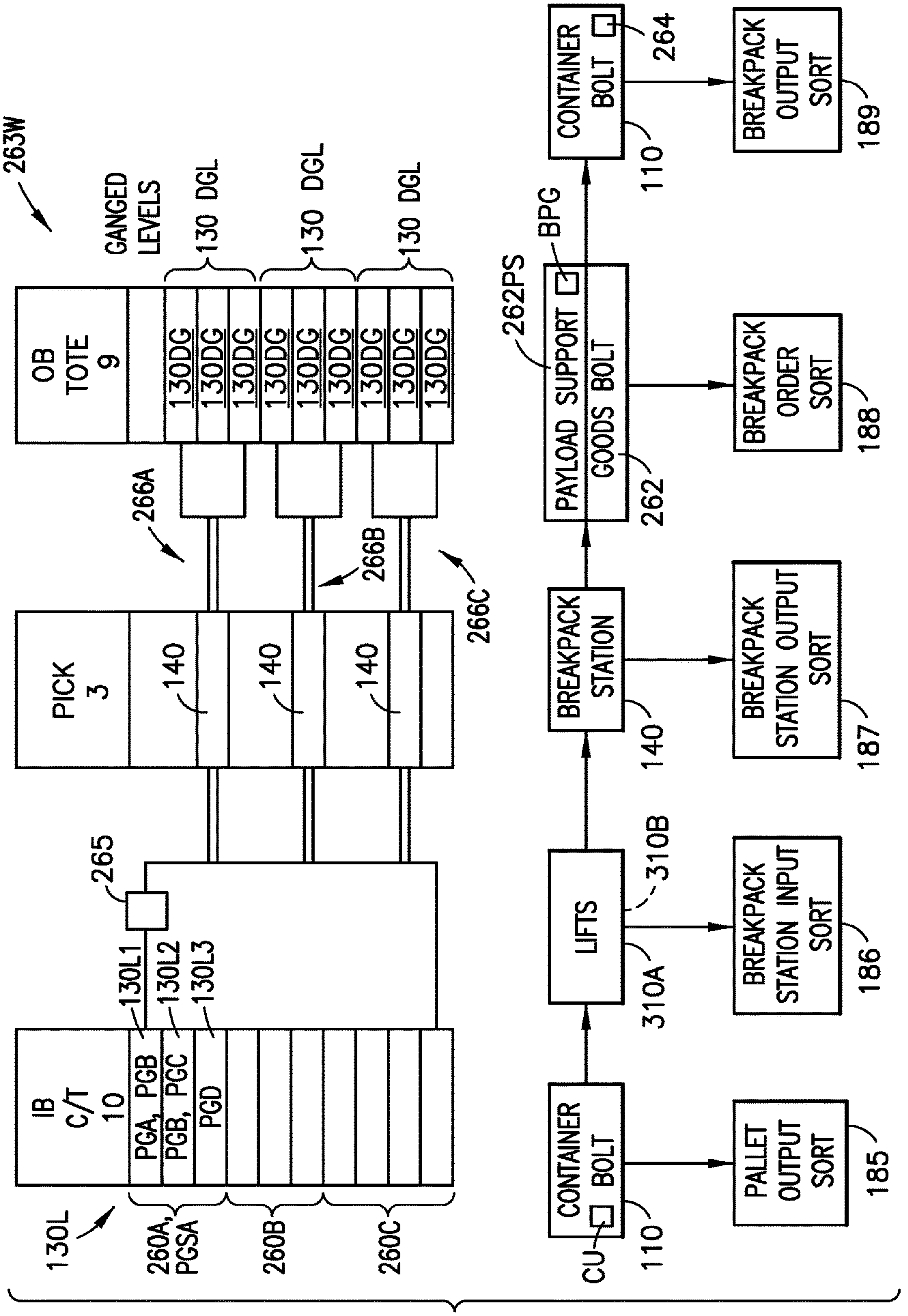
FIG. 3A is a schematic illustration of a portion of the automated storage and retrieval system of FIG. 1A in accordance with aspects of the disclosed embodiment.
Figure 3B:
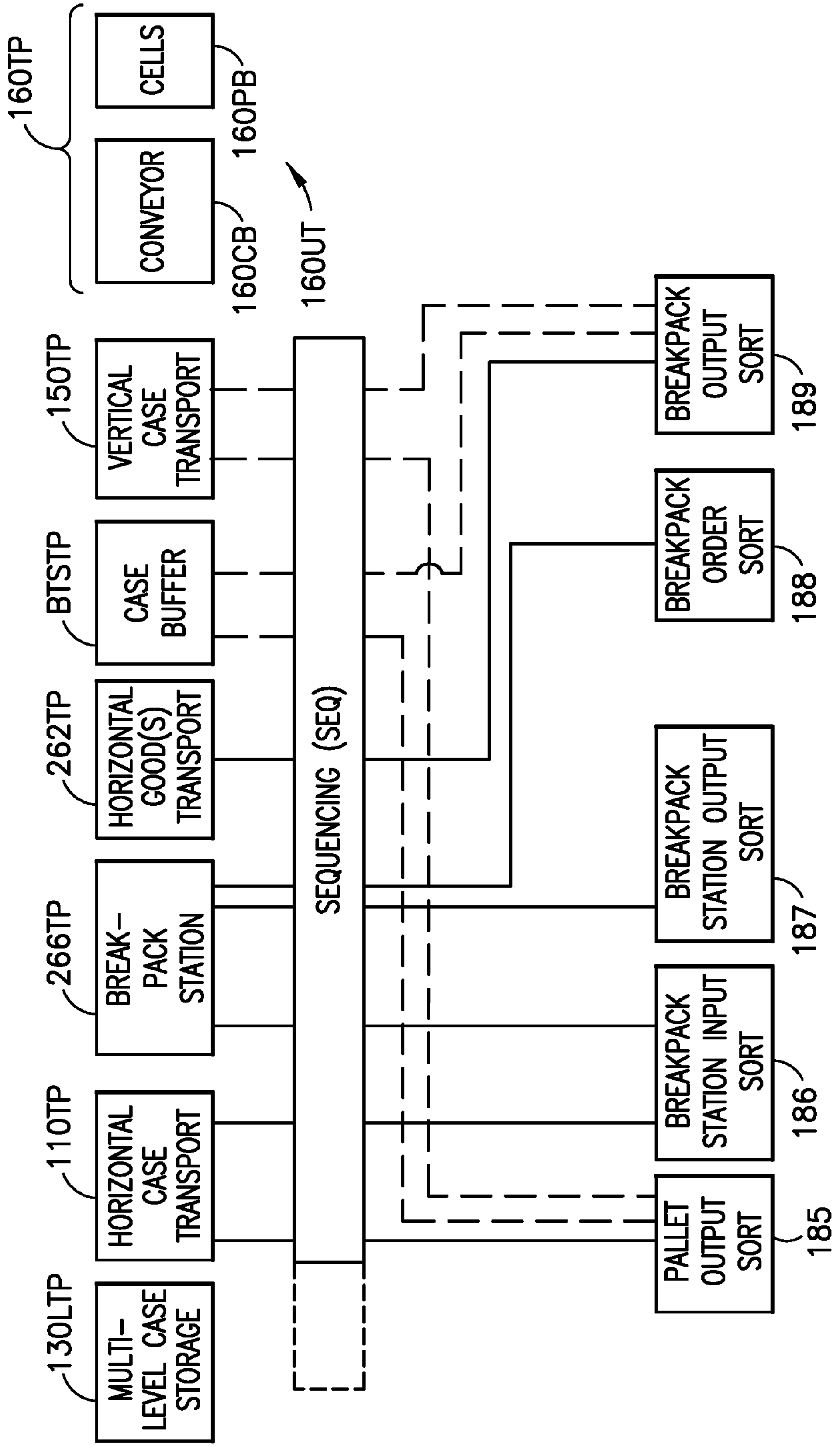
FIG. 3B is a schematic illustration of portions of the automated storage and retrieval system of FIG. 1A in accordance with aspects of the disclosed embodiment.

Referring to FIGS. 3A and 3B, to effect assembling one or more of the mixed pallet load, individual breakpack containers 264, and grouped breakpack containers 264, the controller 120 may operate the container bots 110, goods bots 262, lift modules 150, breakpack modules 266, and other suitable features of the storage and retrieval system 100 so that different orthogonal sortation echelons are effected. For example, the case bots 110 may effect a pallet out sort 185 echelon where case units are retrieved from storage and output for inclusion in a mixed pallet load. One or more of the case bots 110 and breakpack module lifts 310A, 310B may also effect (orthogonal to/independent of the pallet output sort 185) a breakpack station input sort 186 echelon where supply containers 265 are provided to a breakpack module 266 in a predetermined sequence. Each breakpack operation station 140 of a breakpack module 266 may also effect an orthogonal sortation (e.g., breakpack station output sort 187 echelon) of breakpack goods BPG to the goods bots 262, where the goods bots 262 are configured to effect another orthogonal sortation (e.g., breakpack order sort 188 echelon) of the breakpack goods PGB to the breakpack containers 264 at the putwall 263W. The case bots 110 pick the breakpack containers 264 from the putwall 263W and provide a breakpack output sort 189 echelon (that is orthogonal to sortations 185-188) to the output section of the automated storage and retrieval system 100.

In accordance with aspects of the disclosed embodiment, referring again to FIG. 1A, the automated storage and retrieval system 100 includes input stations 160IN (which include depalletizers 160PA and/or conveyors 160CA for transporting items (e.g., inbound supply containers) to lift modules 150A for entry into a storage level 130L of the storage structure or multilevel container storage array 130SA) and output stations 16OUT, 160EC (which include palletizers 160PB, operator stations 160EP and/or conveyors 160CB for transporting items (e.g., outbound supply containers and filled breakpack goods (order) containers) from lift modules 150B for removal from storage (e.g., to a palletizer (for palletizer load) or to a truck (for truck load)). Here the output station 160EC is an individual fulfillment (or e-commerce) output station where, for example, filled breakpack goods (order) containers including single goods items and/or small bunches of goods are transported for fulfilling an individual fulfillment order (such as an order placed over the Internet by a consumer). The output station 16OUT is a commercial output station where large numbers of goods are generally provided on pallets for fulfilling orders from commercial entities (e.g., commercial stores, warehouse clubs, restaurants, distribution centers (e.g., where goods, such as the breakpack goods, case units, pickfaces, etc. are held for shipment to individual customers), etc.). As may be realized, the automated storage and retrieval system 100 includes both the commercial output station 16OUT and the individual fulfillment output station 160EC; while in other aspects, the automated storage and retrieval system includes one or more of the commercial output station 16OUT and the individual fulfillment output station 160EC.

The automated storage and retrieval system 100 also includes input and output vertical lift modules 150A, 150B (generally referred to as lift modules 150—it is noted that while input and output lift modules are shown, a single lift module may be used to both input and remove case units from the storage structure), a storage structure 130 (which may have at least one elevated storage level (also referred to herein as an elevated storage and transport level) and in some aspects forms a multilevel storage array 130SA), and at least one autonomous guided container transport vehicle or container bot 110 which may be confined to a respective storage level of the storage structure 130 and are distinct from a transfer deck 130DC (also referred to herein as a transport area) on (or in) which they travel. It is noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 1C) for shipping. As used herein the lift modules 150, storage structure 130, breakpack modules 266, goods bots 262, and container bots 110 may be collectively referred to herein as the multilevel automated storage system (e.g. storage and sorting section) noted above so as to define (e.g. relative to e.g. a container bot 110 frame of reference or any other suitable storage and retrieval system frame of reference) transport/throughput axes (in e.g. three dimensions) that serve the three dimensional multilevel automated storage system where each throughput axis has an integral "on the fly sortation" (e.g. sortation of case units during transport of the case units) so that case unit sorting and throughput occurs substantially simultaneously without dedicated sorters as described in U.S. Pat. No. 9,856,083, previously incorporated herein by reference in its entirety.

As an example of case unit or breakpack goods container throughput as it relates to sortation, referring also to FIG. 3B, the storage and retrieval system 100 includes several areas or regions of throughput. For example, there is multilevel case unit storage throughput 130LTP that effects placement of case units into storage. The placement/organization of case units in the storage spaces 130S may be decoupled/independent from (e.g., are not pre-staged for) sorting of the case units and/or breakpack goods BPG in the different sortation echelons described herein. A horizontal case unit transport throughput 110TP effects a transfer of case unit(s) from storage along the picking aisles, transfer decks, and to/from a breakpack goods interface. The horizontal case unit transport throughput 110TP effects, at least in part, one or more of the pallet output sort 185 echelon and the breakpack station input sort 186 echelon. The pallet output sort 185 sorts case units destined for a mixed pallet load, where such case units are not provided to a breakpack station 266. Breakpack station throughput 266TP (e.g., breakdown of supply cases at a breakpack operation station) effects one or more of the breakpack station input sort 186 echelon (e.g., via breakpack module lifts 310A, 310B) and breakpack station output sort 187 echelon (via the breakpack operation station 140). Horizontal goods transport throughput 262TP provides for transfer of breakpack goods from a breakpack operation station 140 to a breakpack goods interface and effects a breakpack order sort 188 echelon. Case buffering throughput BTSTP provides for buffering of case units to facilitate transfer of the case units between storage/breakpack and vertical transport and may at, least in part, effect one or more of the pallet output sort 185 and the breakpack output sort 189. A vertical transport throughput 150TP effects transfer of case units by the vertical lifts 150 and may further facilitate, at least in part, one or more of the pallet output sort 185 and breakpack output sort 189. Throughput at the output stations 160TP is also provided which includes, e.g., transport by conveyors 160CB and palletizing by palletizer 160PB. In one aspect sortation of case units, as described herein, is effected substantially coincident (e.g. "on the fly") with throughput 130LTP, 110TP, 266TP, 262TP, BTSTP, 150TP of case units along each throughput axis (e.g. the X, Y, Z axes relative to, for example, a container bot 110 and or lift 150 frame of reference) and sortation along each axis is independently selectable so that sortation is effected along one or more X, Y, Z axes.

Also referring to FIGS. 1A and 1B, the storage structure 130 may include a container autonomous transport travel loop(s) 233, 233A (e.g., formed on and along a container transfer deck 130DC), disposed at a respective level of the storage structure 130. It is noted that the lifts 150 are connected via transfer stations TS (also referred to herein as container infeed stations when the lift 150 is an inbound lift 150A or as container outfeed stations when the lift 150 is an outbound lift 150B) to the container transfer deck 130DC, and each lift is configured to lift one or both of supply containers 265 (empty or filled) and the breakpack goods containers 264 (empty or filled, where a filled breakpack goods container 264 is one that is ready for shipping and is filled so that the breakpack goods BPG within the container occupy at least about 30% or at least about 50% of the total container volume) into and out of the at least one elevated storage level 130L of the storage structure 130. An array of storage shelves 130SA (e.g., forming at least a portion of a storage area of the storage structure 130, and also referred to herein a multilevel container storage array) is configured with container storage locations (or spaces) 130S that are arrayed peripherally along the container transfer deck 130DC, where the transport area of the storage structure 130 is substantially continuous and includes at least the transfer deck 130DC and picking aisles 130A such that the transfer area communicably connects each storage shelf in the array of storage shelves 130SA to each other. For example, multiple storage rack modules RM (FIG. 1B), configured in a high density three dimensional rack array RMA, are accessible by storage or deck levels 130L. As used herein the term "high density three dimensional rack array" refers to the three dimensional rack array RMA having undeterministic open shelving distributed along picking aisles 130A where, in some aspects, multiple stacked shelves are accessible from a common picking aisle travel surface or picking aisle level as described in U.S. Pat. No. 9,856,083, previously incorporated by reference herein in its entirety.

Each storage level 130L includes pickface storage/handoff spaces 130S (referred to herein as storage spaces 130S or container storage locations 130S) arrayed peripherally along the container transfer deck 130DC. At least one of the storage locations 130S is a supply container/warehouse pack WHPK (generally referred to as a case unit CU) storage location 130SS, and another of the container storage locations is a breakpack goods (or order) container storage location 130SB. The storage spaces 130S are in one aspect formed by the rack modules RM where the rack modules include shelves that are disposed along storage or picking aisles 130A (that are connected to the container transfer deck 130DC) which, e.g., extend linearly through the rack module array RMA and provide container bot 110 access to the storage spaces 130S and transfer deck(s) 130B (e.g., the container bots 110 are configured to traverse the container transfer deck 130DC and picking aisles 130A on each respective level(s) and transport containers (such as those described herein) accessed to and from container storage locations/spaces (such as described herein) on each of the storage shelves on each respective level(s) of the storage structure 130 to a breakpack operation station 140. In one aspect, the shelves of the rack modules RM are arranged as multi-level shelves that are distributed along the picking aisles 130A. As may be realized the container bots 110 travel on a respective storage level 130L along the picking aisles 130A and the container transfer deck 130DC for transferring case units between any of the storage spaces 130S of the storage structure 130 (e.g. on the level which the container bot 110 is located) and any of the lift modules 150 (e.g. each of the container bots 110 has access to each storage space 130S on a respective level and each lift module 150 on a respective storage level 130L).

The container transfer decks 130DC are arranged at different levels (corresponding to each level 130L of the storage and retrieval system) that may be stacked one over the other or horizontally offset, such as having one container transfer deck 130DC at one end or side RMAE1 of the storage rack array RMA or at several ends or sides RMAE1, RMAE2 of the storage rack array RMA as described in, for example, U.S. Pat. No. 10,822,168 issued on Nov. 3, 2020 the disclosure of which is incorporated herein by reference in its entirety. The container transfer decks 130DC are substantially open and configured for the undeterministic traversal of container bots 110 along multiple travel lanes (e.g. along an X throughput axis with respect to the bot frame of reference REF illustrated in FIG. 6D) across and along the transfer decks 130B. As described in U.S. Pat. No. 10,556,743 issued on Feb. 11, 2020, the disclosure of which is incorporated herein by reference in its entirety, the multiple travel lanes may be configured to provide multiple access paths or routes to each storage location 130S (e.g., pickface, case unit, container, or other items stored on the storage shelves of rack modules RM) so that container bots 110 may reach each storage location using, for example, a secondary path if a primary path to the storage location is obstructed. As may be realized, the transfer deck(s) 130B at each storage level 130L communicate with each of the picking aisles 130A on the respective storage level 130L.

Container bots 110 bi-directionally traverse between the container transfer deck(s) 130DC and picking aisles 130A on each respective storage level 130L so as to travel along the picking aisles (e.g. along the X throughput axis with respect to the bot frame of reference REF illustrated in FIG. 6D) and access the storage spaces 130S disposed in the rack shelves alongside each of the picking aisles 130A (e.g. container bots 110 may access, along a Y throughput axis, storage spaces 130S distributed on both sides of each aisle such that the container bot 110 may have a different facing when traversing each picking aisle 130A, for example, drive wheels of the container bot 110 leading a direction of travel or drive wheels trailing a direction of travel). As may be realized, throughput outbound from the storage array 130SA in the horizontal plane corresponding to a predetermined storage or deck level 130L is effected by and manifest in the combined or integrated throughput along both the X and Y throughput axes. As noted above, the container transfer deck(s) 130DC also provides container bot 110 access to each of the lifts 150 on the respective storage level 130L where the lifts 150 feed and remove case units (e.g. along the Z throughput axis) to and/or from each storage level 130L and where the container bots 110 effect case unit transfer between the lifts 150 and the storage spaces 130S.

The container bots 110 may be any suitable independently operable autonomous transport vehicles that respectively carry and transfer/transport case units and/or pickfaces (which may be individually or collectively referred to as supply containers 265) and breakpack goods containers 264, e.g., along the X and Y throughput axes (see FIG. 1B) throughout the storage and retrieval system 100. In one aspect the container bots 110 are automated, independent (e.g. free riding) autonomous transport vehicles. Suitable examples of bots can be found in, for exemplary purposes only, U.S. Pat. No. 10,822,168 issued on Nov. 3, 2020; U.S. Pat. No. 8,425,173 issued on Apr. 23, 2013); U.S. Pat. No. 9,561,905 issued on Feb. 7, 2017; U.S. Pat. No. 8,965,619 issued Feb. 24, 2015; U.S. Pat. No. 8,696,010 issued on Apr. 15, 2014; U.S. Pat. No. 9,187,244 issued Nov. 17, 2015; U.S. Pat. No. 11,078,017 issued on Aug. 3, 2021; U.S. Pat. No. 9,499,338 issued on Nov. 22, 2016; U.S. Pat. No. 10,894,663 issued on Jan. 19, 2021; and U.S. Pat. No. 9,850,079 issued on Dec. 26, 2017, the disclosures of which are incorporated by reference herein in their entireties. The container bots 110 (described in greater detail below) may be configured to place case units, such as the above described retail merchandise, into picking stock in the one or more levels of the storage structure 130 and then selectively retrieve ordered case units. As may be realized, in one aspect, the throughput axes X and Y (e.g. pickface transport axes—see frame of reference REFZ in FIG. 1B) of the storage array 130SA are defined by the picking aisles 130A, at least one container transfer deck 130DC, the container bot 110 and an extendable end effector of the container bot 110 (and in other aspects the extendable end effector of the lifts 150 also, at least in part, defines the Y throughput axis). The pickfaces (which in one aspect include supply containers 265) are transported between an inbound section of the storage and retrieval system 100, where pickfaces inbound to the array are generated (such as, for example, input station 160IN) and a load fill section of the storage and retrieval system 100 (such as for example, output station 16OUT or output station 160EC), where outbound pickfaces from the array are arranged to fill a load in accordance with a predetermined load fill order sequence or an individual fulfillment order(s) in accordance with a predetermined individual fulfillment order sequence. In another aspect, pickfaces (e.g., of supply containers 265) are transported between the storage spaces 130S and a load fill section of the storage and retrieval system 100 (such as for example, output station 16OUT or output station 160EC) to fill a load in accordance with a predetermined load fill order sequence or an individual fulfillment order(s) in accordance with a predetermined individual fulfillment order sequence. In still other aspects, breakpack goods container(s) 264 (which, in one aspect, multiple breakpack goods containers may be arranged in and transported as a pickface) are transported by the container bots 110 between the storage spaces 130S and the load fill section and/or between the breakpack goods interface 263 of the breakpack module(s) 266 and the load fill section of the storage and retrieval system 100 (such as for example, output station 16OUT or output station 160EC) to fill a load in accordance with a predetermined load fill order sequence or an individual fulfillment order(s) in accordance with a predetermined individual fulfillment order sequence. The control server 120 may operate the automated storage and retrieval system 100 in different modes of operation so that the pickfaces (e.g., of supply containers 265) and breakpack goods containers 264 are transferred in accordance with one or more of the above aspects to the load fill section to fill a load with one or more of pickfaces (e.g., of supply containers 265) and breakpack goods containers 264.

As described above, referring to FIG. 1B, in one aspect the storage structure 130 includes multiple storage rack modules RM, configured in a three dimensional array RMA (e.g., forming the array of storage shelves 130SA) where the racks are arranged in aisles 130A, the aisles 130A being configured for container bot 110 travel within the aisles 130A. The container transfer deck 130DC has an undeterministic transport surface on which the container bots 110 travel where the undeterministic transport surface (also referred to herein as a deck surface) 130BS has multiple travel lanes (e.g., more than one juxtaposed travel lane (e.g. high speed bot travel paths HSTP)) for travel of the container bot 110 along the container autonomous transport travel loop(s) 233 formed by the container transfer deck 130DC, where the multiple travel lanes connect the aisles 130A. The container autonomous transport travel loop(s) 233 provides the container bot 110 with random access to any and each picking aisle 130A and random access to any and each lift 150A, 150B on the respective level 130L of the storage structure 130. At least one of the multiple travel lanes has a travel sense opposite to another travel lane sense of another of the multiple travel lanes (so as to form the container autonomous transport travel loop 233).

In one aspect, the storage rack modules RM and the container bots 110 are arranged so that in combination the storage rack modules RM and the container bots 110 effect the on the fly sortation (e.g., such as of the pallet output sort 185 echelon) of mixed case pickfaces coincident with transport on at least one (or in other aspects on at least one of each of the more than one) of the throughput axes so that two or more pickfaces are picked from one or more of the storage spaces and placed at one or more pickface holding locations (such as, for example, the buffer and transfer stations BS, TS), that are different than the storage spaces 130S, according to the predetermined load fill order sequence.

As may be realized, any suitable controller of the storage and retrieval system 100 such as for example, control server 120, may be configured to create any suitable number of alternative pathways or diverts for retrieving one or more case units (and/or breakpack goods containers) from their respective storage locations 130S when a pathway provided access to those case units is restricted or otherwise blocked in the manner described in U.S. provisional patent application No. 63/044,721 filed on Jun. 26, 2020 and titled "Warehousing System for Storing and Retrieving Goods In Containers," the disclosure of which was previously incorporated herein by reference in its entirety.

It is noted that the storage and retrieval systems shown and described herein have exemplary configurations only and in other aspects the storage and retrieval systems may have any suitable configuration and components for storing and retrieving items as described herein. For example, in other aspects, the storage and retrieval system may have any suitable number of storage sections, any suitable number of transfer decks, any suitable number of breakpack modules 266, and corresponding input/output stations.

As may be realized, the juxtaposed travel lanes are juxtaposed along a common undeterministic transport surface 130BS between opposing sides 130BD1, 130BD2 of the container transfer deck 130DC. As illustrated in FIG. 1B, in one aspect the aisles 130A are joined to the container transfer deck 130DC on one side 130BD2 of the container transfer deck 130DC but in other aspects, the aisles are joined to more than one side 130BD1, 130BD2 of the container transfer deck 130DC in a manner substantially similar to that described in U.S. Pat. No. 10,822,168 issued on Nov. 3, 2020, the disclosure of which is previously incorporated by reference herein in its entirety. As described in U.S. provisional patent application No. 63/044,721 filed on Jun. 26, 2020 and titled "Warehousing System for Storing and Retrieving Goods In Containers" and U.S. patent application Ser. No. 17/358,383 filed on Jun. 25, 2021) the disclosures of which were previously incorporated herein by reference in their entireties, the other side 130BD1 of the container transfer deck 130DC may include deck storage racks (e.g. interface stations (also referred to as transfer stations) TS and buffer stations BS) that are distributed along the other side 130BD1 of the container transfer deck 130DC so that at least one part of the transfer deck is interposed between the deck storage racks (such as, for example, buffer stations BS or transfer stations TS) and the aisles 130A. The deck storage racks are arranged along the other side 130BD1 of the container transfer deck 130DC so that the deck storage racks communicate with the container bots 110 from the container transfer deck 130DC and with the lift modules 150 (e.g. the deck storage racks are accessed by the container bots 110 from the container transfer deck 130DC and by the lifts 150 for picking and placing pickfaces so that pickfaces are transferred between the container bots 110 and the deck storage racks and between the deck storage racks and the lifts 150 and hence between the container bots 110 and the lifts 150).

Referring again to FIG. 1A, each storage level 130L may also include charging stations 130C (e.g., located at any suitable container transfer location) for charging an on-board power supply of the container bots 110 on that storage level 130L such as described in, for example, U.S. patent application Ser. No. 14/209,086 filed on Mar. 13, 2014 and U.S. Pat. No. 9,082,112 issued on Jul. 14, 2015, the disclosures of which are incorporated herein by reference in their entireties.

As described above, and referring to FIGS. 1A and 2, the aspects of the disclosed embodiment provide a breakpack system with containerization and sequencing that is optimized for end user (e.g., customer/consumer) requests or order fulfillment for mixed product units or breakpack goods BPG. As described herein, the storage array 130SA, has at least one elevated storage level 130L (see FIGS. 1A and 3A), where the mixed product units are input and distributed (in the manner described herein) in the storage array 130SA in cases (e.g., warehouse packs CU), of product units of common kind per warehouse pack CU. The customer orders 299 (See FIG. 2) are of mixed product units (e.g., a mix of breakpack goods/vendor packs BPG), each unit of which is stored, in the storage array 130SA, in cases of product units (i.e., non-decommissioned warehouse packs or case units CU) of common kind per case. Each of the customer orders 299 are of (i.e., include) at least one of the mixed product units (e.g., each customer order 299 includes at least one breakpack good/vendor pack BPG).

An automated transport system 277 (such as described herein), with at least one asynchronous transport system 255A-255*n* (including at least one container bot 110) for level transport, and a lift 150A-150*n* (such as outbound lift 150B) for between storage structure level 130L transport, is communicably connected to the storage array 130SA. An asynchronous transport system 255A-255*n* may be provided with a respective one of the at least one of the elevated storage level 130L so as to automatically retrieve and output, from the storage array 130SA, product units/breakpack goods BPG distributed in the case units CU. The automated transport system 277 may include any suitable number of asynchronous transport systems 255A-255*n* and lifts 150A-150*n* (where "n" is an integer that represents an upper limit to the range A-n). As described herein the automated transport system 277 automatically retrieves and outputs, from the storage array 130SA, product units BPG distributed in the respective warehouse packs CU in the at least one elevated storage level 130L of the storage array 130SA. The output product units BPG are output as one or more of mixed singulated products (e.g., individual breakpack goods), in mixed packed groups (e.g., more than one breakpack goods packed in a group of breakpack goods in a common container), and mixed cases or warehouse packs CU (e.g., non-decommissioned warehouse packs, each having a common type of goods).

The at least one asynchronous transport system 255, and the lift 150 are configured so as to, at least in part, form more than one transport channel 260A-260*n*. Each of the more than one transport channel 260A-260*n* includes picking aisles 130A (of one or more elevated storage levels 130L), transfer decks 130DC (of one or more elevated storage levels 130L), and autonomous guided autonomous bots 110 asynchronously traversing respective levels of the at least one elevated storage level 130L. The bots 110 transport case units CU and/or breakpack goods containers 264 from storage to a lift 150 for output of the case units CU and/or breakpack goods containers 264 from the storage structure 130 and/or transfer between storage levels 130L. Each autonomous guided autonomous bot 110 is configured to transport one case CU of product units of common kind, such as from storage to a breakpack module 266 and/or from storage to a lift 150; noting that each bot is also configured to transport breakpack goods containers 264 holding one or more breakpack goods which may be of the same kind or of different kinds.

Each of the more than one transport channel 260A-260*n* also includes a breakpack module 266 input where breakpack goods are removed from case units CU and transferred to breakpack goods containers 264 by goods bots 262. The breakpack goods containers 264 are located at a putwall 263W where the containers bots 110 retrieve the breakpack goods containers 264 for output from the storage structure as described in U.S. provisional patent application Ser. No. 17/657,705 filed on Apr. 1, 2022 and titled "Warehousing System for Storing and Retrieving Goods in Containers" and U.S. provisional patent application Ser. No. 17/358,383 filed on Jun. 25, 2021 and titled "Warehousing System for Storing and Retrieving Goods in Containers", the disclosures of which were previously incorporated by reference herein in their entireties. Referring also to FIG. 3A, at least one transport channel 260A-260*n* is connected with the at least one elevated storage level 130L separate and distinct from each other transport channel. The at least one transport channel 260A-260*n* is connected with a corresponding one or more of the at least one elevated storage level 130L that are different than elevated storage levels 130L of the storage array/structure 130 connected to and corresponding to each other transport channel 260A-260*n*. For example, each transport channel includes one or more respective storage levels 130L of the storage structure 130 (see FIG. 3A) and is associated with at least one product group set PGSA-PGSn as described herein.

At least one of the transport channels 260A-260*n* is separate and distinct from another transport channel 260A-260*n*. Each transport channel 260A-260*n* is communicably connected with the at least one elevated storage level 130L and the output of the storage array (e.g., such as one or more output stations 16OUT). The at least one transport channel 260A-260*n* effects orthogonal transport output, relative to each other transport channel 260A-260*n*, of the product units BPG in the case units/warehouse packs CU distributed in the storage array 130SA. The at least one transport channel 260A-260*n* is independent of each other of the more than one transport channel 260A-260*n* so that output of product units (e.g., the mixed product units BPG held in case units CU and/or breakpack goods containers 264) from the at least one transport channel 260A-260*n* is orthogonal to output from each other transport channel 260A-260*n* as described herein.

The controller 120 is communicably connected to at least one elevated storage and transport level 130L. Connection of the controller 120 to the at least one elevated storage and transport level 130L also communicably connects the controller 120 to the more than one transport channels 260A-260*n* that include respective elevated storage and transport levels 130L of the at least one elevated storage and transport level 130L. The controller 120 is configured (i.e., with any suitable non-transitory computer program code) to register customer orders (see FIG. 2) of product units (whether as vendor packs/breakpack goods BPG or whole non-decommissioned warehouse packs CU) and describe each order in one or more product (merchandise) groups PGA-PGn of product units BPG. Each product group PGA-PGn having a unique predetermined product group characteristic characterizing the product group PGA-PGn and relates the product groups PGA-PGn to each other. In other aspects, the controller 120 is configured to register customer orders 299 of product units BPG characterized by one or more product groups PGA-PGn of product units BPG, where each product group PGA-PGn has a unique predetermined product group characteristic characterizing product units BPG of the product group PGA-PGn and relating the product group PGA-PGn to each other product group PGA-PGn.

The unique predetermined product group characteristic may be one or more of a product type (e.g., toothpaste, deodorant, shaving cream, footwear, bakeware, cleaners, etc.), product structural characteristics (e.g., fragility of a product or product packaging, etc.), an affinity of one product to the another in accordance with store rules (as described herein), and any other suitable characteristic. Here, a relationship between product groups PGA-PGn arises from the grouping of the product groups PGA-PGn by merchandise categories (and the unique predetermined product group characteristic thereof, e.g., caustic products are to be placed below non-caustic products, products are to be stacked or otherwise containerized with the most fragile products on top and the least fragile products on the bottom of a stack, etc.) and informs or otherwise defines mergeability of merchandise categories. The grouping of merchandise categories (e.g., based on rules and/or the predetermined characteristics) on a given one or more storage levels 130L in a product group set PGSA-PGSn includes many breakpack products BPG to few product group sets PGSA-PGSn so that there is a bias for mergeability of merchandise categories into product group sets PGSA-PGSn across (e.g., decoupled from) customer orders. In accordance with the aspects of the disclosed embodiment, there is a maximizing merchandise categories into product group set PGSA-PGSn and, correspondingly, each product group set PGSA-PGSn includes a maximum or optimum number of merchandise categories.

The controller 120 is also configured to heuristically resolve, based on the product group characteristic, the product groups PGA-PGn of more than one order to product group sets PGSA-PGSn. In other aspects, the controller 120 dynamically resolves, via heuristic solution based on the product group characteristic (which as noted herein is unique and predetermined), the product groups PGA-PGn describing each customer order 299 into the product group sets PGSA-PGSn. Each product group set PGSA-PGSn being of a number of product groups PGA-PGn, and orthogonal to each other product group set PGSA-PGSn, and having a maximum number of mergeable product groups PGA-PGn. The controller is configured to, with another heuristic solution, dynamically bind product units BPG of allocated product group sets PGSA-PGSn of the at least one elevated storage and transport level 130L (or transport channel 260A-260*n*), into predetermined boundaries (e.g., breakpack containers 264), in batches of mixed product units BPG for each customer order 299 corresponding to the allocated product group set PGSA-PGSn as will be described herein with respect to a containerization process. The other heuristic solution is based on at least one product group characteristic and customer or default affinity rules as described herein.

The controller 120 is configured so as to effect dynamic resolution of the product group sets PGSA-PGSn based on at least, a quantity of allocated product group sets PGSA-PGSn relative to the predetermined threshold (e.g., the average vendor pack requirements of EQ. 2A or EQ. 2B) of product units (e.g., vendor packs/breakpack goods PBG) transported via the at least one transport channel 260A-260*n*, and quantities respectively of other allocated product groups sets PGSA-PGSn (e.g., allocated to other transport channels 260A-260*n*) relative to a respective threshold (e.g., the average vendor pack requirements of EQ. 2A or EQ. 2B) of each other transport channel 260A-260*n*. Each resolved product group set PGSA-PGSn is orthogonal to each other product group set PGSA-PGSn, and has a maximum number of complementing, affinable (e.g., affinity characteristics as described herein), and/or mergeable product groups PGA-PGn.

The product group set(s) PGSA-PGSn is dynamically allocated for retrieval and output, via the at least one storage and transport level 130L, of product units BPG forming the product group set PGSA-PGSn into order containers (e.g., breakpack containers 264) holding batches of mixed product units BPG, wherein the product group set is dynamically allocated so as not to exceed a predetermined threshold (e.g., the average vendor pack requirements of EQ. 2A or EQ. 2B) of product units BPG transported via the at least one storage and transport channel 260A-260*n*. Where the predetermined threshold (for a given transport channel) is exceeded (it is noted that, as will be described further herein, the predetermined threshold, that seeks to balance transactions between storage levels or transport channels, for maximum throughput of the storage and retrieval system 100, is a dynamic factor that floats depending on orders filled by each transport channel and new orders received (e.g., the order(s) demand per transport channel versus the transaction output per channel) to effect dynamic restoration of balanced transactions), the product groups(s) of the product group set may be dynamically reassigned to another transport level (see FIG. 2) on which the product units being transported are below the predetermined threshold. As the reassignment is based on the mergeability of the products, and given the orthogonality of the transport levels, a product reassigned to the other level may be selected for inclusion in a product group set (instead of a package of the same product located on the originally assigned level) if such selection results in a more efficient product output of the respective transport channel and product group set. Here, the reassignment is based on what may be referred to as highest fill potential (e.g., determined by the highest of an average vendor pack of a current transport channel compared to the average vendor pack for other levels). In one or more aspects, the controller 120 is configured so as to effect dynamic allocation of the resolved product group sets PGSA-PGSn to the at least one transport channel 260A-260*n* (and/or to the at least one elevated storage and transport level 130 thereof). The controller may also be configured so as to balance (e.g., so as to provide a substantially stochastic distribution of case units/product decoupled from but according to aligned (if not coincident) customer rules as described herein) allocated product group sets PGSA-PGSn to the at least one transport channel 260A-260*n* with other allocated product group sets PGSA-PGSn allocated to each other transport channel 260A-260*n*.

For example, at input of the warehouse packs CU into the storage and retrieval system 100 the warehouse packs CU are assigned/resolved or otherwise formed into one or more product group set or workgroup PGSA-PGSn. Each product set PGSA-PGSn includes one or more product groups PG of the product groups PGA-PGn. Each of the one or more product groups PG, PGA-PGn are dynamically assigned/allocated, such as by controller 120, to a respective storage level 130L, 130L1-130L3. At least one of resolution and allocation of product group sets PGSA-PGSn minimizes bot 110 transport of cases CU (inclusive of breakpack goods containers 264) of product units per customer order 299. For example, the resolution of the product group sets PGSA-PGSn provides for mergeability of products with each other at, for example, the breakpack module 266 which provides for inclusion of products from one case unit into many breakpack goods containers 264 of the batched customer orders 299C, minimizing the number of trips for a particular case unit. The dynamic assignment of the product groups PGA-PGn (and/or dynamic reassignment of at least a portion thereon—see FIG. 2) to the different storage levels 130L substantially evenly distributes the product transport load (in a substantially stochastic distribution as described herein) between the storage levels 130L and reduces the number of trips it takes for a container bot 110 to transport the case units for any given order (as described herein). The warehouse packs CU may be assigned to a product group PG of a respective product group set PGSA-PGSn in any suitable manner, such as by any suitable product characteristics including, but not limited to, those described herein.

At least one of resolution and allocation of product group sets PGSA-PGSn optimizes transport of product units (e.g., case units CU and or breakpack goods BPG) with the asynchronous transport system 255A of a respective transport channel 260A-260*n* per customer order 299. For exemplary purposes, each product group set PGSA-PGSn may correspond to a customer (or group of similar customers) and the product groups PGA-PGn may correspond to goods that customer sells/distributes. The product groups PG, PGA-PGn are generated by the controller 120 in a manner that biases the placement of warehouse packs CU in the storage array 130SA so that the breakpack goods BPG held within the warehouse packs CU are known to be mergeable with each other (e.g., can be packed with each other according to predetermined criteria as noted herein) in a common shipping container. For example, the controller 120 may group the warehouse packs CU based on affinity rules and/or any other suitable criteria (as described herein, including but not limited to product type, product structural characteristics, etc.) that are applied at each storage level 130L. Here the product groups PG, PGA-PGn are divided into any suitable number of operating zones based on any suitable criteria (such as the affinity rules, product type, etc.) so that the product within the warehouse packs CU of the respective product groups PG are orthogonally processed in the respective operating zone. The generation of the product groups PGA-PGN and the product group sets PGSA-PGSn leverages an aggregation or availability (e.g., the distribution of the warehouse packs CU in the storage array 130SA in a substantially stochastic distribution) of many products groups PGA-PGn (e.g., merchandise categories) of one or more customers on a storage level to optimize the mergeability of products in any given order. The formation of the product group sets PGSA-PGSn as described herein biases mergeability to maximize the number of mergeable merchant categories (or product groups PGA-PGn) to product group sets PGSA-PGSn, where the controller iterates through merchandise categories, to provide the substantially stochastic distribution, decoupled from but according to aligned (if not coincident) customer rules (see FIGS. 4A-4C and 5A-5F).

In the examples described herein, an operating zone corresponds to a respective one or more storage levels 130L; while in other aspects, there may be more than one operating on a respective storage level 130L. As an example, the controller 120 is configured to allocate the warehouse packs CU to a respective storage level 130L based on criteria including, but not limited to, a number of breakpack goods for a given customer order and a mergeability of the breakpack goods BPG. With respect to the number of breakpack goods for a given customer order, the picking/transport load is allocated evenly across a storage level 130L or between storage levels 130L. With respect to the mergeability of breakpack goods (e.g., of one merchandise category) with other breakpack goods (e.g., of another merchandise category), merchandise category adjacency is maximized so that shipping container fill is maximized and the number of shipping containers is minimized. Merchandise category adjacency may be based on store affinity rules such as described in U.S. provisional patent application No. 63/288,253 filed on Dec. 10, 2021 and titled "Material Handling System and Method Therefor," the disclosure of which is incorporated herein by reference in its entirety, and/or any other suitable criteria (as described herein, including but not limited to product type, product structural characteristics, etc.).

Merchandise category adjacency may effect "store friendly" pallets PAL output from the automated storage and retrieval system 100, where "store friendly" refers to a store affinity of the pallet load or a pallet load store affinity, such that the pallet load configuration (i.e., the pallet load build) includes a predetermined characteristic (or factor) of store affinity that biases or factors resolution of each pallet load PALO to conform and provide each resultant pallet load PALO with retail store characteristics that are in accordance with or are sympathetic to a retail store predetermined characteristic. For example, when pallet load(s) PALO of a fulfilled mixed-product order (see the "orders" in FIG. 2) arrive at an order store or customer 200, the pallet load(s) PALO may be quickly unloaded (e.g., such as in accordance with "just in time" inventory practices) and the goods thereof are distributed (e.g., restocked/stocked) onto the store shelves 233 with minimal disruption to store operations. To facilitate the quick unloading and distribution of the goods onto the store shelves 233, the storage and retrieval system 100 is configured to build the pallet load(s) PALO such that the structure of the goods (e.g., singulated products (e.g., individual breakpack goods), in mixed packed groups (e.g., more than one breakpack goods packed in a group of breakpack goods in a common container), and mixed cases or warehouse packs CU (e.g., non-decommissioned warehouse packs, each having a common type of goods)) on the pallet load(s) PALO are grouped in a manner similar to the way the goods CU are distributed onto the store shelves 233.

It is noted that each of one or more pallet loads PALO in a mixed-product order 299 is built by the automated storage and retrieval system 100 such that each pallet load PALO is the "store friendly pallet" or "store friendly pallet load." For example, when pallet load(s) PALO of a fulfilled mixed-product order 299 (see FIGS. 7-9) arrive at an order store 700, the pallet load(s) PALO (e.g., pallets loads PALOC in FIG. 7, PALOA, PALOA' in FIG. 8, and PALOC, PALOC' in FIG. 9) are quickly unloaded (e.g., such as in accordance with the "just in time" inventory practices) and the goods thereof are distributed (e.g., restocked/stocked) onto the store shelves 733 with minimal disruption to store operations. To facilitate the quick unloading and distribution of the goods onto the store shelves 733, the automated storage and retrieval system 100 is configured to build the pallet load(s) PALO such that the structure of the goods CU (also referred to herein as packages, products, case units, mixed cases, cases, shipping cases, and shipping units) on the pallet load(s) PALO are grouped in a manner similar to the way the goods CU are distributed onto the store shelves 733.

Each warehouse customer (e.g., order store 200) of the warehouse 199 may have its own preference with respect to the handling of pallet loads within the order store 200. The aspects of the present disclosure provide for the building of store friendly pallets that correspond to the different ways the pallets loads are handled and products are distributed by the warehouse customers. These different ways the pallets loads are handled and products are distributed are referred to as order store affinity characteristics. These order store affinity characteristics (e.g., a predetermined customer affinity) are one or more of the clustered aisle pallet load packages distribution method (see, e.g., FIG. 7), the adjacent aisles pallet load package distribution method (see, e.g., FIG. 8), and the mixed mode clustered and adjacent aisles pallet load packages method (see, e.g., FIG. 9). The order store affinity characteristic(s) may be stored in any suitable memory, such as a memory of the control server 120 and/or palletizer of the output station 16OUT, and employed by the control server 120 and/or output palletizer for generating the pallet loads PALO described herein.

Figure 7:
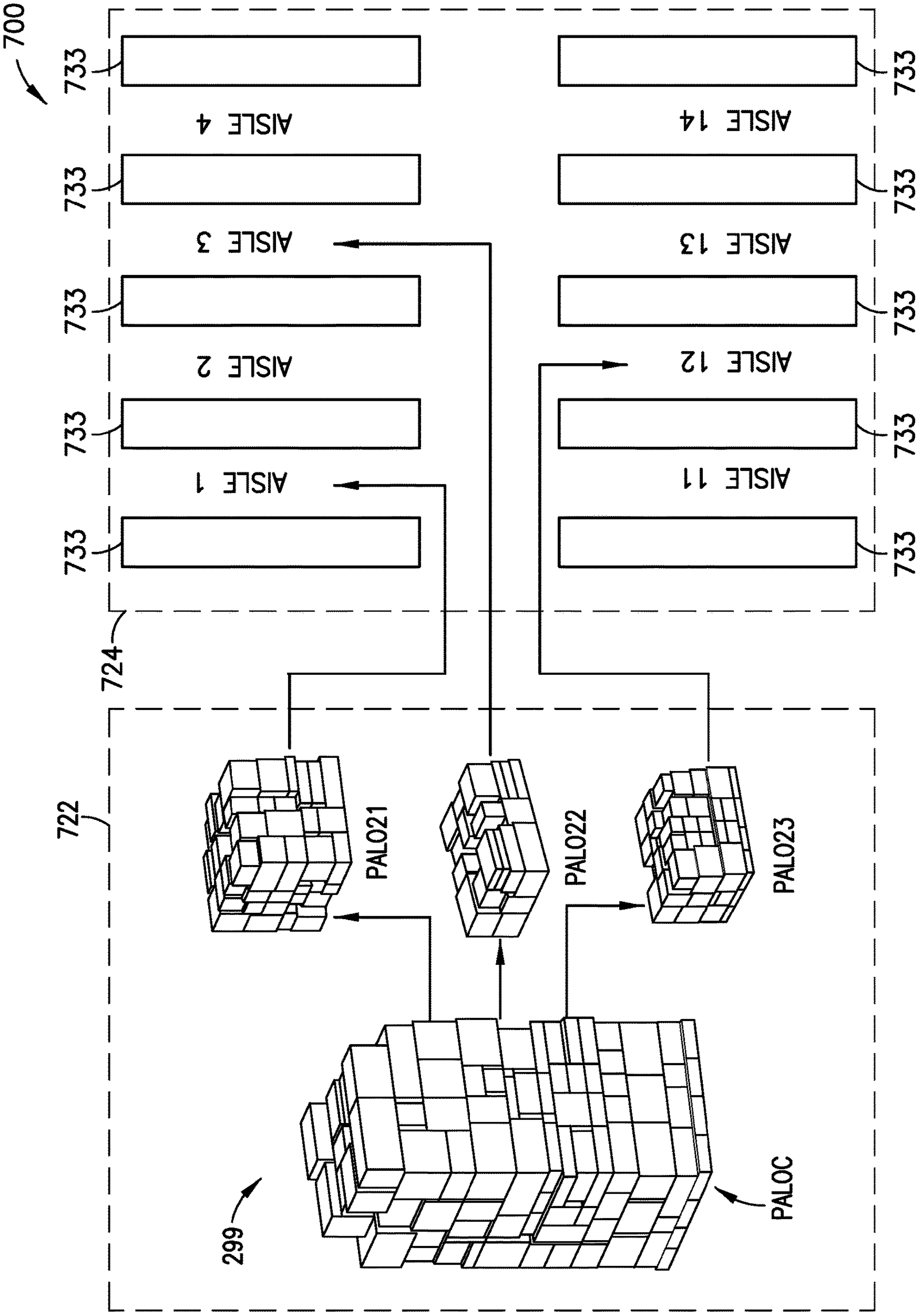
FIG. 7 is an exemplary a schematic illustration of a merchant pallet load packages distribution in accordance with aspects of the present disclosure.

Referring to FIG. 7, one exemplary way of handling pallet loads PALO may be referred to as a "clustered aisle pallet load packages distribution method" and includes deconstructing/downstacking the pallet load(s) PALOC in a loading dock area 722 (or other suitable area) of an order store and putting goods CU belonging to different sections of the order store 200 onto two or more separate secondary pallets PAL21-PAL23 (three secondary pallets are shown in FIG. 7 for exemplary purposes only). These secondary pallets PAL21-PAL23 include goods CU assigned to predetermined shopping aisles and are moved into the respective predetermined shopping aisles for unloading (see FIG. 7). With the secondary pallets PAL21-PAL23 in the respective shopping aisle, the goods CU from the secondary pallets PAL21-PAL23 are distributed onto assigned shelves 733.

Figure 8:
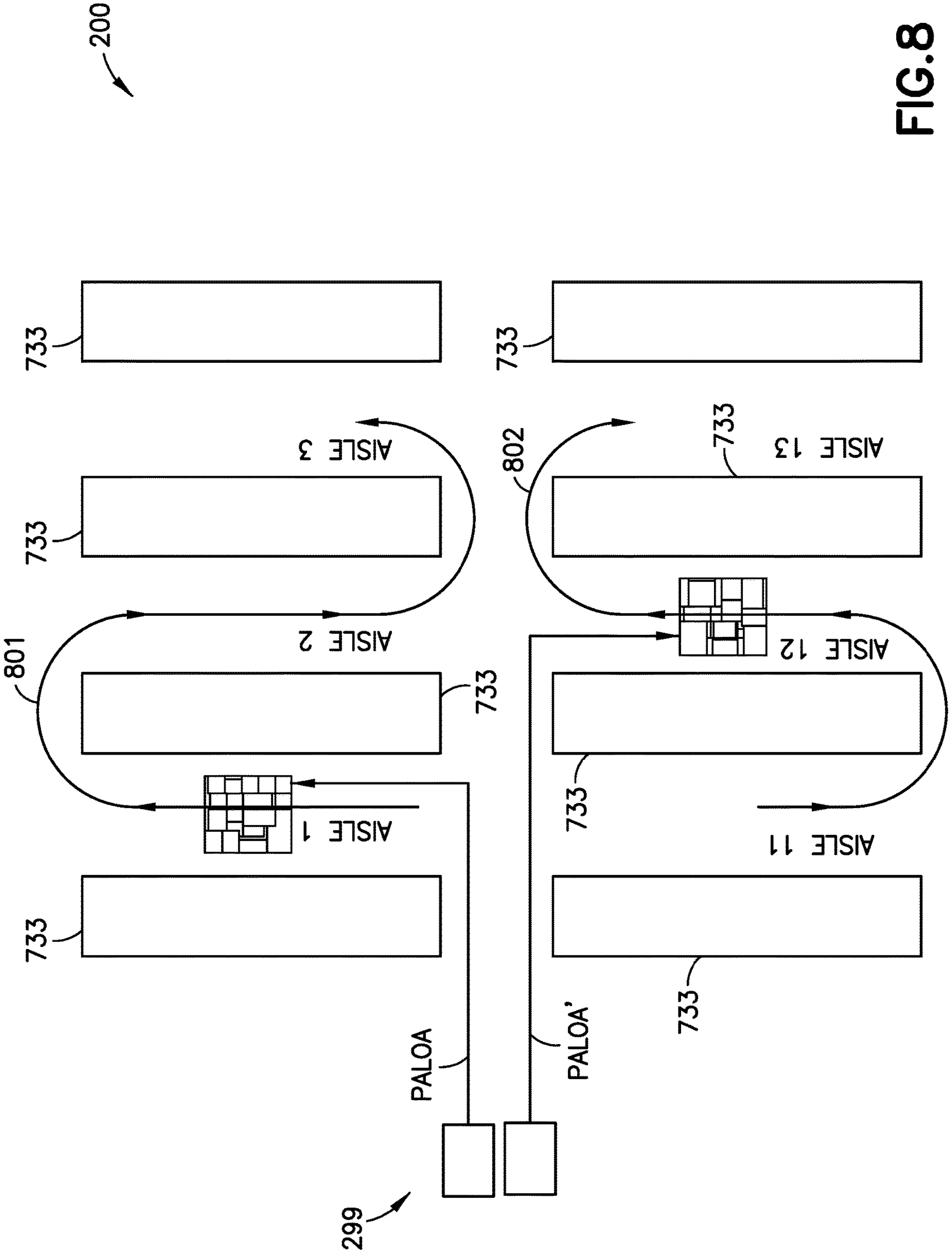
FIG. 8 is an exemplary a schematic illustration of a merchant pallet load packages distribution in accordance with aspects of the present disclosure.

Referring to FIG. 8, another example of handling pallet loads PALO may be referred to as an "adjacent aisle pallet load packages distribution method" and includes moving whole pallet loads PALOA, PALOA' (e.g., without downstacking of the pallet) into the shopping aisles. With the pallet loads PALOA, PALOA' in the shopping aisles, goods CU are distributed substantially directly from the pallet load(s) PALOA, PALOA' to the assigned shelves 733 (see FIG. 8). Here, the goods are arranged on the pallet load(s) PALOA, PALOA' so as to minimize a travel distance of each pallet load PALOA, PALOA' within the store and to substantially avoid a return of the pallets PALOA, PALOA' to aisles which the corresponding pallets have previously visited (e.g., the pallet passes through an aisle only once along a predetermined path 801, 802). The goods CU may be arranged on the pallet load PALO, PALOA' according to a path of travel 801, 802 of the respective pallet load PALOA, PALOA' through the shopping aisles.

Figure 9:
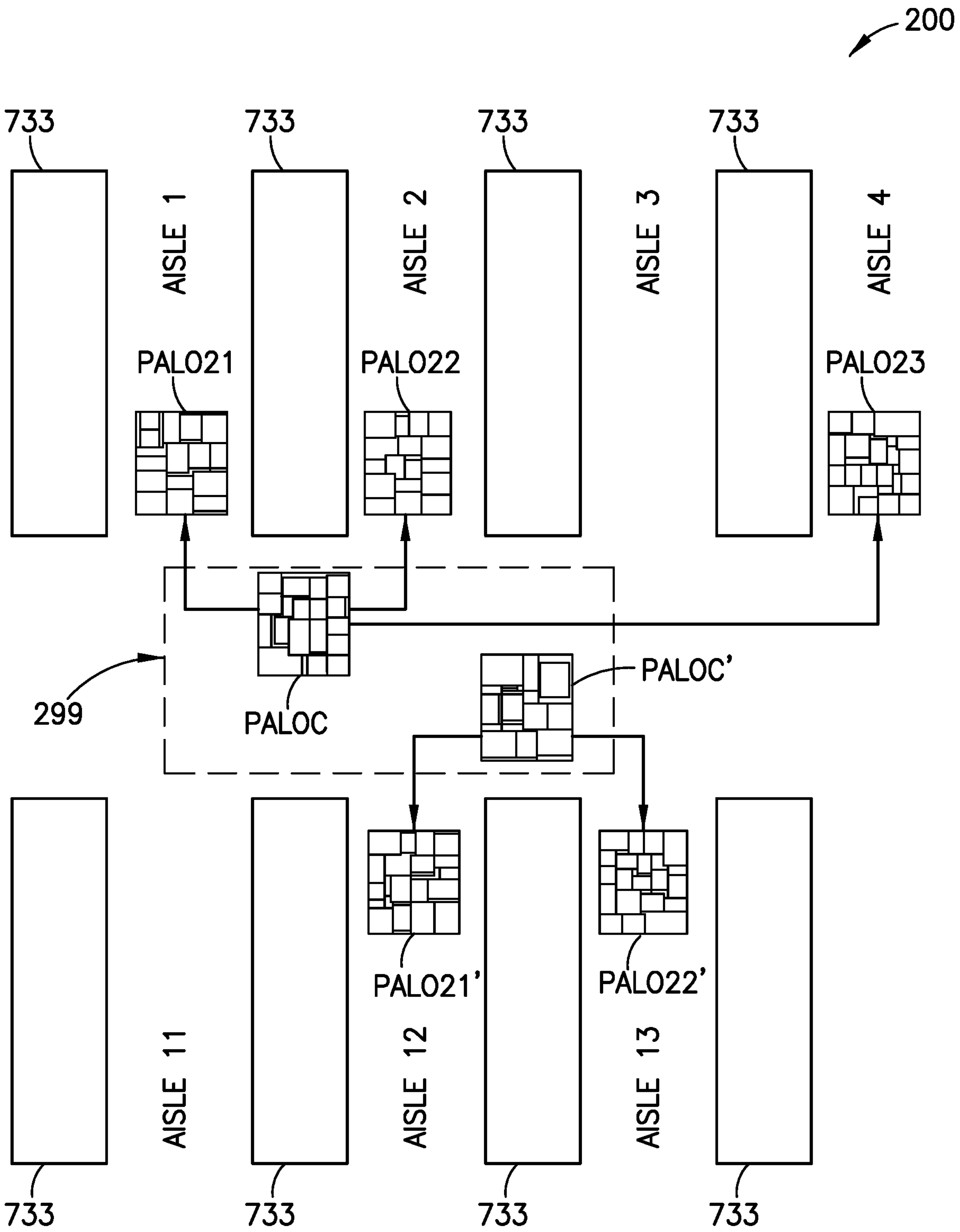
FIG. 9 is an exemplary a schematic illustration of a merchant pallet load packages distribution in accordance with aspects of the present disclosure.

Referring to FIG. 9, still another example of handling pallets PALO may be referred to as a "mixed mode clustered and adjacent aisles pallet load packages distribution method" and includes a combination of the above handling methods. With reference to FIG. 9, the pallet loads PALOC, PALOC' arrive at the order store 200 in trucks (or other suitable conveyance) from the warehouse/distribution center 199. The pallet loads PALOC, PALOC' are moved (without downstacking the pallets) into the shopping area in a general vicinity of the shelves to which the goods CU on the pallet loads PALOC, PALOC' are assigned. With the pallet loads PALOC, PALOC' generally located near the assigned shelves, the pallet loads PALOC, PALOC' are downstacked into respective secondary pallets PALO21, PALO22, PALO23, PALO21', PALO22' that are assigned to respective shopping aisles. Here, the pallet loads PALOC, PALOC' are built so that each pallet load PALOC, PALOC' includes goods belonging/assigned to store aisles that are close to one another (e.g., pallet load PALOC includes goods that are located in aisle 1, aisle 2 (which is adjacent to aisle 1), and aisle 4 which is but one aisle away from aisle 2; similarly pallet load PALOC' includes goods that belong/assigned to adjacent aisles 12 and 13). The goods CU may also be arranged in the respective pallet load PALOC, PALOC' such that the pallet structure corresponds with the manner in which the goods are downstacked to the respective secondary pallets (e.g., such as a sequential downstacking where, for example, goods assigned to secondary pallet PALO21 are on the top of the pallet structure of pallet load PALOC, goods assigned to secondary pallet PALO22 are in the middle of the pallet structure of pallet load PALOC, and goods assigned to secondary pallet PALO23 are at the bottom of the pallet structure of pallet load PALOC). In this aspect, the aisles to which the goods CU are assigned may not be arranged along a respective specific path (see, e.g., paths 801, 802 in FIG. 8) for unloading goods CU of a respective pallet load PALO, PALO' onto the store shelves.

The above-described examples of pallet handling/downstacking methods in the order store 200 are exemplary only. It is again noted that the pallet loads PALOC, PALOC', PALOA, PALOA' for each of the pallet handling/downstacking methods are generally referred to herein as pallet loads PALO. It is also noted that the pallet load(s) PALO may be built in any suitable manner by the automated storage and retrieval system 100 so that the goods on the pallet load(s) PALO are arranged according to any suitable at least one order pallet to order store affinity characteristic (which may be inclusive of goods arrangement based on product type, product structural characteristics, etc.) for the pallet load packages distribution methods described herein. It is noted that the store affinity pallet load resolution (as described herein) is decoupled from the storage array 130SA disposition and material handling system 190 throughput of cases CU to the palletizer 162. Here, the output of cases CU from the storage array 130SA by the automated transport system 277 is selected to conform to or otherwise depends on (is based on) the store affinity pallet load resolution. In one or more aspects, the throughput of cases CU output by the material handling system 190 may be effected in a manner similar to that described in U.S. patent application Ser. No. 17/091,265 filed on Nov. 6, 2020 and titled "Pallet Building System with Flexible Sequencing," the disclosure of which is incorporated herein by reference in its entirety. In accordance with the aspects of the present disclosure, the case CU disposition within the storage array 130SA may be freely optimized for optimum throughput separate from resolution and building of the store affinity pallet load PALO. An example of throughput optimization can be found in U.S. Pat. No. 9,733,638 issued on Aug. 15, 2017 and titled "Automated Storage and Retrieval System and Control System Thereof," the disclosure of which is incorporated herein by reference in its entirety.

As an example, of product group set PGSA-PGSn formation/generation, and referring to FIGS. 3A, 4A-4C, 5A-5F, and 6, the controller may dynamically assign product group set PGSA to storage levels 130L1, 130L2, 130L3 based on any suitable criteria, such as a customer identity. Referring to FIG. 6, every item/stock keeping unit (e.g., case unit CU or warehouse pack WHPK and the stock keeping units SKU held therein) entered into picking stock in the storage array 130SA is assigned a merchant category (personal hygiene, housewares, cleaners, etc.) and a merchant department number that arise as properties of the pick order. In FIG. 6, SKU (stock keeping unit) represents the identity of the case unit CU, WHPK/VNPK is the vendor packs required for each SKU for a batch (e.g., consolidated orders 299C) of orders 299, DEPT is the customer department number, and CAT is the merchandise category. Based on the properties of the pick order (e.g., merchant category and merchant department number) the case units CU are divided into product groups as described below. As will be described below, the vendor packs required for each item is a metric employed by the controller 120 in combination with a known number of vendor packs required for a batch of orders (e.g., customer orders are consolidated into a batch—see FIG. 2) to distribute the vendor packs BPG within the case units CU substantially equally between storage levels 130L based on a constraint that one merchandise category or one department cannot be distributed to multiple levels.

Warehouse packs CU having merchandise categories A, B are assigned (e.g., based on the mergeability of the merchandise categories) to product groups PGA, PGB, on storage level 130L1. Warehouse packs CU having merchandise categories B, C are assigned (e.g., based on the mergeability of the merchandise categories) to product groups PGB, PGC on storage level 130L2. Warehouse packs CU having merchandise categories D are assigned (e.g., based on the mergeability of the merchandise categories) to product groups PGD on storage level 130L3. The controller 120 is configured to effect workgrouping (e.g., forming the product group sets PGSA-PGSn) in any suitable manner, such as in the exemplary manner illustrated in FIGS. 4A-4C.

Figure 4A:
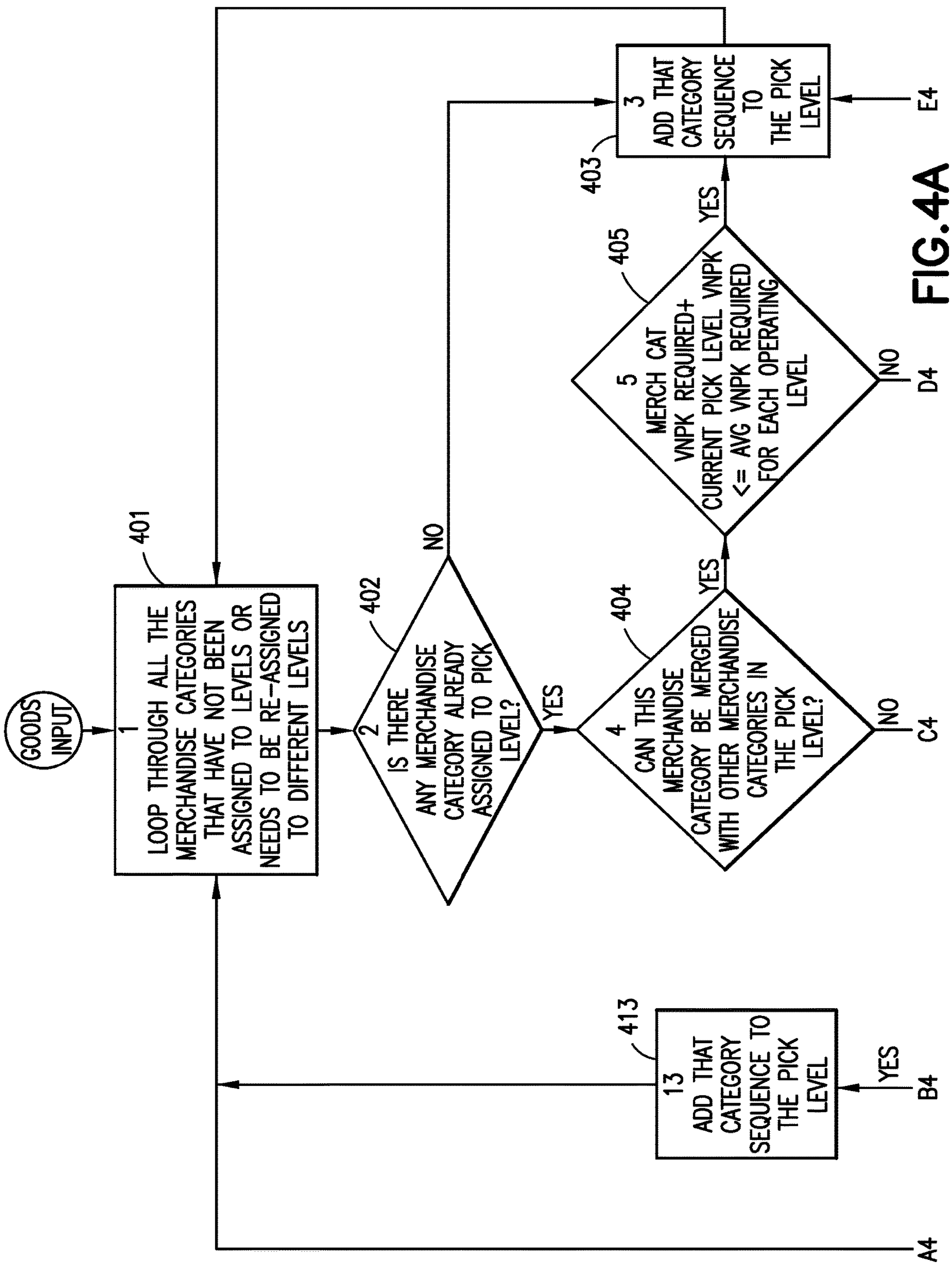
FIGS. 4A-4C are an exemplary flow diagram for product group set formation with the automated storage and retrieval system of FIG. 1A in accordance with aspects of the disclosed embodiment.

As an example, the goods input includes case units CU A, B, B', C, and D, where case unit A belongs to merchandise category A, case units B, B' belong to merchandise category B, case unit C belongs to merchandise category C, and case unit D belongs to merchandise category D (see also FIGS. 5A-5G, where A, B, B', C, and D not only represent merchandise categories but also a case unit of that merchandise). The controller 120 is configured to loop through/determine all case units CU of merchandise categories of a goods input (e.g., here, merchandise categories A-F) that have not been assigned to levels or that need to be reassigned (e.g., see FIG. 2) to different levels (FIG. 4A, Block 401). The controller 120 also determines, for a given pick level 130L, if there are already merchandise categories assigned to a respective pick level 130L (FIG. 4A, Block 402). Where the pick level 130L does not have any merchandise categories assigned to the pick level, the controller assigns the merchandise category to the pick level (FIG. 4A, Block 403). For example, storage level 130L1 is determined by the controller not to have a merchandise category associated with it and the case unit for merchandise category A is assigned to storage level 130L1 by the controller 120 (see FIGS. 5A and 5B) and the controller returns to FIG. 4A, Block 401.

Where a merchandise category does exist on a storage level 130L (FIG. 4A, Block 402), the controller 120 determines if a merchandise category of the goods input can be merged with the merchandise categories of the pick level (FIG. 4A, Block 404). For example, merchandise category A is assigned to pick level 130L1 and the controller 120 is making a level assignment for merchandise category/case unit B of the goods input. Here, the controller 120 determines (e.g., based on the criteria described herein) that merchandise category/case unit B is mergeable with merchandise category A. The controller 120 determines (FIG. 4A, Block 405) if the number of required breakpack goods/vendor packs (VNPK RQD) in the case units of merchandise category B for a batch of orders (i.e., combined customer orders) plus the number of breakpack goods BPG of merchandise category B already in existence on the storage level 130L1 (VNPK CURRENT) is less than or equal to the predetermined average vendor pack for each storage level (AVG VNPK) (see EQ. 1 below).

VNPK RQD+VNPK CURRENT<=AVG VNPK* [EQ. 1]

Here, the average vendor pack may be referred to as a threshold that is defined as:

AVG VNPK=(CO ORD×BPG CASE)/NUM LVLS [EQ. 2A]

where, CO ORD is the number of case units CU ordered, BPG CASE is the number of breakpack goods per case unit, and NUM LVLS is the number of storage levels; or

AVG VNPK=TTL CASES/TTL NUM VNPK [EQ. 2B]

where, TTL CASES is the total number of case units in storage for a given breakpack good and TTL NUM VNPK is the total number of the given breakpack goods BPG in storage. The required breakpack goods/vendor packs (VNPK RQD) is equal to the Total warehouse Pack Quantity Ordered (TWPQO) for an Item divided by the Warehouse Pack per Vendor Pack for item (WPVP) as shown in EQ. 3 below.

VNPK RQD=TWPQO/WPVP* [EQ. 3]

Where EQ. 1 is satisfied the controller adds the case unit for merchandise category (which in this example is merchandise category/case unit B) to the storage level (which in this example is storage level 130L1) (FIG. 4A, Block 403—see FIGS. 5B and 5C) and the controller returns to FIG. 4A, Block 401.

* As noted previously, and with respect to EQ. 1 and EQ. 3 above, and as may be realized, the average vendor pack is a dynamic factor that floats depending on orders filled by each transport channel and new orders received (e.g., the order(s) demand per transport channel versus the transaction output per channel) to effect dynamic restoration of balanced transactions With respect to merchandise category B, there may be another case unit B' that is to be assigned to the storage levels. Where EQ. 1 is not satisfied, the controller 120 determines if the merchandise category being assigned is the last merchandise category eligible to be merged into the workgroup (FIG. 4B, Block 406) (which in this example is the workgroup made of the product groups/merchandise categories of storage level 130L1). If the merchandise category being assigned is the last merchandise category eligible to be merged into storage level 130L1 (FIG. 4B, Block 406) then the merchandise category being assigned is assigned to storage level 130L1 (FIG. 4A, Block 403) and the controller returns to FIG. 4A, Block 401 (see FIG. 5C). Where the merchandise category being assigned is not the last merchandise category eligible to be grouped with the merchandise categories on storage level 130L1 (FIG. 4B, Block 406) the controller 120 determines if the merchandise category being assigned can be merged with other merchandise categories that have not been assigned to a pick level (FIG. 4B, Block 407—e.g., in the example provided, merchandise category B can also be merged with unassigned merchandise category C). Where the merchandise category being assigned is mergeable with an unassigned merchandise category, the controller 120 determines (see FIG. 4B, Block 409) if:

VNPK ADDED+VNPK CURRENT<=AVG VNPK+VAR [EQ. 4]

where VAR is a predetermined percentage the average vendor pack AVG VNPK can be increased for a given storage level. VAR may be the same for one or more storage levels 130L and/or different for one or more other storage levels 130L. Where EQ. 4 is satisfied the case unit B' is added to the storage level 130L (FIG. 4A, Block 413—see FIG. 5C). Where EQ. 4 is not satisfied, the merchandise category being assigned (in this example, merchandise category B and case unit B') is assigned to the next available storage level (FIG. 4C, Block 410—see FIG. 5D).

Figure 4B:
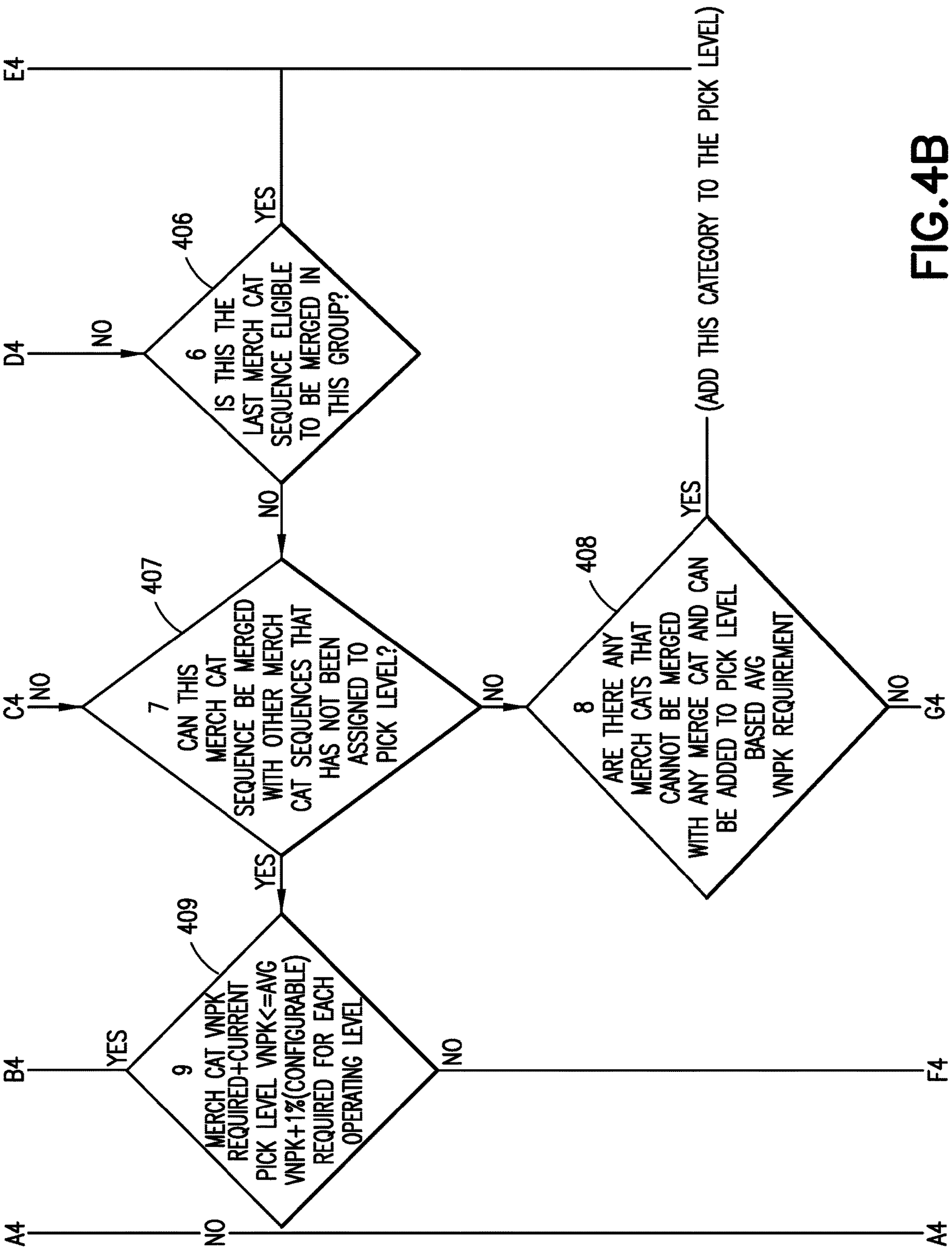
Figure 5A:
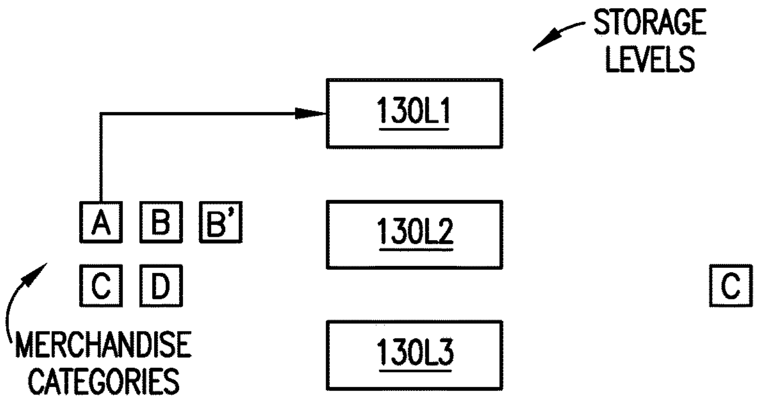
FIGS. 5A-5F are schematic illustrations of the method of FIGS. 4A-4C in accordance with aspects of the disclosed embodiment.
Figure 5B:
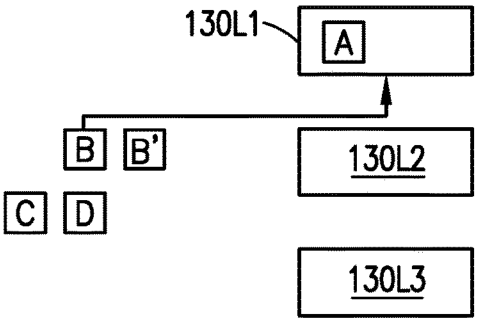
Figure 5C:
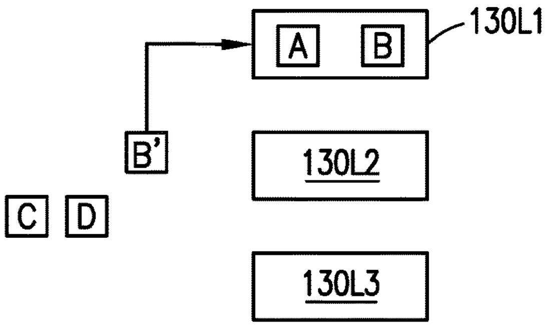
Figure 5D:
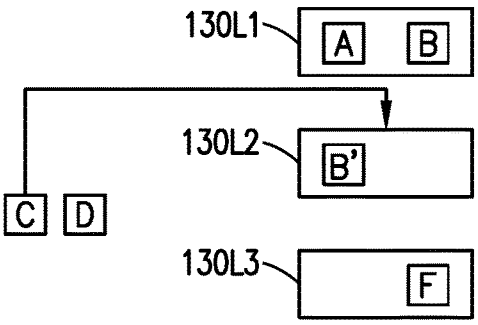
Figure 5E:
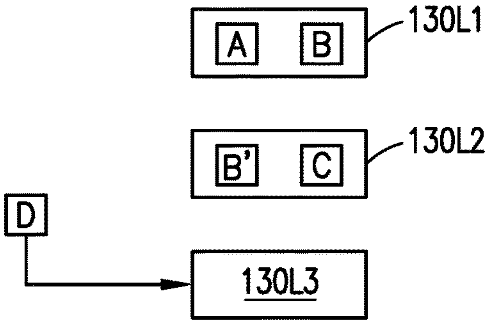
Figure 5F:
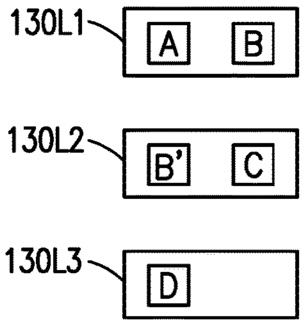

Where, the merchandise category being assigned is not mergeable with an unassigned merchandise category (FIG. 4B, Block 407), such as for example merchandise category C is not mergeable with merchandise category D, the controller 120 determines if the merchandise category cannot be merged with any other merchandise categories and can be added to a pick level based on the average vendor pack requirements (FIG. 4B, Block 408). Where the un-mergeable merchandise category C can be added to a pick level (such as pick level 130L2) in accordance with the average vendor pack requirements, the un-mergeable merchandise category is added to that pick level (FIG. 4A, Block 403—see FIGS. 5D and 5E).

With respect to merchandise category/case unit D, for exemplary purposes only, merchandise category D cannot be merged with other merchandise categories assigned to a storage level (FIG. 4A, Block 404), cannot be merged with a merchandise category not assigned to a storage level (FIG. 4B, Block 407), and cannot be added to a storage level based on the average vendor pack requirements (FIG. 4B, Block 408). Here, the controller assigned merchandise category/case unit D to the next storage level (which in this example is storage level 130L3).

Figure 4C:
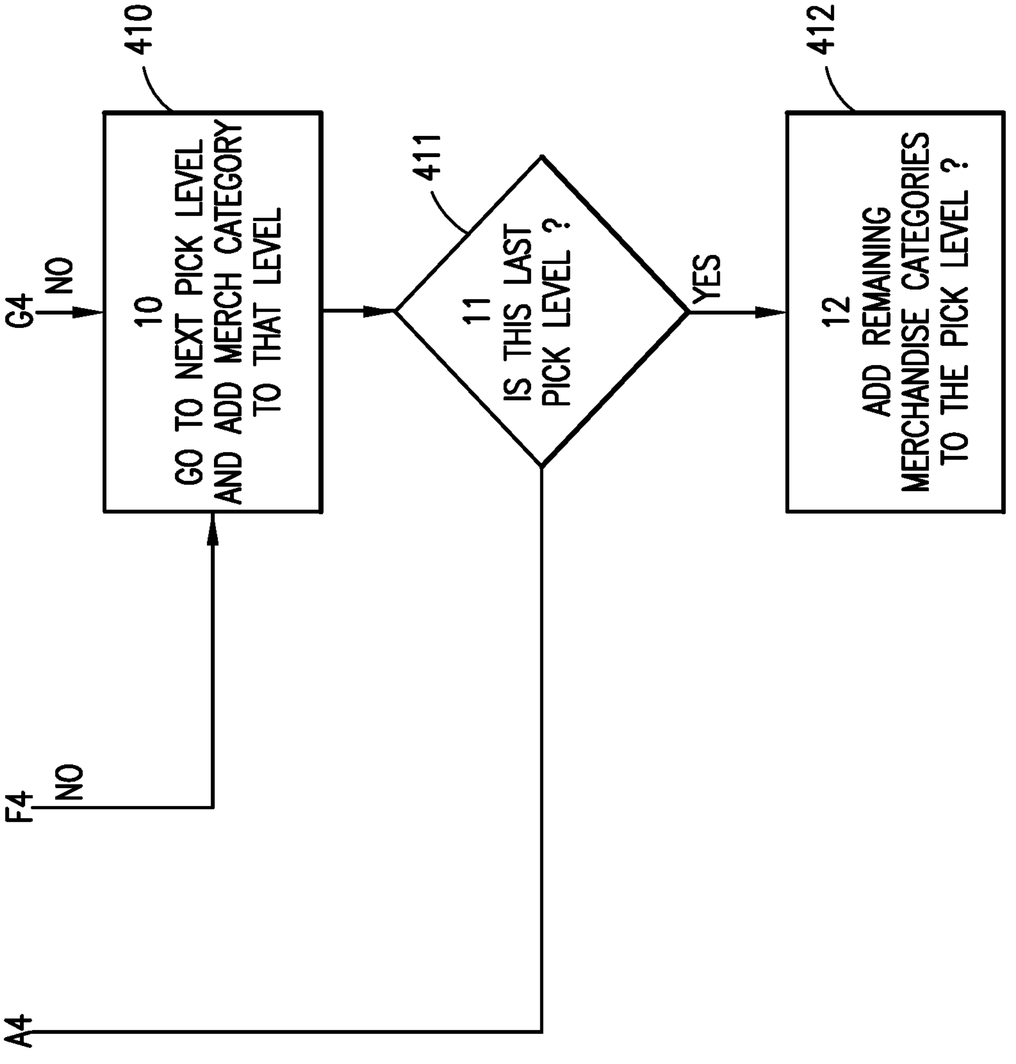

In FIG. 4C, Block 411, the controller 120 determines if the storage level to which the merchandise category was assigned in FIG. 4C, Block 410 is the last storage level. If it is not the last storage level the controller 120 returns to FIG. 4A, Block 401. If it is the last storage level the controller 120 assigns the remaining merchandise categories to the last pick level (FIG. 4C, Block 412).

With the product group sets PGSA-PGSn generated, the automated transport system 277 transports the warehouse packs CU to the allocated storage spaces 130S of the allocated storage levels 130L for customer order fulfillment. With the product groups PGA-PGs of the product group sets PGSA-PGSn disposed in the storage array 130SA, the controller 120 is also configured to allocate each resolved product group set PGSA-PGSn to the at least one transport channel 260A-260*n* for retrieval and output, via the at least one transport channel 260A-260*n*, of product units BPG forming the product group set PGSA-PGSn into order containers of mixed product units, wherein the product group set PGSA-PGSn is allocated so as not to exceed a predetermined threshold (e.g., the average vendor pack requirements of EQ. 2A or EQ. 2B) of product units transported via the at least one transport channel 260A-260*n*. For example, as customer orders 299 are received and fulfilled, the controller 120 effects operation of the asynchronous transport systems 255A associated with respective product group sets PGSA-PGSn so that each transport channel 260A-260*n* retrieves and outputs ordered products orthogonally to each other transport channel 260A-260*n*.

As an example of orthogonal output of the transport channels 260A-260*n*, the products output by each transport channel 260A-260*n* is orthogonally output as an output product set. The output product set of each transport channel 260A-260*n* is a closed set of merged merchandise categories (e.g., product groups), that are closed within the respective transport channel 260A-260*n* such that the closed set of merged merchandise categories is decoupled from and will not incorporate any merchandise categories/product from any other output product set of any other transport channel 260A-260*n*. The output product set of each transport channel may be referred to as an output stream of product where the stream from one transport channel 260A-260*n* is not dependent from, will not incorporate, and will not cross with any other stream from any other transport channel 260A-260*n*.

Figure 10:
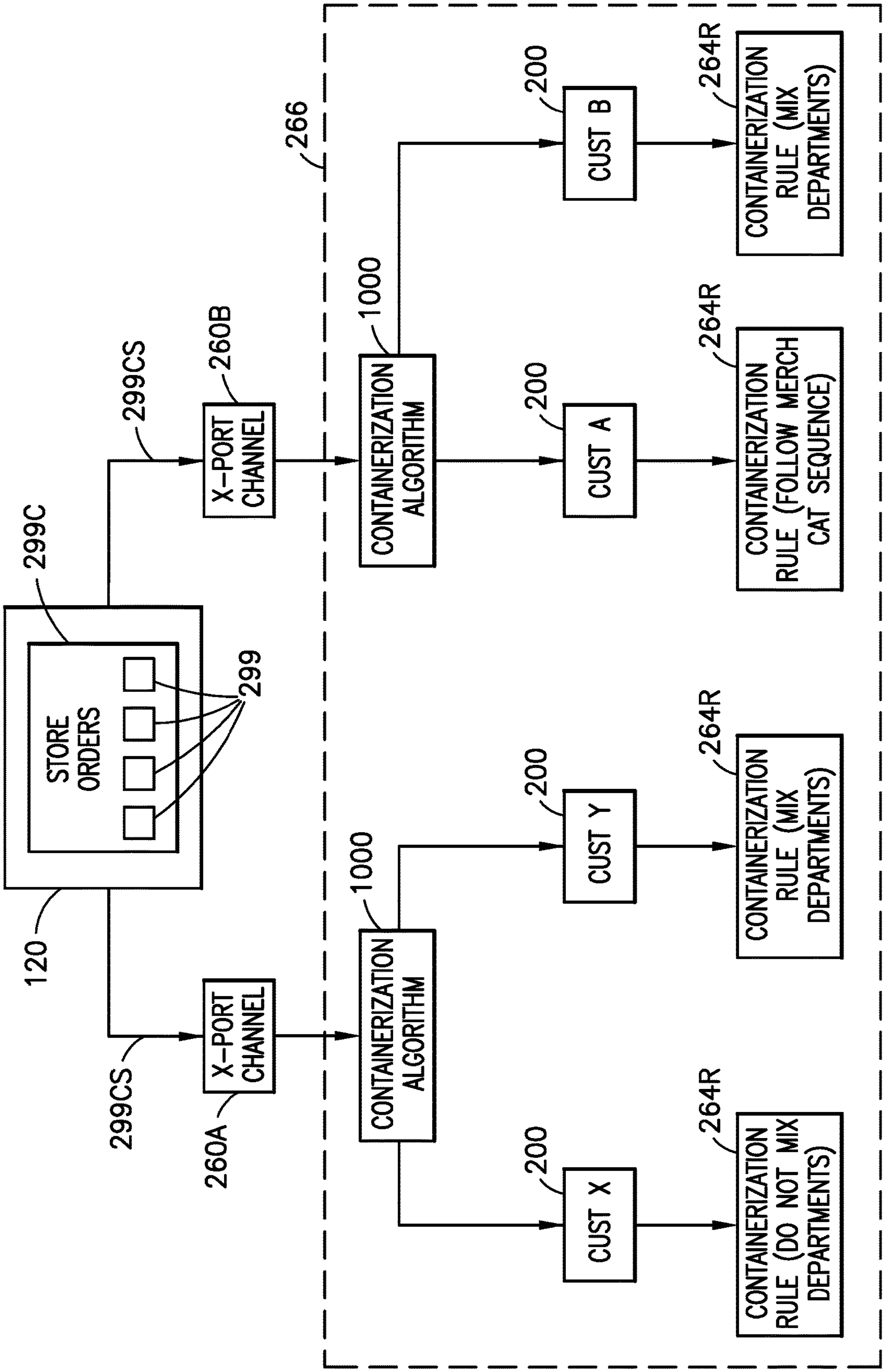
FIG. 10 is a schematic illustration of containerization flow through the automated storage and retrieval system of FIG. 1A in accordance with aspects of the disclosed embodiment.

Referring to FIG. 10, with the product group sets PGSA-PGSn resolved and the product groups PG, PGA-PGn arranged in the storage array 130SA (see, e.g., FIGS. 2, 3A, and 5A-5F), the controller 120 effect containerization of the mixed product units in accordance with the individual store/customer 200 orders 299. As can be seen in FIG. 10, customer orders 299 (four customer orders are illustrated as being batched as consolidated order 299C and correspond to the orders of customers X, Y, A, and B also illustrated in FIG. 10) are received in/by the controller 120. It is noted that the containerization of the product units of an order 299C is performed virtually by the controller 120 prior to transport of the product units from storage. With the containerization of the product units virtually planned the controller 120 effects sequencing of the product units (as described herein) for transport and physical containerization according to the predetermined containerization plan.

To effect containerization planning, the controller 120 splits the consolidated order 299C into waves or order segments 299CS, each segment corresponding to one or more customers and being operated on by a respective transport channel 260A, 260B. The consolidated order 299C may be split based on any suitable criteria, such as for example, a comparison between one or more of product groups included in the order for each customer, the product groups arranged in the storage array 120SA, and store planogram for the customer store.

With the consolidated order 299C split into order segments 299CS, the controller applies any suitable containerization algorithm to the order segments 299CS. Examples of containerization algorithms include, but are not limited to, a first fit algorithm and a best fit algorithm. With respect to the first fit algorithm, the controller 120 plans placement of product in a container (e.g., such as the breakpack goods container 264) in any suitable predetermined order/fill sequence (which order/fill sequence includes, as described below, but is not limited to sequencing based at least in part on rules that arrange products in the container according to product type characteristics (e.g., caustics below non-caustics, etc.) and/or product structural characteristics (e.g., with least fragile products on the bottom of the container) until a next item in the predetermined order does not fit in the container. Here, the controller 120 closes the container (even if the container is not full) and places the next item in the next subsequent container. With respect to the best fit algorithm the controller plans placement of product in a container in any suitable predetermined order/fill sequence until the container is filled. The containerization algorithms may be specified by customer 200, in which case the specified containerization algorithm is also considered when splitting the consolidated order 299C into order segments 299CS.

The controller 120 plans, for execution at the breakpack station 266, products in the order segments 299CS to be allocated to a respective customer 200. Here, breakpack goods/vendor packs BPG are removed from case units/warehouse packs CU and transported by the goods bots 262 to breakpack containers 264 (disposed at the putwall 263W) (see FIG. 1A) in accordance with containerization rules 264R. The containerization rules 264R include, but are not limited to placing products into the breakpack goods containers 264 in accordance with one or more of: an affinity of one product to the another (e.g., as described herein with respect to store planogram), item/product characteristics (e.g., product type-food items should not be mixed with caustics, caustics are placed below non-caustics, least fragile products on the bottom of the container, etc.), item pick eligibility and pick station rates (e.g., manual versus robotic picking), a customer specified product grouping sequence, and segregation of departments (e.g., products of a department in a store are not mixed with products another departments in the store). As noted above, the output of the transport channels 260A-260*n* is orthogonal such that the different transport channels 260A-260*n* and the different customer containerizations of the different transport channels may employ different containerization rules, e.g., based on customer order requirements. It is also noted that the breakpack goods containers 264 may include different types of containers that are placed at the pick wall (e.g., leak-proof containers, vented containers, etc.), where product units are placed in the different types of containers based on, for example, customer requirements and/or product group requirements (e.g., caustic goods are placed in a leak-proof container, while foodstuffs are placed in a vented container to maintain freshness).

Referring also to FIGS. 11A-11D, an exemplary containerization (also referred to as cartonization) process will be described. The controller 120 is configured optimize the containerization of the ordered (e.g., three-dimensional) products in a manner that can be configured differently for different automated storage and retrieval systems 100 and for different customers 200 of the respective automated storage and retrieval systems 100. Containerization is a process of grouping/arranging ordered products in bounded regions (e.g., the containers 264) to minimize associated costs with placing the products in the containers 264.

Figure 11A:
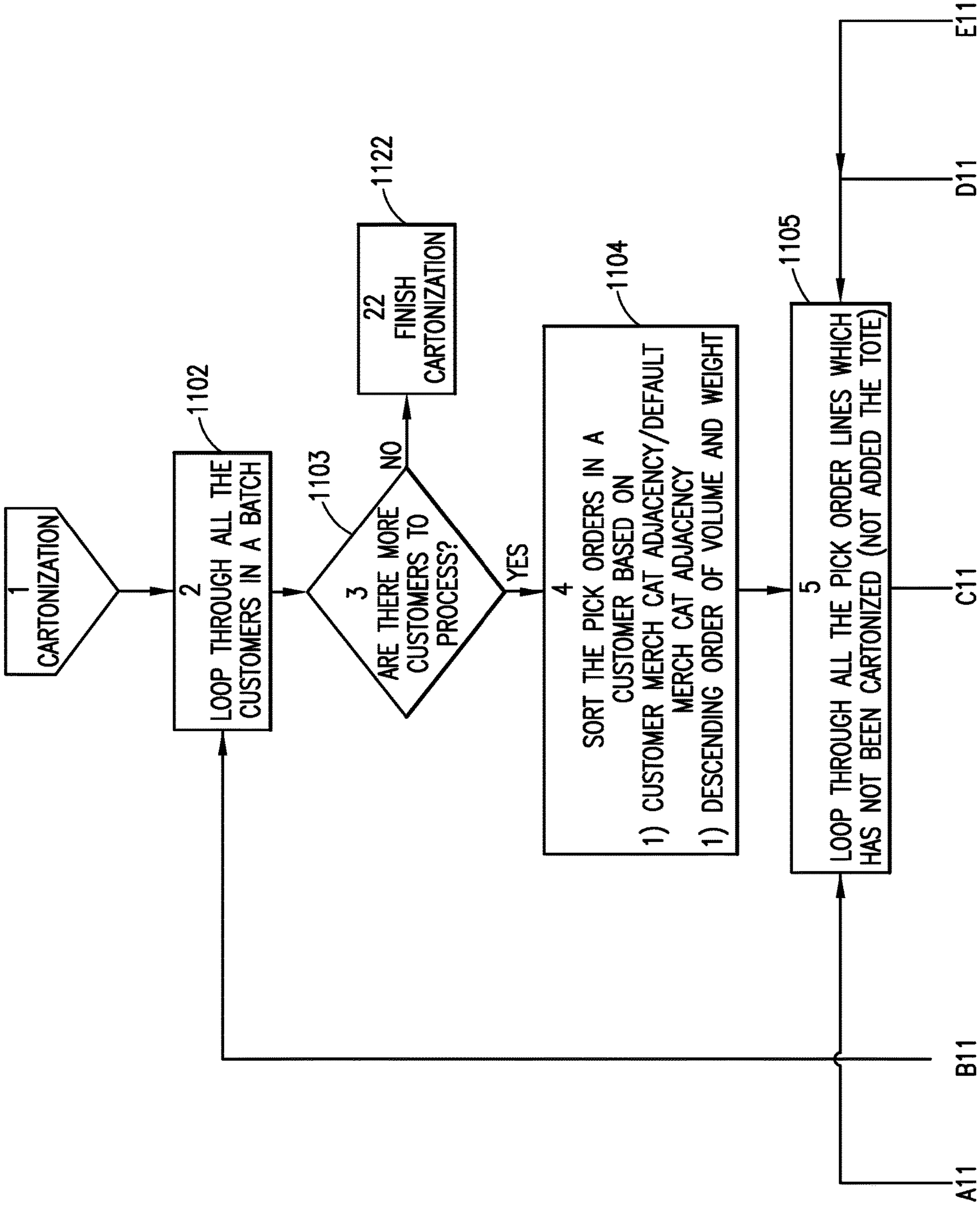
FIGS. 11A-11D are an exemplary flow diagram for product containerization with the automated storage and retrieval system of FIG. 1A in accordance with aspects of the disclosed embodiment.

The controller 120 is configured to loop through all the customers 200 whose orders are batched together in the consolidated order (FIG. 11A, Block 1102). For example, referring also to FIG. 10, the controller 120 determines that the consolidated order 299C includes product units ordered by customers X, Y, A, B. The controller 120 determines if any of the customers X, Y, A, B, have ordered product units that remain to be processed (FIG. 11A, Block 1103). If all of the ordered product units for all of the customers have been processed the containerization process is complete (FIG. 11A, Block 1122). In this example, product units for customers X, Y, A, B remain to be processed so the controller 120, for each customer X, Y, A, B, sorts the pick orders (e.g., ordered product units) for a respective customer (using for example, customer X) based on customer merchandise category adjacency (or a default customer merchandise category adjacency where the customer does not specify adjacency) and a descending order of product unit volume and weight (FIG. 11A, Block 1104).

Figure 11B:
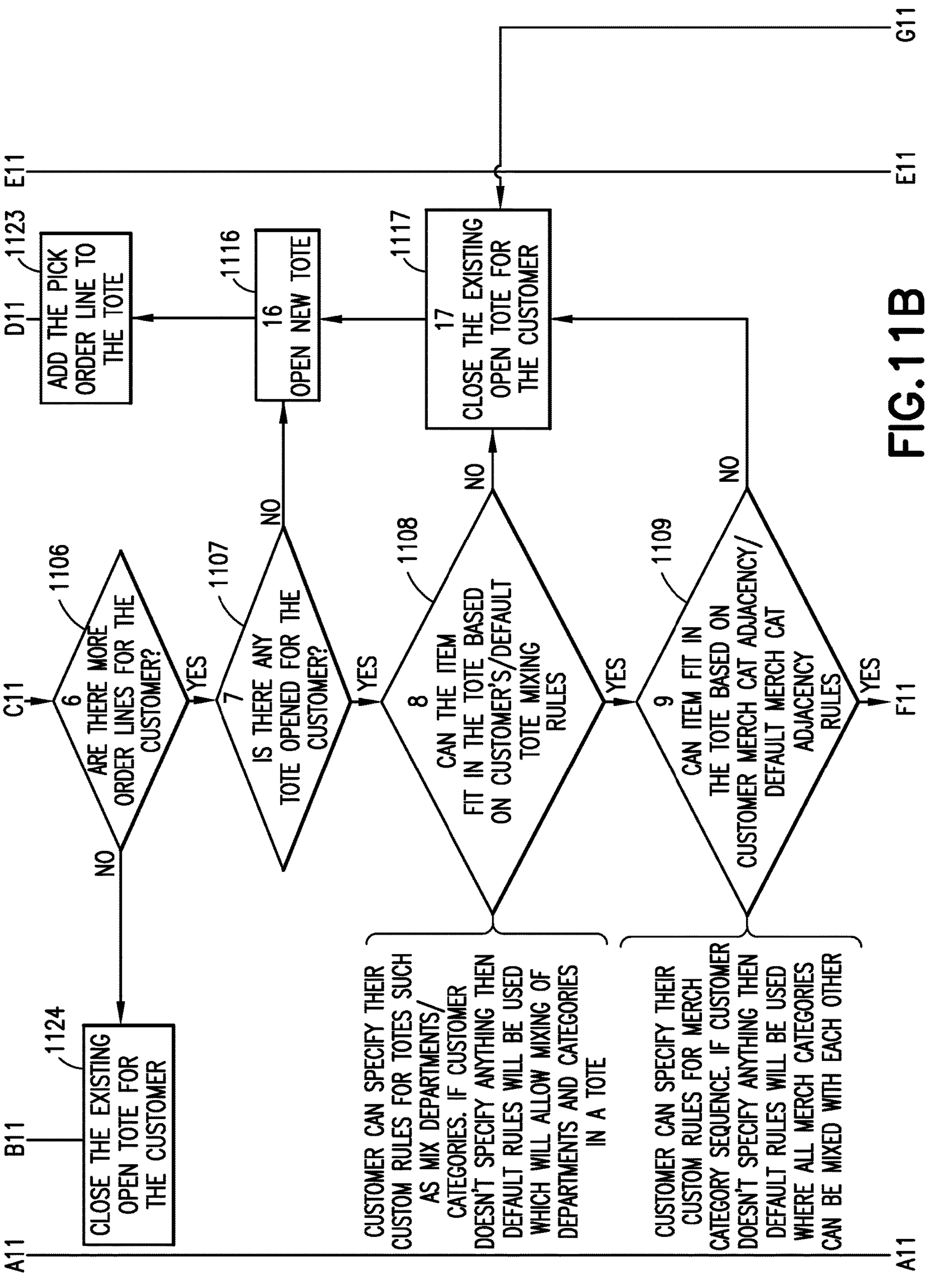
Figure 11C:
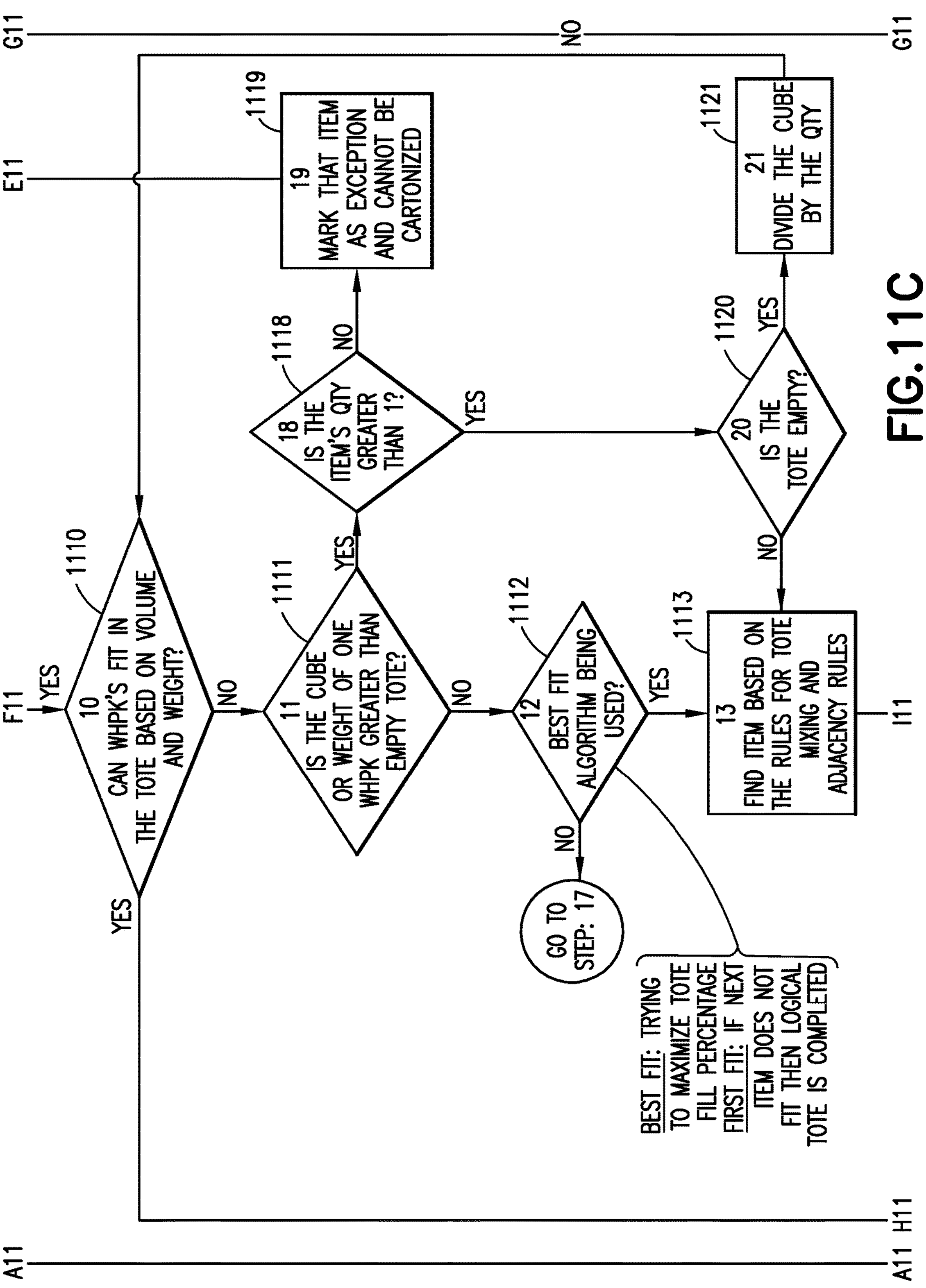
Figure 11D:
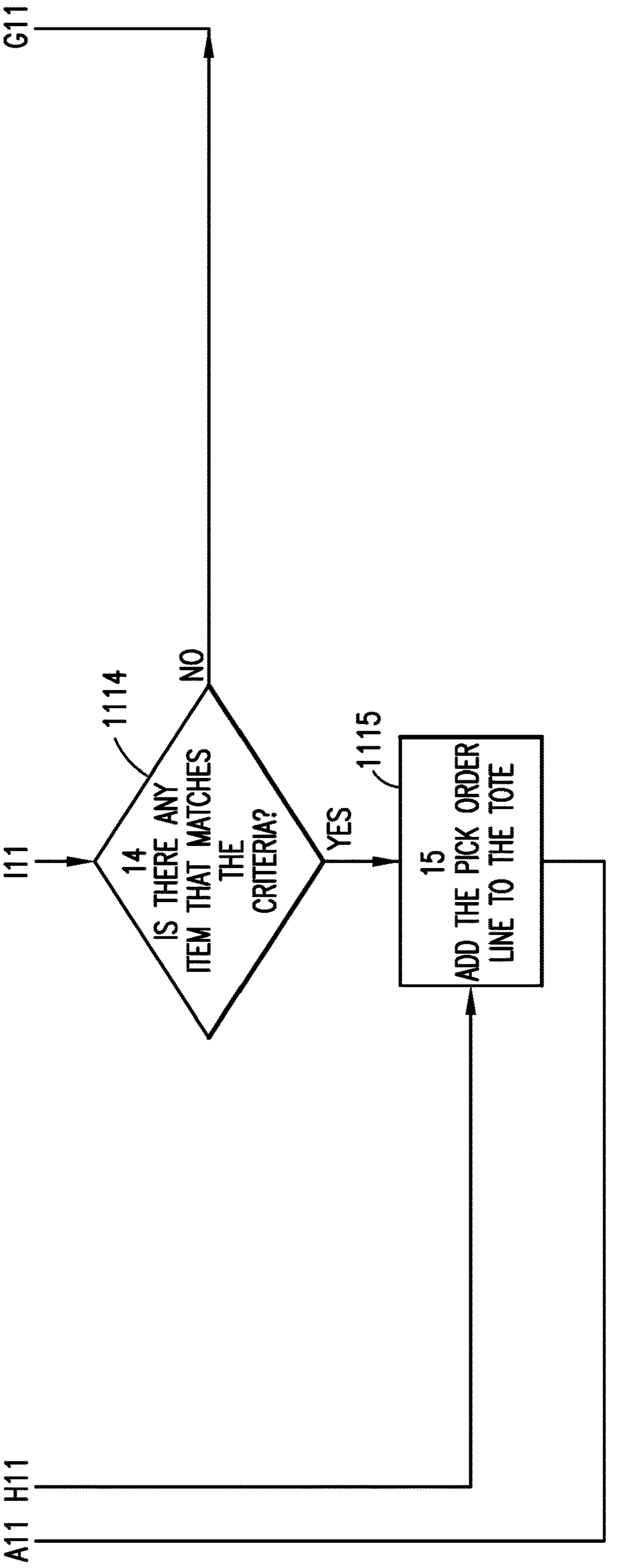

The controller 120 loops (sequentially) through the pick order lines (e.g., items in the customer order) which have not been containerized (FIG. 11A, Block 1105) and determines whether there are any unprocessed order lines, in the sequence of order lines, remaining (FIG. 11B, Block 1106). Where there are no additional order lines for the customer (such as customer X), the controller 120 closes any existing open container 264 for the customer (FIG. 11B, Block 1124) and returns to Block 1102 for processing the ordered product units for remaining customers (e.g., customers Y, A, B). Where there are order lines that remain to be processed for, e.g., customer X the controller 120 determines if there are any open containers 264 assigned to the customer (FIG. 11B, Block 1107). Where there are not any open containers the controller 120 opens/assigns a container 264 to the customer (FIG. 11B, Block 1116) and adds a next pick order line in the sequence of pick order lines to the container 264 (FIG. 11B, Block 1123) and returns to Block 1105 to process the next subsequent pick order line in the sequence of pick order lines for, e.g., customer X.

Where there is an open container 264 assigned to, e.g., customer X, the controller determines if the item corresponding to the pick order line can fit in the container 264 based on the customer product mixing rules (as described herein) or where no customer rules are specified, default product mixing rules (FIG. 11B, Block 1108). As noted above, customers can specify rules for containerization (e.g., mix departments, do not mix departments, mix product categories, do not mix product categories, etc. while considering any rules pertaining to product characteristics such as caustics product location relative to non-caustic product location within a container and the fragility of products,); however, if the customer does not provide/specify rules for containerization, a default product mixing rule (which may allow mixing of products for different departments and/or merchandise categories, e.g., considering product characteristics such as caustics product location relative to non-caustic product location within a container and the fragility of products) is applied to the containerization for that customer.

Where the product in the pick order line fits in the container 264, the controller determines whether the item fits in the container based on any customer specified merchandise category adjacency rule (or if no category adjacency is specified by the customer a default category adjacency rule is applied where merchandise categories are mixed with each other) (FIG. 11B, Block 1109). Where the product does not fit in the container 264 based on the customer or default merchandise category adjacency rule, the controller 120 closes the existing open container 264 for the customer (FIG. 11B, Block 1117), opens a new container 264 (FIG. 11B, Block 1116), and adds the product for the pick order line to the new container (FIG. 11B, Block 1123). The controller 120 proceeds to block 1105 for processing the next subsequent pick order line in the sequence of pick order lines.

Where the controller determines the product for the pick order line does fit in the container based on the customer specified (or default) merchandise category adjacency rule (e.g., and any rules pertaining to product characteristics such as caustics product location relative to non-caustic product location within a container and the fragility of products), the controller determines if a warehouse pack CU can fit in the container 264 based on volume and weight (FIG. 11C, Block 1110). Where the warehouse container CU can fit in the container, the controller adds the product for the pick order line to the container 264 (FIG. 11D, Block 1115) and returns block 1105 for processing the next subsequent pick order line in the sequence of pick order lines.

Where the controller determines a warehouse pack CU cannot fit in the container 264 based on volume and weight, the controller 120 determines whether the volume or weight of the warehouse pack CU is greater than the volume and weight of an empty container 264 (FIG. 11C, Block 1111). Where the volume or weight of the warehouse pack CU is greater than the volume or weight of an empty container 264, the controller determines if a quantity of the product in the order line is greater than one (FIG. 11C, Block 1118). Where the ordered quantity of the product is not greater than one, the controller 120 marks that product as an excepted product that cannot be containerized (FIG. 11C, Block 1119) and returns block 1105 for processing the next subsequent pick order line in the sequence of pick order lines.

Where the ordered quantity of the product is greater than one, the controller 120 determines if the container 264 is empty (FIG. 11C, Block 1120). Where the container 264 is empty, the controller 120 divides the volume of the container 264 by the quantity of the product order (FIG. 11C, Block 1121) and returns to block 1110. Where the container 264 is not empty, the controller 120 determines if there is a product in the container 264 that satisfies the product mixing and adjacency rules with respect to the product in the pick order line being analyzed (FIG. 11C, Block 1113 and FIG. 11D, Block 1114). Where there is a product in the container that satisfies the mixing/adjacency criteria, the controller 120 adds the product in the pick order line to the container 264 and returns block 1105 for processing the next subsequent pick order line in the sequence of pick order lines. Where there are no products in the container that satisfy the mixing/adjacency criteria, the controller 120 closes the existing container 264 for the customer (FIG. 11B, Block 1117), opens a new container 264 (FIG. 11B, Block 1116), and adds the product for the pick order line to the new container (FIG. 11B, Block 1123). The controller 120 proceeds to block 1105 for processing the next subsequent pick order line in the sequence of pick order lines.

Where the controller determines a warehouse pack CU cannot fit in the container 264 based on volume and weight (FIG. 11C, Block 1110), and determines the volume or weight of the warehouse pack CU is not greater than the volume and weight of an empty container 264 (FIG. 11C, Block 1111), the controller determines if the best fit algorithm is being employed to containerize the products (FIG. 11C, Block 1112). Where the best fit algorithm is employed, the controller 120 determines if there is a product in the container 264 that satisfies the product mixing and adjacency rules with respect to the product in the pick order line being analyzed (FIG. 11C, Block 1113 and FIG. 11D, Block 1114). Where there is a product in the container that satisfies the mixing/adjacency criteria, the controller 120 adds the product in the pick order line to the container 264 and returns block 1105 for processing the next subsequent pick order line in the sequence of pick order lines. Where there are no products in the container that satisfy the mixing/adjacency criteria, the controller 120 closes the existing container 264 for the customer (FIG. 11B, Block 1117), opens a new container 264 (FIG. 11B, Block 1116), and adds the product for the pick order line to the new container (FIG. 11B, Block 1123). The controller 120 proceeds to block 1105 for processing the next subsequent pick order line in the sequence of pick order lines. Where the best fit algorithm is not employed, the controller closes the existing container 264 for the customer (FIG. 11B, Block 1117), opens a new container 264 (FIG. 11B, Block 1116), and adds the product for the pick order line to the new container (FIG. 11B, Block 1123). The controller 120 proceeds to block 1105 for processing the next subsequent pick order line in the sequence of pick order lines.

Figure 12:
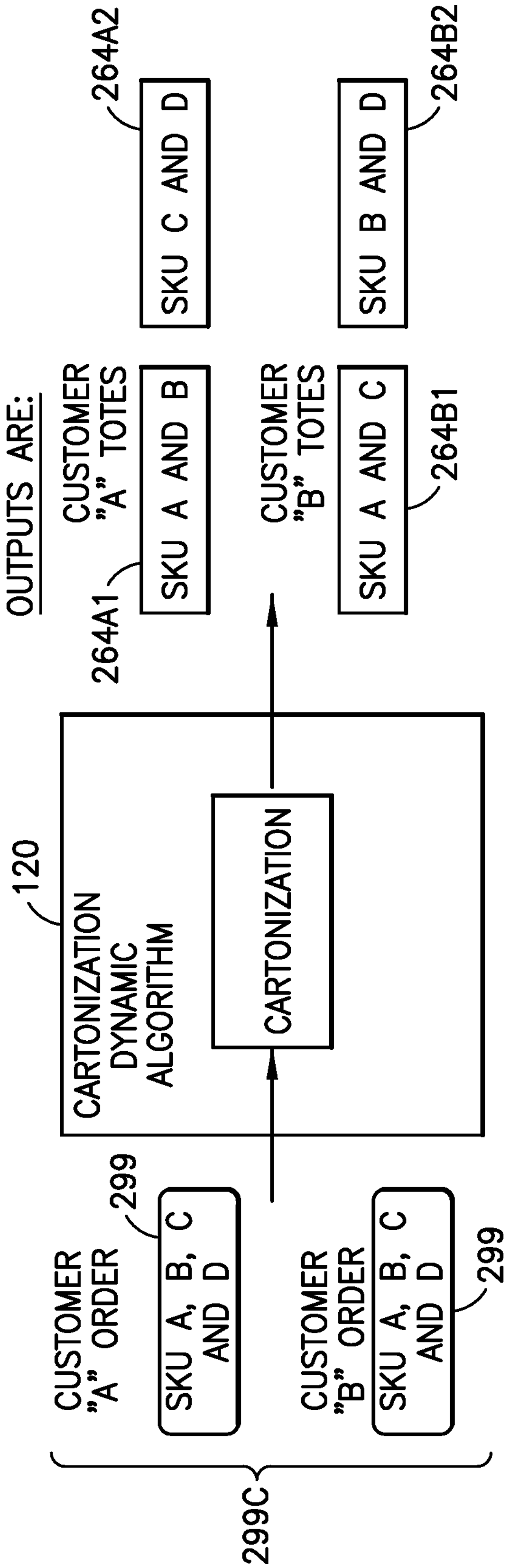
FIG. 12 is a schematic illustration of a containerization in accordance with the method of FIGS. 11A-11D in accordance with aspects of the disclosed embodiment.

As noted above, the filling of each container 264 for the ordered items is planned virtually by the controller in the manner described above. An exemplary containerization for products ordered by customers A and B is illustrated in FIG. 12. Here, both customer A and B place orders for products A, B, C, and D. The above-noted containerization process, described above with respect to FIGS. 11A-11C, is performed by the controller 120. Referring also to FIG. 10, an exemplary result of the containerization is illustrated in FIG. 12, where a best fit algorithm is employed, customer A specifies the containerization rule of following merchandise category sequence, and customer B specifies a mix departments containerization rule. Here, the containerization process provides containers 264A1, 264A2 in which the items ordered by customer A are placed (container 264A1 includes items A, B and container 264A2 includes items C, D). The containerization process also provides containers 264B1, 264B2 in which the items ordered by customer B are placed (container 264B1 includes items A, C and container 264B2 includes items B, D).

Figure 13:
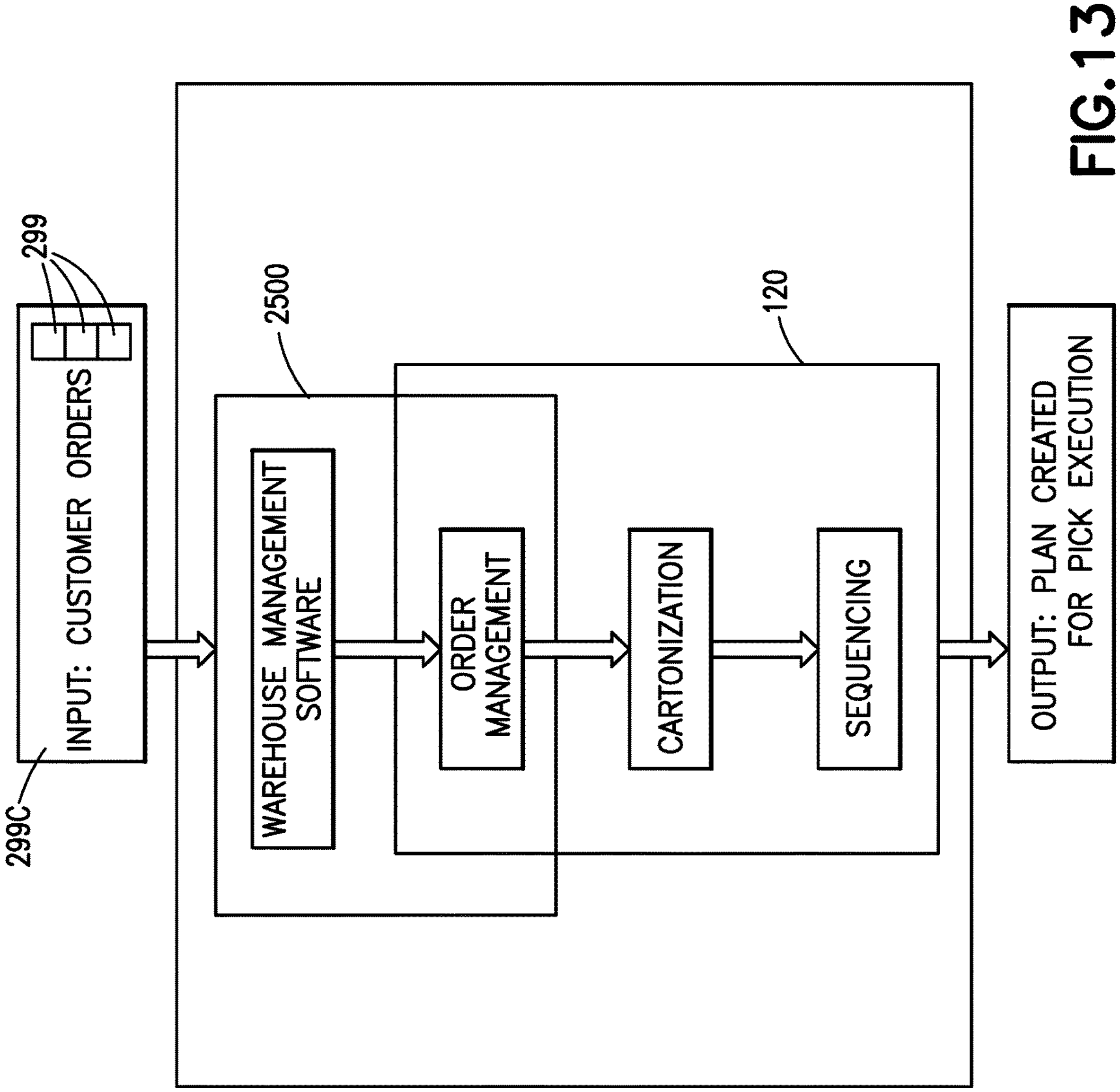
FIG. 13 is a schematic illustration of product sequencing in the automated storage and retrieval system of FIG. 1A in accordance with aspects of the disclosed embodiment.
Figure 14A:
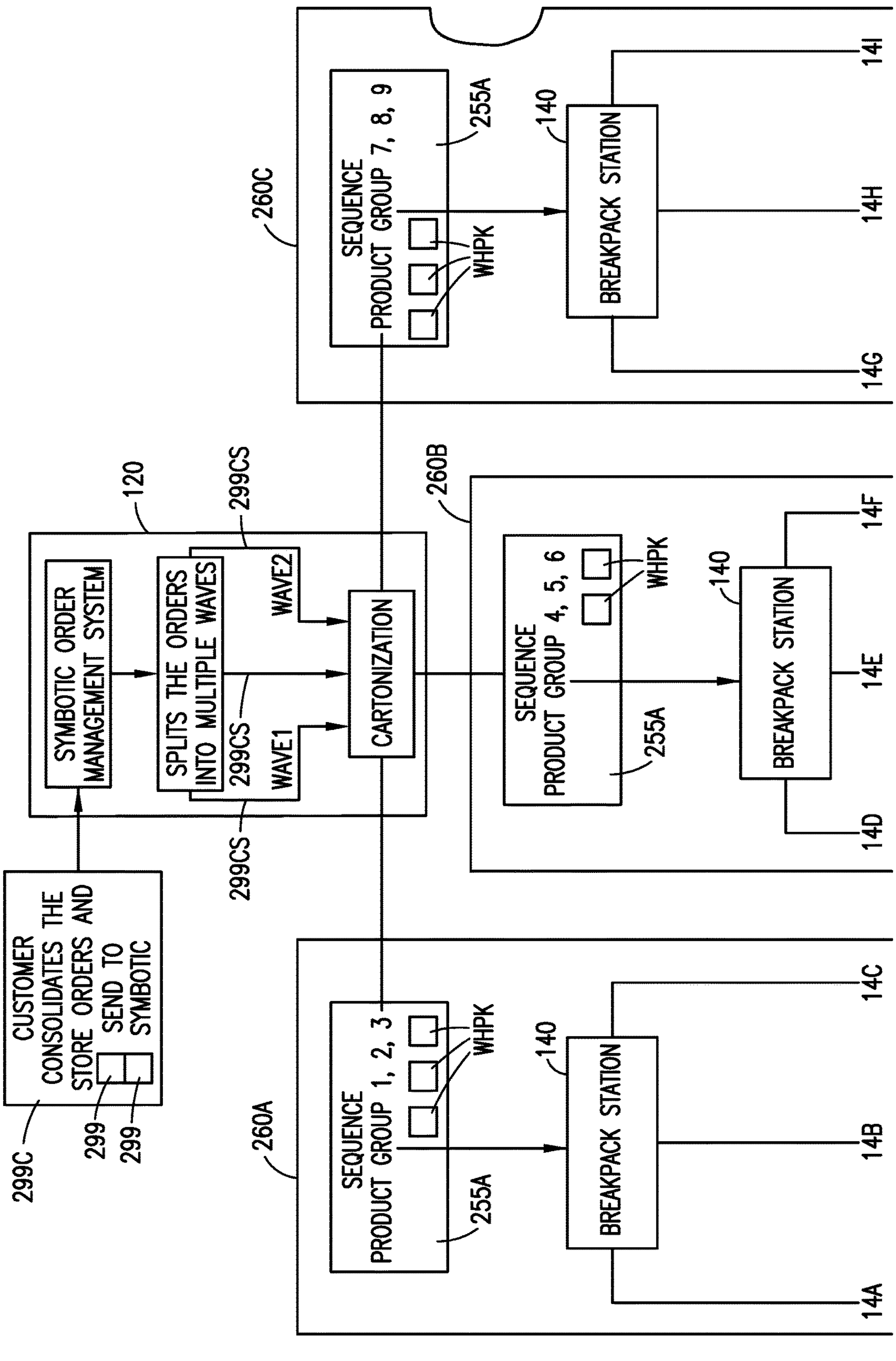
FIGS. 14A and 14B are a schematic illustration of sequencing/order flow in the automated storage and retrieval system of FIG. 1A in accordance with aspects of the disclosed embodiment.
Figure 14B:
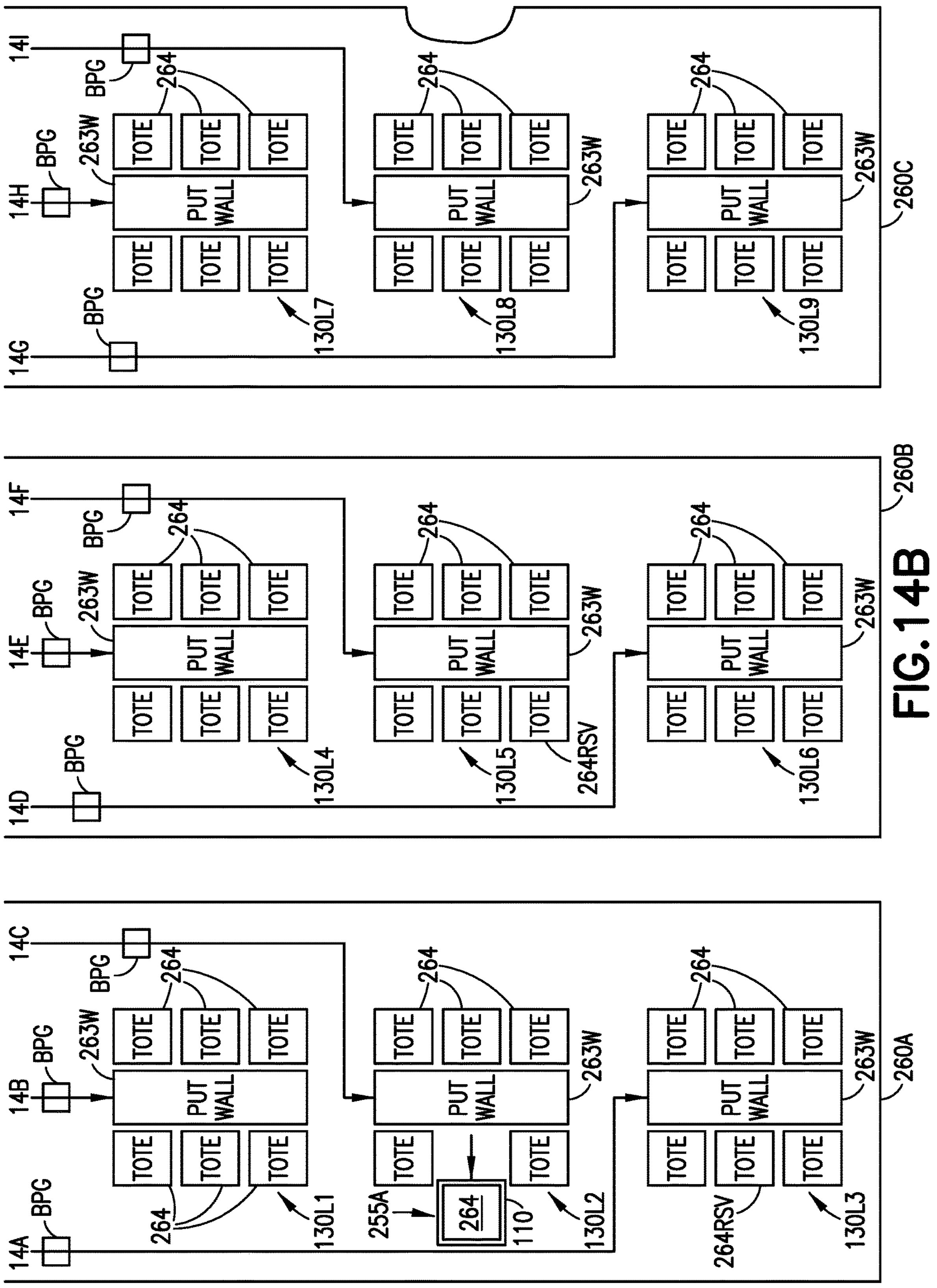

With the containers 264 (or whole, non-decommissioned warehouse packs WHPK) of the customer orders 299 in the consolidated order 299 being virtually planned (i.e., a containerization plan), the controller 120 is configured to determine sequencing (e.g., order of transport) of products from the product groups PG stored on storage levels 130L assigned to the transport channel 260A-260*n* to effect filling of the customer orders 299. Referring to FIGS. 13 and 14A-14B, sequencing assigns a particular order 299 to case units CU of product from the storage array 130SA to at least the breakpack stations 140 to fulfill the containerization plan and maintain breakpack goods BPG integrity (e.g., the breakpack good BPG remains intact and useable after containerization, for example, containerizing products so that caustics are located below non caustics and/or least fragile products are located at the bottom of the container may facilitate product integrity after containerization). In the sequencing process, a customer order 299/consolidated order 299C is received, the order 299, 299C specifying product(s) to be employed in replenishment of a customer store (or filling a direct to consumer e-commerce order). The controller 120 determines (e.g., with any suitable software which may be included in one or more of warehouse management software and order management software), based on the order 299, 299C, a plan for placing products in containers (e.g., the containerization plan described above) and a transport sequence of the products to the breakpack station 140 (i.e., the sequencing described herein). In the example, illustrated in FIGS. 14A-14B, the consolidated order 299C is split into three segments 299CS (in a manner similar to that described herein, where containerization and sequencing is performed by the controller 120 for each of the order segments 299CS. Based on the containerization and sequencing of the products the controller 120 outputs (via a suitable display at the breakpack station for a human breakpack operator or control commands for a robotic breakpack operator) a plan for pick execution transferring breakpack goods BPG from the warehouse packs WHPK, supplied to the breakpack station 140, to the breakpack goods containers 264 for output from the storage structure 130 (e.g., effected by the respective asynchronous transport system 255A-255*n* and lift 150A-150*n* of the respective transport channel 260A-260*n*) at the output station 16OUT. In the example illustrated in FIGS. 14A-14B it is noted that the consolidated order 299C is divided into three order segments 299CS but in other aspects may be divided into more or less than three order segments 299CS. It is also noted that while the consolidated order is fulfilled by three orthogonal transport channels 260A-260C in other aspects there may be more or less than three transport channels filling a consolidated order 299C. Also, each transport channel 260A-260C is illustrated as having three respective storage levels 130L1-130L3, 130L4-130L6, 160L7-130L9 (each associated with a respective level of the respective breakpack station 140) however, in other aspects a transport channel may have more or less than three storage levels.

Referring also to FIGS. 15A-15E, and exemplary sequencing processing will be described. In the sequencing process the controller 120 examines and bases the sequencing on one or more of predetermined characteristics of product BPG being sequenced and hardware components. The predetermined characteristics of the product BPG being sequenced include, but are not limited to, packaging types, handling type, and top strength of the package (e.g., which characteristics includes consideration of caustic product location relative to non-caustic product location within a container and the fragility of products). The sequencing based on hardware components effects one or more of reducing a number of residual warehouse packs (e.g., warehouse packs/case unit that are not fully emptied at the breakpack station 140), utilization of a dual task functionality of the container bots 110, reduce congestion of the goods bots 262 in the breakpack module 266, and optimize utilization of the put wall 263W. Utilization of the dual task functionality of the container bots 110 includes transportation of breakpack goods BPG (in warehouse packs WHPK) to the breakpack station 140, and in the same bot 110 trip transport a completed/filled breakpack container for output from the storage structure 130 or return a residual case unit CU to the storage structure 130.

Figure 15A:
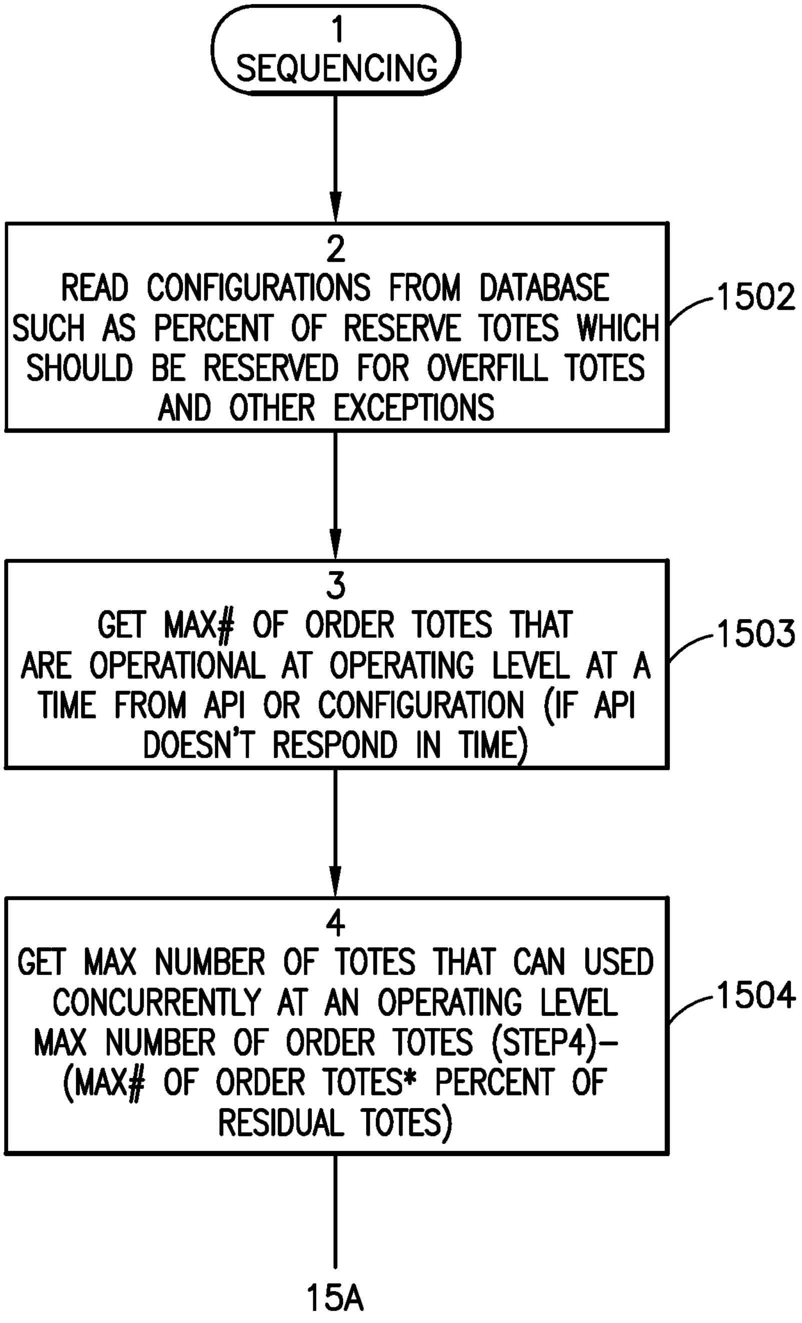
FIGS. 15A-15E are an exemplary flow diagram for product sequencing with the automated storage and retrieval system of FIG. 1A in accordance with aspects of the disclosed embodiment.

To effect sequencing of products BPG, the controller 120 reads from any suitable memory (such as a memory of the controller) a predetermined percentage PERTOTE (which may be configurable/reconfigurable) of breakpack containers or totes 264 that are designated as reserve totes 264RSV (see FIG. 14B) (FIG. 15A, Block 1502). The reserve totes 264RSV are employed to receive overflow from other breakpack containers 264 (e.g., such as where the other breakpack containers would otherwise be overfilled if it were not for products being placed in the reserve tote) or receive product for any other reasons. The controller 120 retrieves (such as from any suitable memory) the maximum number of breakpack containers MAX264 that are operational at for a respective transport channel 260A-260*n* (FIG. 15A, Block 1503). The controller determines a maximum number of breakpack containers 264 that can be filled concurrently MAXFILLCNT for the given transport channel 260A-260*n* (FIG. 15A, Block 1504) with the following formula:

$$\text{MAXFILLCNT}=\text{MAX264}\times\text{PERTOTE} \quad \text{[EQ. 5]}$$

Figure 15B:
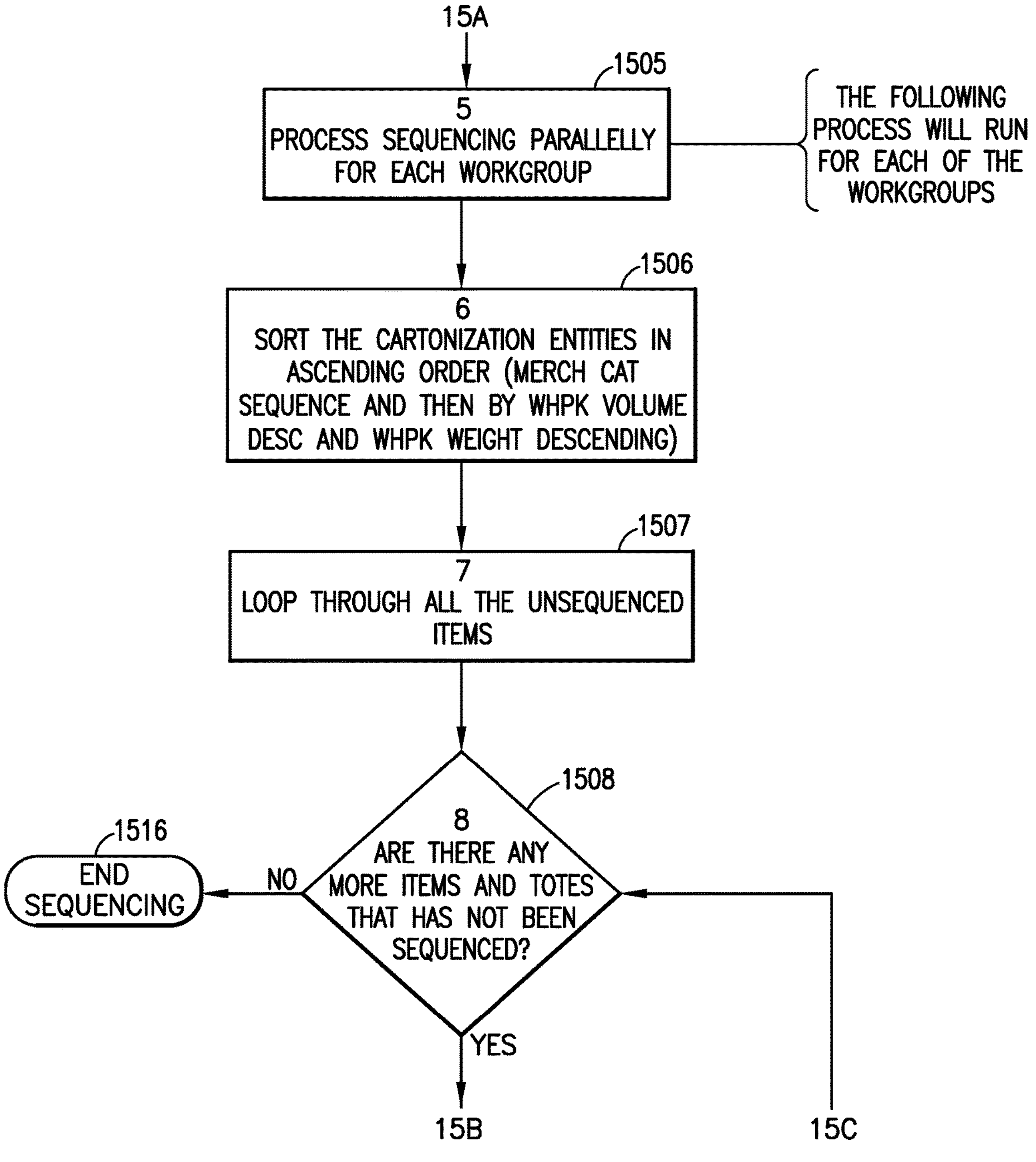
Figure 15C:
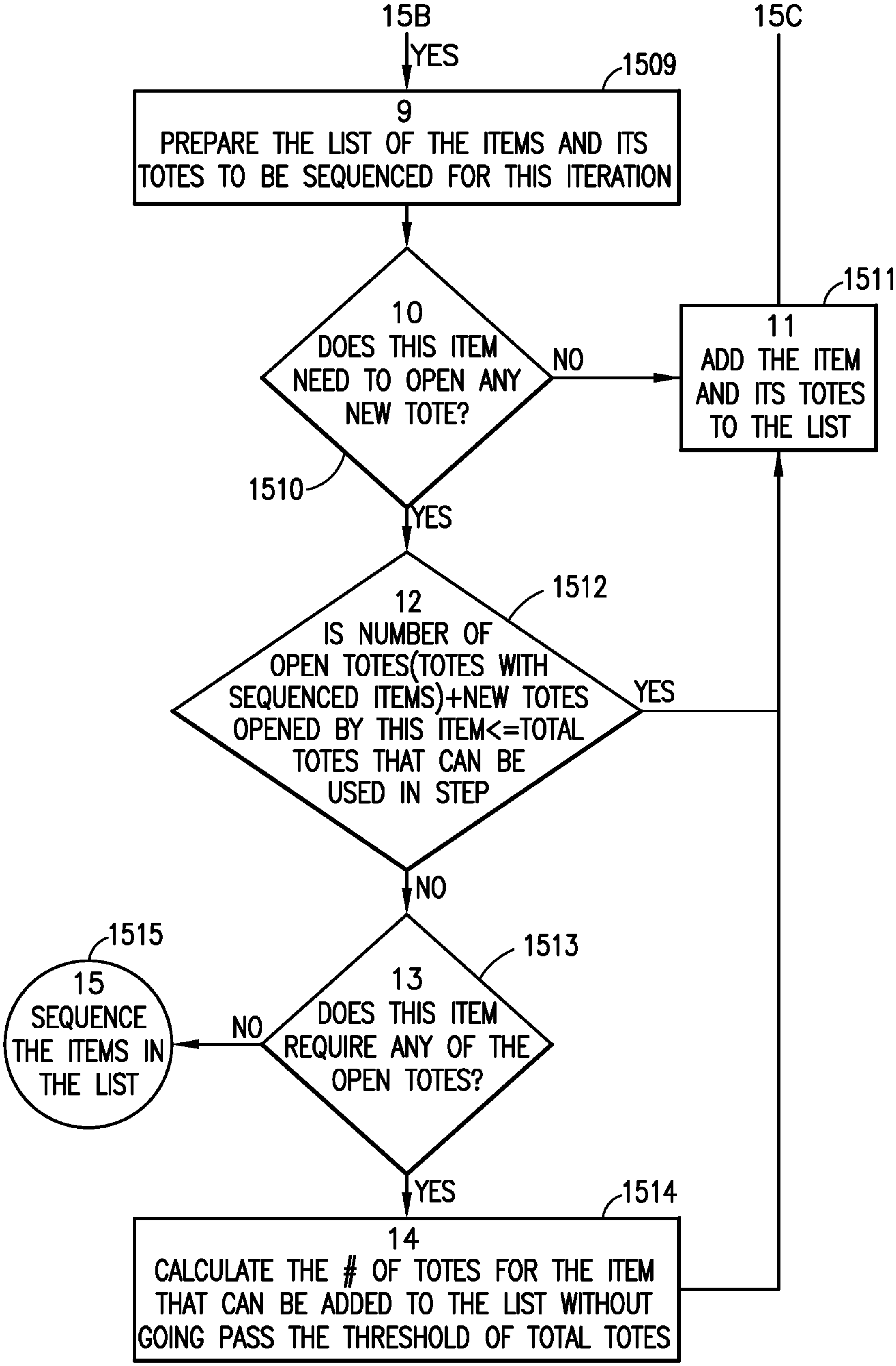

The controller 120 processes sequencing for each of the product group sets or workgroups PGSA-PGSn assigned to an order (as described herein) in parallel with each other (FIG. 15B, Block 1505) as provided below with respect to Block 1506-1525. The parallel processing of the product group sets PGSA-PGSn includes dynamically determining the number of customer orders to be processed in parallel, as determined by, for example, one or more of the customers included in the consolidated order 299C, a gate time of the customers, and a number of available breakpack containers at the putwall 263W (see Block 1504). For example, the controller 120 sorts the products to be containerized in ascending order by merchandise category and then by in descending order by warehouse pack WHPK volume and by warehouse pack WHPK weight (FIG. 15B, Block 1506). The controller loops through all un-sequenced product in the order 299C (FIG. 15B, Block 1507) and determines if there are any products in the order 299C that have not been sequenced (FIG. 15B, Block 1508). Where there all products in the order 299C have been sequenced, the sequencing process ends (FIG. 15B, Block 1516).

Where there are product that remains to be sequenced (FIG. 15B, Block 1508), the controller 120 lists the products BPG and respective breakpack containers 264 (as determined from the containerization process) to be sequenced in iteration (FIG. 15C, Block 1509). The controller determines if the product BPG being sequenced requires a new breakpack container to be opened (as determined in the containerization process) (FIG. 15C, Block 1510). Where a new breakpack container is not required, per containerization, the controller 120 adds the product BPG and its assigned breakpack container 264 to the list of items and containers to be sequenced (FIG. 15C, Block 1511) and returns to Block 1508 for processing a next product BPG.

Where a new breakpack container 264 is required (FIG. 15C, Block 1510), the controller 120 determines whether a number of open breakpack containers NOBC (e.g., breakpack containers with product that has/have been sequenced) plus new breakpack containers opened by the breakpack good BPG currently being sequenced NBCO is less than or equal to the maximum number of breakpack containers 264 that can be filled concurrently MAXFILLCNT (FIG. 15C, Block 1512).

$$NOBC+NBCO<=MAXFILLCNT \quad \text{[EQ. 6]}$$

Figure 15D:
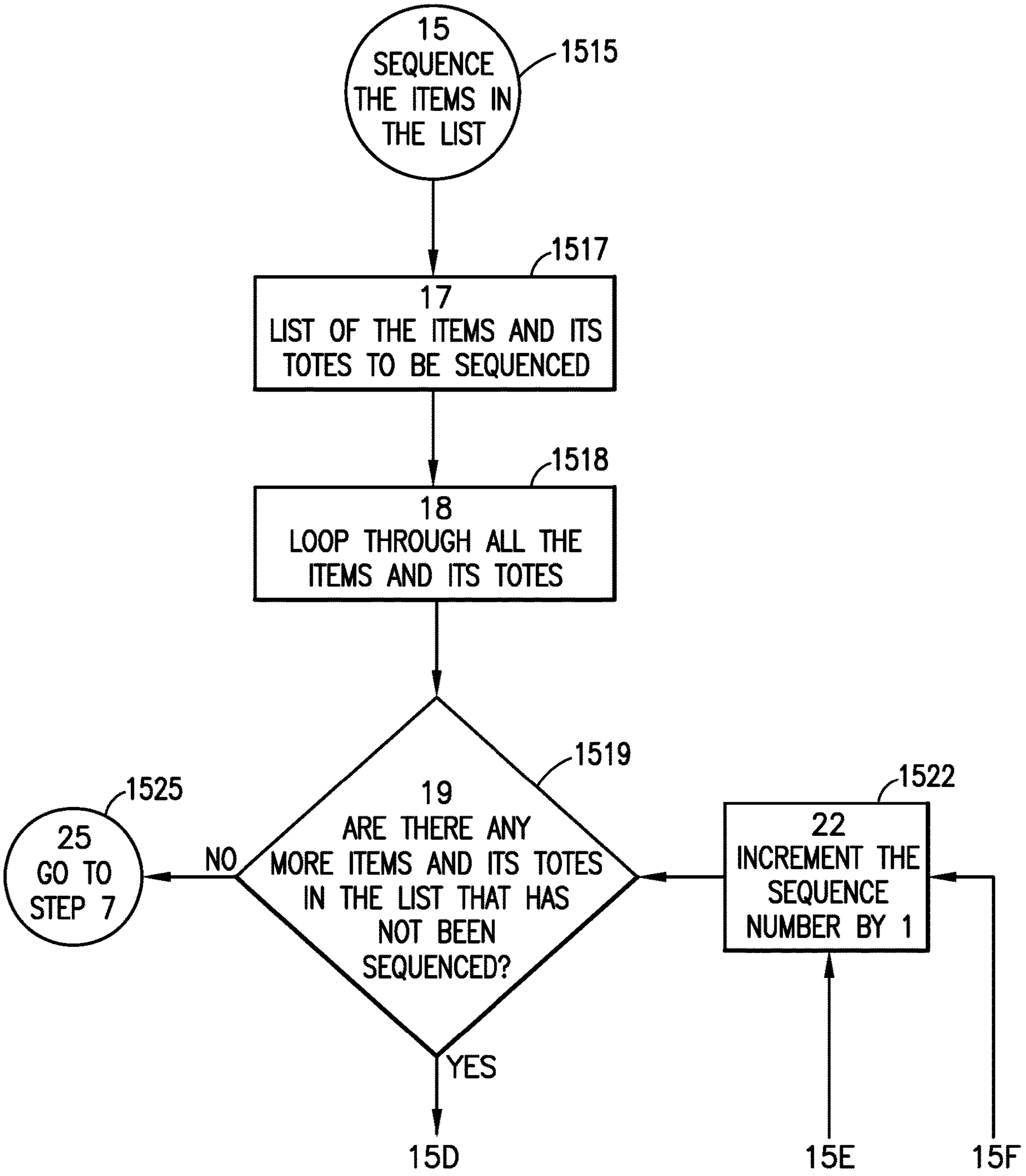
Figure 15E:
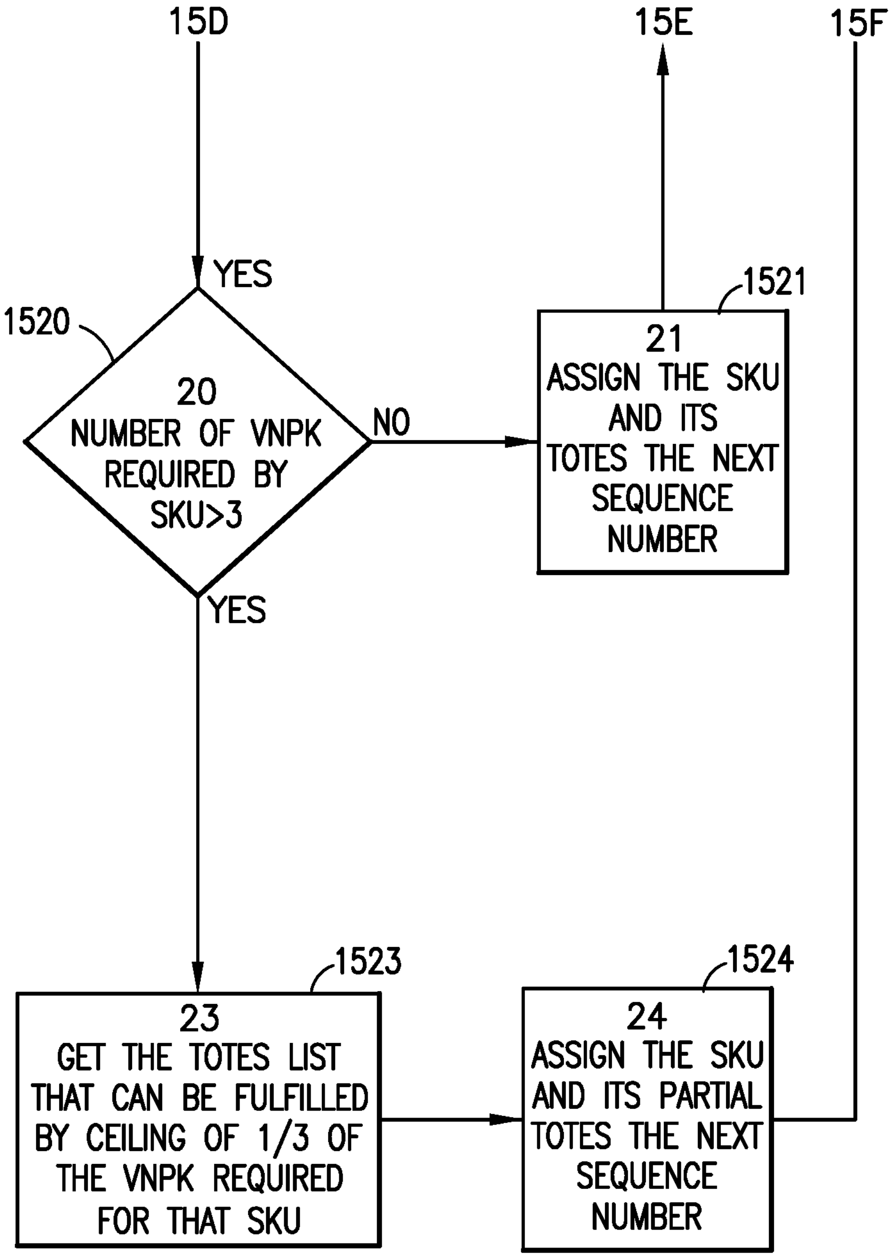

Where, EQ. 6 is satisfied, the controller 120 adds the product BPG and its assigned breakpack container 264 to the list of items and containers to be sequenced (FIG. 15C, Block 1511) and returns to Block 1508 for processing a next product BPG.

Where EQ. 6 is not satisfied, the controller 120 determines whether the breakpack good BPG currently being process requires any of the open breakpack container 264 (FIG. 15C, Block 1513). Where the breakpack good BPG currently being processed requires one of the open breakpack containers 264 (FIG. 15C, Block 1513), the controller 120 determines the number of breakpack containers 264 for the current breakpack good BPG that can be added to the list of breakpack good BPG and their breakpack containers to be sequenced without exceeding the threshold of total breakpack containers (i.e., the maximum number of breakpack containers 264 that can be filled concurrently MAXFILLCNT) (FIG. 15C, Block 1514). The controller 120 adds the number of totes for the currently processed breakpack good BPG that do not exceed MAXFILLCNT to the list of items and containers to be sequenced (FIG. 15C, Block 1511) and returns to Block 1508 for processing a next product BPG.

Where the breakpack good BPG currently being processed does not require one of the open breakpack containers 264 (FIG. 15C, Block 1513), the controller 120 sequences the items in the list of breakpack good BPG and their breakpack containers to be sequenced (FIG. 15C, Block 1515) as follows in Blocks 1517-1525. For example, the controller 120 lists the breakpack goods BPG and their respective breakpack containers 264 that remain to be sequenced (FIG. 15D, Block 1517) and loops through all of the breakpack goods BPG and their respective breakpack containers 264 (FIG. 15D, Block 1518). The controller 120 determines whether there are more breakpack goods BPG and their respective breakpack containers 264 that have not been sequenced (FIG. 15D, Block 1519). Where there are no breakpack goods BPG and their respective breakpack containers 264 remaining to be sequenced (FIG. 15D, Block 1519), the controller 120 returns to block 1507 (FIG. 15D, Block 1525), Where there are no breakpack goods BPG and their respective breakpack containers 264 remaining to be sequenced (FIG. 15D, Block 1519), the controller 120 determines if the number of breakpack good BPG currently being processed is equal to or greater than 3 (FIG. 15E, Block 1520). Where the number of breakpack good BPG currently being processed is less than 3, the controller 120 assigns the breakpack good BPG and its respective breakpack container 264 to a next sequence number in the sequence of items transported to the breakpack station 140 (FIG. 15E, Block 1521). Where the number of breakpack good BPG currently being processed is greater than or equal to 3, the controller 120 generates a list of breakpack containers 264 that can be fulfilled by a threshold of ⅓ of the breakpack goods BPG (vendor packs VNPK) for that breakpack good BPG (i.e., the SKU) (FIG. 15E, Block 1523) and assigns the breakpack good BPG and its partial breakpack goods containers 264 to the next sequence number in the sequence of items transported to the breakpack station 140 (FIG. 15E, Block 1521). The controller increments the sequence number by 1 (FIG. 15D, Block 1522 and returns to Block 1519 to determine whether any breakpack goods BPG and their respective breakpack containers 264 remain to be sequenced (FIG. 15D, Block 1519).

Figure 16:
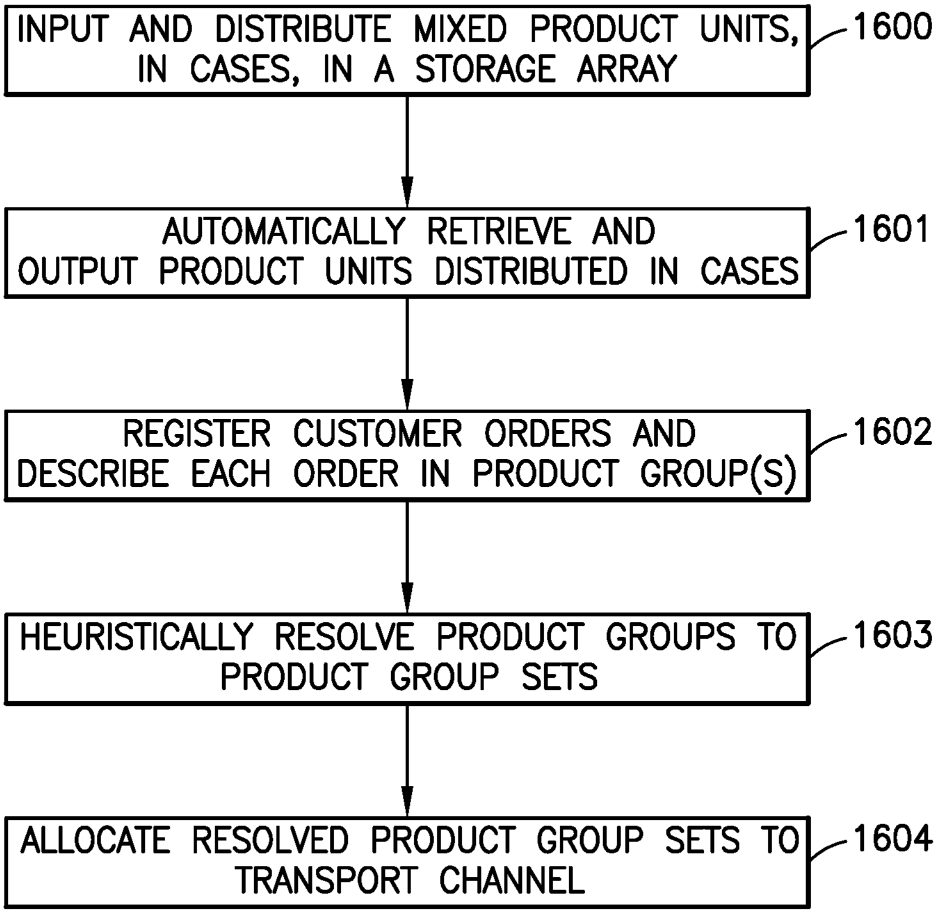
FIG. 16 is an exemplary flow diagram for a method effected by the automated storage and retrieval system of FIG. 1A in accordance with aspects of the disclosed embodiment.

Referring to FIGS. 1A, 1B, 2, 3A, and 16, an exemplary method for fulfilling product orders of mixed product units will be described in accordance with aspects of the disclosed embodiment. The method includes inputting and distributing mixed product units BPG in a storage array 130SA of a product order fulfillment system 100 (FIG. 16, Block 1600). As described herein, the storage array 130SA has at least one elevated storage level 130L and the mixed product units BPG are input and distributed in the storage array 130SA in cases (i.e., case units CU (also referred to herein as warehouse packs WHPK), of product units of common kind per case. The product units BPG distributed in the cases CU in the at least one elevated storage level 130L of the storage array 130SA are automatically retrieved and output from the storage array 130SA with the automated transport system 277 of the product order fulfillment system 100 (FIG. 16, Block 1601). The output product units being one or more of mixed singulated product units, in mixed packed groups, and in mixed cases. As described herein, the automated transport system 277 is communicably connected to the storage array 130SA and has at least one asynchronous transport system 255A-255*n*, for level transport, and a lift 150A-150*n* for between level transport. The at least one asynchronous transport system 255A-255*n*, and the lift 150A-150*n*, as described herein, are configured so as to form more than one transport channel 260A, 260*n*, at least one of which is separate and distinct from another transport channel 260A-260*n*. Each transport channel 260A-260*n* is communicably connected with the at least one elevated storage level 130L and the output (such as output station 16OUT), and the at least one transport channel 260A-260*n* effects orthogonal transport output, relative to each other transport channel 260A-260*n*, of the product units BPG distributed in the storage array 130SA.

The method also includes registering, with the controller 120, which is communicably connected to the more than one transport channels 260A-260*n*, customer orders 299 of product units BPG and describing each order 299 in one or more product groups PGA-PGn of product units BPG (FIG. 16, Block 1602). Each product group PGA-PGn having a unique predetermined product group characteristic (as described herein) characterizing the product group PGA-PGn and relates the product groups PGA-PGn to each other. The controller heuristically resolves, based on the product group characteristic, the product groups PGA-PGn of more than one order 299C, to product group sets PGSA-PGSn (FIG. 16, Block 1603). Each product group set PGSA-PGSn being of a number of product groups PGA-PGn, and orthogonal to each other product group set PGSA-PGSn, and having a maximum number of mergeable product groups PGA-PGn. The controller 120 is programmed with store rules (as described herein) defining product groups PGA-PGn and mergeability of product groups PGA-PGn to each other.

The controller 120 effects dynamic resolution of the product group sets PGSA-PGSn based on at least, a quantity of allocated product group sets PGSA-PGSn relative to the predetermined threshold (e.g., the average vendor pack requirements of EQ. 2A or EQ. 2B) of product units BPG transported via the at least one transport channel 260A-260*n*, and quantities respectively of other allocated product groups sets PGSA-PGSn relative to the respective threshold (e.g., the average vendor pack requirements of EQ. 2A or EQ. 2B) of each other transport channel 260A-260*n*.

The controller 120 allocates each resolved product group set PGSA-PGSn to the at least one transport channel 260A-260*n* (FIG. 16, Block 1604) for retrieval and output, via the at least one transport channel 260A-260*n*, of product units BPG forming the product group set PGSA-PGSn into order containers 264 of mixed product units BPG, wherein the product group set PGSA-PGSn is allocated so as not to exceed the predetermined threshold (e.g., the average vendor pack requirements of EQ. 2A or EQ. 2B) of product units BPG transported via the at least one transport channel 260A-260*n*.

The controller 120 effects dynamic allocation of the product group sets PGSA-PGSn to the at least one transport channel 260A-260*n* and balances allocated product group sets PGSA-PGSn to the at least one transport channel 260A-260*n* with other allocated product group sets PGSA-PGSn allocated to each other transport channel 260A-260*n*. In the method at least one of resolution and allocation of product group sets PGSA-PGSn optimizes transport of product units BPG with the asynchronous transport system 255A-255*n* per customer order 299 as described herein. At least one of resolution and allocation of product group sets PGSA-PGSn minimizes bot 110 transport of cases CU/breakpack containers 264 of product units BPG per customer order 299.

Figure 17:
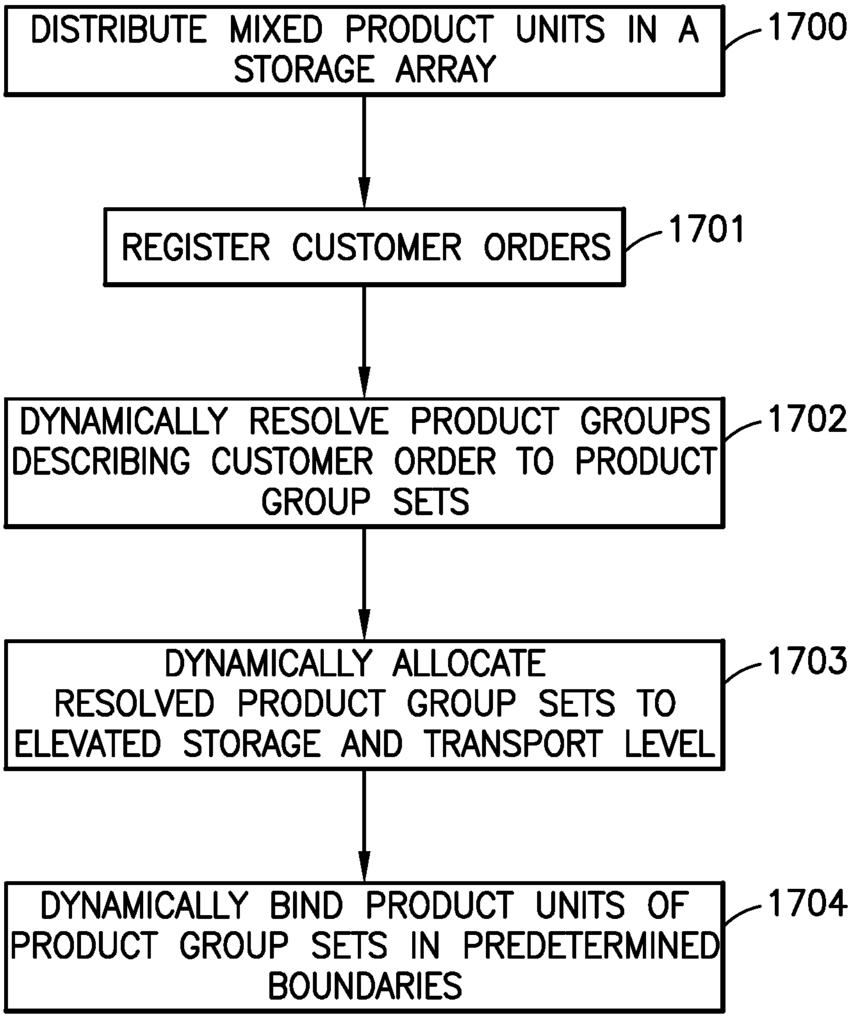
FIG. 17 is an exemplary flow diagram for a method effected by the automated storage and retrieval system of FIG. 1A in accordance with aspects of the disclosed embodiment.

Referring to FIGS. 1A, 1B, 2, 3A, and 17, an exemplary method for fulfilling product orders of mixed product units is provided. The method includes distributing, with the at least one asynchronous transport system 255A-255*n*, mixed product units BPG in the storage array 130SA (FIG. 17, Block 1700). As described herein, the storage array 130SA has at least one elevated storage and transport level 130L, the mixed product units BPG are distributed in the storage array 130SA in cases CU/warehouse packs WHPK, of product units of common kind per case, the at least one asynchronous transport system 255A-255*n* effects level (e.g., a respective level 130L) transport so as to automatically retrieve and output, from the storage array 130SA, the product units BPG distributed in the cases CU/warehouse packs WHPK, and each of the at least one elevated storage and transport level 130L, is separate and distinct from each other elevated storage and transport level 130L. As described herein, each elevated storage and transport level 130L effects orthogonal transport output, relative to each other elevated storage and transport level 130L, of the product units BPG distributed in the storage array 130SA.

The controller 120, which is communicably connected to the at least one elevated storage and transport level 130L, registers customer orders 299 (FIG. 17, Block 1701) of product units BPG characterized by one or more product groups PGA-PGn of product units BPG. As described herein each product group PGA-PGn has a unique predetermined product group characteristic characterizing product units BPG of the product group PGA-PGn and relating the product group PGA-PGn to each other product group PGA-PGn.

The controller 120 dynamically resolves, via heuristic solution based on the unique predetermined product group characteristic, the product groups PGA-PGn describing each customer order 299, to product group sets PGSA-PGSn (FIG. 17, Block 1702). Each product group set PGSA-PGSn being of a number of product groups PGA-PGn, and orthogonal to each other product group set PGSA-PGSn. The controller 120 dynamically allocates each resolved product group set PGSA-PGSn to the at least one elevated storage and transport level 130L (FIG. 17, Block 1703). The controller 120 dynamically binds (as described herein), via another heuristic solution, product units BPG of allocated product group sets PGSA-PGSn of the at least one elevated storage and transport level 130L, into predetermined boundaries (FIG. 17, Block 1704), in batches of mixed product units BPG for each customer order 299 corresponding to the allocated product group set PGSA-PGSn, and wherein the other heuristic solution is based on at least one product group characteristic and customer or default affinity rules (as described herein). The product group set PGSA-PGSn is dynamically allocated for retrieval and output, via the at least one storage and transport level 130L, of product units BPG forming the product group set PGSA-PGSn into order/breakpack containers 264 holding the batches of mixed product units, wherein the product group set PGSA-PGSn is dynamically allocated so as not to exceed the predetermined threshold (e.g., the average vendor pack requirements of EQ. 2A or EQ. 2B) of product units transported via the at least one elevated storage and transport level 130L. The controller 120 effects dynamic resolution of the product group sets PGSA-PGSn based on at least, a quantity of allocated product group sets PGSA-PGSn relative to the predetermined threshold (e.g., the average vendor pack requirements of EQ. 2A or EQ. 2B) of product units BPG transported via the at least one elevated storage and transport level 130L, and quantities respectively of other allocated product groups sets PGSA-PGSn relative to the respective threshold (e.g., the average vendor pack requirements of EQ. 2A or EQ. 2B) of each other elevated storage and transport level 130L. The controller 120 effects dynamic allocation of the product group sets PGSA-PGSn to the at least one elevated storage and transport level 130L and balances (as described herein) allocated product group sets PGSA-PGSn to the at least one elevated storage and transport level 130L with other allocated product group sets PGSA-PGSn allocated to each other elevated storage and transport level 130L. As described herein, at least one of resolution and allocation of product group sets PGSA-PGSn optimizes transport of product units BPG with the asynchronous transport system 255A-255*n* per customer order 299. As also described herein, at least one of resolution and allocation of product group sets PGSA-PGSn minimizes bot 110 transport of cases CU/warehouse packs WHPK of product units BPG per customer order 299.

In accordance with one or more aspects of the disclosed embodiment, a product order fulfillment system of mixed product units is provided. The product order fulfillment system comprises: a storage array, with at least one elevated storage level, wherein mixed product units are input and distributed in the storage array in cases, of product units of common kind per case; an automated transport system, with at least one asynchronous transport system, for level transport, and a lift for between level transport, communicably connected to the storage array so as to automatically retrieve and output, from the storage array, product units distributed in the cases in the at least one elevated storage level of the storage array, the output product units being one or more of mixed singulated product units, in mixed packed groups, and in mixed cases; wherein the at least one asynchronous transport system, and the lift are configured so as to form more than one transport channel, at least one of which is separate and distinct from another transport channel, each transport channel being communicably connected with the at least one elevated storage level and the output, and the at least one transport channel effects orthogonal transport output, relative to each other transport channel, of the product units distributed in the storage array; and a controller communicably connected to the more than one transport channels, the controller being configured to: register customer orders of product units and describe each order in one or more product groups of product units, each product group having a unique predetermined product group characteristic characterizing the product group and relates the product groups to each other; heuristically resolve, based on the product group characteristic, the product groups of more than one order, to product group sets, each product group set being of a number of product groups, and orthogonal to each other product group set, and having a maximum number of mergeable product groups; and allocate each resolved product group set to the at least one transport channel for retrieval and output, via the at least one transport channel, of product units forming the product group set into order containers of mixed product units, wherein the product group set is allocated so as not to exceed a predetermined threshold of product units transported via the at least one transport channel.

In accordance with one or more aspects of the disclosed embodiment, the controller is configured so as to effect dynamic resolution of the product group sets based on at least, a quantity of allocated product group sets relative to the predetermined threshold of product units transported via the at least one transport channel, and quantities respectively of other allocated product groups sets relative to a respective threshold of each other transport channel.

In accordance with one or more aspects of the disclosed embodiment, the controller is configured so as to effect dynamic allocation of the product group sets to the at least one transport channel and balance allocated product group sets to the at least one transport channel with other allocated product group sets allocated to each other transport channel.

In accordance with one or more aspects of the disclosed embodiment, the customer orders are of mixed product units, each unit of which being stored, in the storage array, in cases of product units of common kind per case.

In accordance with one or more aspects of the disclosed embodiment, each customer order is of at least one of the mixed product units.

In accordance with one or more aspects of the disclosed embodiment, the at least one transport channel is independent of each other of the more than one transport channel so that output of product units from the at least one transport channel is orthogonal to output from each other transport channel.

In accordance with one or more aspects of the disclosed embodiment, at least one of resolution and allocation of product group sets optimizes transport of product units with the asynchronous transport system per customer order.

In accordance with one or more aspects of the disclosed embodiment, the at least one asynchronous transport system comprises autonomous guided autonomous bots asynchronously traversing the at least one elevated storage level.

In accordance with one or more aspects of the disclosed embodiment, each autonomous guided autonomous bot is configured to transport one case of product units of common kind.

In accordance with one or more aspects of the disclosed embodiment, at least one of resolution and allocation of product group sets minimizes bot transport of cases of product units per customer order.

In accordance with one or more aspects of the disclosed embodiment, the at least one transport channel is connected with the at least one elevated storage level separate and distinct from each other transport channel.

In accordance with one or more aspects of the disclosed embodiment, the at least one transport channel is connected with a corresponding one or more of the at least one elevated storage level that are different than elevated storage levels of the storage array connected to and corresponding to each other transport channel.

In accordance with one or more aspects of the disclosed embodiment, the controller is programmed with store rules defining product groups and mergeability of product groups to each other.

In accordance with one or more aspects of the disclosed embodiment, a product order fulfillment system of mixed product units is provided. The product order fulfillment system comprises: a storage array, with at least one elevated storage and transport level, wherein mixed product units are distributed in the storage array in cases, of product units of common kind per case, with at least one asynchronous transport system, for level transport so as to automatically retrieve and output, from the storage array, the product units distributed in the cases; wherein each of the at least one elevated storage and transport level, is separate and distinct from each other elevated storage and transport level, each elevated storage and transport level effects orthogonal transport output, relative to each other elevated storage and transport level, of the product units distributed in the storage array; and a controller communicably connected to the at least one elevated storage and transport level, the controller being configured to: register customer orders of product units characterized by one or more product groups of product units, each product group having a unique predetermined product group characteristic characterizing product units of the product group and relating the product group to each other product group; dynamically resolve, via heuristic solution based on the unique predetermined product group characteristic, the product groups describing each customer order, to product group sets, each product group set being of a number of product groups, and orthogonal to each other product group set; and dynamically allocate each resolved product group set to the at least one elevated storage and transport level; and wherein, via another heuristic solution, product units of allocated product group sets of the at least one elevated storage and transport level are dynamically bound, into predetermined boundaries, in batches of mixed product units for each customer order corresponding to the allocated product group set, and wherein the other heuristic solution is based on at least one product group characteristic and customer or default affinity rules.

In accordance with one or more aspects of the disclosed embodiment, each resolved product group set is orthogonal to each other product group set, and has a maximum number of mergeable product groups.

In accordance with one or more aspects of the disclosed embodiment, the product group set is dynamically allocated for retrieval and output, via the at least one storage and transport level, of product units forming the product group set into order containers holding the batches of mixed product units, wherein the product group set is dynamically allocated so as not to exceed a predetermined threshold of product units transported via the at least one storage and transport channel.

In accordance with one or more aspects of the disclosed embodiment, the controller is configured so as to effect dynamic resolution of the product group sets based on at least, a quantity of allocated product group sets relative to a predetermined threshold of product units transported via the at least one elevated storage and transport level, and quantities respectively of other allocated product groups sets relative to a respective threshold of each other elevated storage and transport level.

In accordance with one or more aspects of the disclosed embodiment, the controller is configured so as to effect dynamic allocation of the product group sets to the at least one elevated storage and transport level and balance allocated product group sets to the at least one elevated storage and transport level with other allocated product group sets allocated to each other elevated storage and transport level.

In accordance with one or more aspects of the disclosed embodiment, the customer orders are of mixed product units, each unit of which being stored, in the storage array, in cases of product units of common kind per case.

In accordance with one or more aspects of the disclosed embodiment, each customer order is of at least one of the mixed product units.

In accordance with one or more aspects of the disclosed embodiment, at least one of resolution and allocation of product group sets optimizes transport of product units with the asynchronous transport system per customer order.

In accordance with one or more aspects of the disclosed embodiment, the at least one asynchronous transport system comprises autonomous guided autonomous bots asynchronously traversing the at least one elevated storage and transport level.

In accordance with one or more aspects of the disclosed embodiment, each autonomous guided autonomous bot is configured to transport one case of product units of common kind.

In accordance with one or more aspects of the disclosed embodiment, at least one of resolution and allocation of product group sets minimizes bot transport of cases of product units per customer order.

In accordance with one or more aspects of the disclosed embodiment, the controller is programmed with store rules defining product groups and mergeability of product groups to each other.

In accordance with one or more aspects of the disclosed embodiment, a method for fulfilling product orders of mixed product units is provided. The method comprises: inputting and distributing mixed product units in a storage array of a product order fulfillment system, the storage array having at least one elevated storage level and the mixed product units are input and distributed in the storage array in cases, of product units of common kind per case; automatically retrieving and outputting, with an automated transport system of the product order fulfillment system, from the storage array, product units distributed in the cases in the at least one elevated storage level of the storage array, the output product units being one or more of mixed singulated product units, in mixed packed groups, and in mixed cases, where the automated transport system is communicably connected to the storage array and has at least one asynchronous transport system, for level transport, and a lift for between level transport where: the at least one asynchronous transport system, and the lift are configured so as to form more than one transport channel, at least one of which is separate and distinct from another transport channel, each transport channel being communicably connected with the at least one elevated storage level and the output, and the at least one transport channel effects orthogonal transport output, relative to each other transport channel, of the product units distributed in the storage array; and registering, with a controller communicably connected to the more than one transport channels, customer orders of product units and describing each order in one or more product groups of product units, each product group having a unique predetermined product group characteristic characterizing the product group and relates the product groups to each other; heuristically resolving, with the controller, based on the product group characteristic, the product groups of more than one order, to product group sets, each product group set being of a number of product groups, and orthogonal to each other product group set, and having a maximum number of mergeable product groups; and allocating, with the controller, each resolved product group set to the at least one transport channel for retrieval and output, via the at least one transport channel, of product units forming the product group set into order containers of mixed product units, wherein the product group set is allocated so as not to exceed a predetermined threshold of product units transported via the at least one transport channel.

In accordance with one or more aspects of the disclosed embodiment, the controller effects dynamic resolution of the product group sets based on at least, a quantity of allocated product group sets relative to the predetermined threshold of product units transported via the at least one transport channel, and quantities respectively of other allocated product groups sets relative to a respective threshold of each other transport channel.

In accordance with one or more aspects of the disclosed embodiment, the controller effects dynamic allocation of the product group sets to the at least one transport channel and balance allocated product group sets to the at least one transport channel with other allocated product group sets allocated to each other transport channel.

In accordance with one or more aspects of the disclosed embodiment, the customer orders are of mixed product units, each unit of which being stored, in the storage array, in cases of product units of common kind per case.

In accordance with one or more aspects of the disclosed embodiment, each customer order is of at least one of the mixed product units.

In accordance with one or more aspects of the disclosed embodiment, the at least one transport channel is independent of each other of the more than one transport channel so that output of product units from the at least one transport channel is orthogonal to output from each other transport channel.

In accordance with one or more aspects of the disclosed embodiment, at least one of resolution and allocation of product group sets optimizes transport of product units with the asynchronous transport system per customer order.

In accordance with one or more aspects of the disclosed embodiment, the at least one asynchronous transport system comprises autonomous guided autonomous bots asynchronously traversing the at least one elevated storage level.

In accordance with one or more aspects of the disclosed embodiment, each autonomous guided autonomous bot is configured to transport one case of product units of common kind.

In accordance with one or more aspects of the disclosed embodiment, at least one of resolution and allocation of product group sets minimizes bot transport of cases of product units per customer order.

In accordance with one or more aspects of the disclosed embodiment, the at least one transport channel is connected with the at least one elevated storage level separate and distinct from each other transport channel.

In accordance with one or more aspects of the disclosed embodiment, the at least one transport channel is connected with a corresponding one or more of the at least one elevated storage level that are different than elevated storage levels of the storage array connected to and corresponding to each other transport channel.

In accordance with one or more aspects of the disclosed embodiment, the controller is programmed with store rules defining product groups and mergeability of product groups to each other.

In accordance with one or more aspects of the disclosed embodiment, a method for fulfilling product orders of mixed product units is provided. The method comprises: distributing, with at least one asynchronous transport system, mixed product units in a storage array, where: the storage array has at least one elevated storage and transport level, the mixed product units are distributed in the storage array in cases, of product units of common kind per case, the at least one asynchronous transport system effects level transport so as to automatically retrieve and output, from the storage array, the product units distributed in the cases, and each of the at least one elevated storage and transport level, is separate and distinct from each other elevated storage and transport level, each elevated storage and transport level effects orthogonal transport output, relative to each other elevated storage and transport level, of the product units distributed in the storage array; registering, with a controller communicably connected to the at least one elevated storage and transport level, customer orders of product units characterized by one or more product groups of product units, each product group having a unique predetermined product group characteristic characterizing product units of the product group and relating the product group to each other product group; dynamically resolving, with the controller via heuristic solution based on the unique predetermined product group characteristic, the product groups describing each customer order, to product group sets, each product group set being of a number of product groups, and orthogonal to each other product group set; dynamically allocating, with the controller, each resolved product group set to the at least one elevated storage and transport level; and dynamically binding, with the controller via another heuristic solution, product units of allocated product group sets of the at least one elevated storage and transport level, into predetermined boundaries, in batches of mixed product units for each customer order corresponding to the allocated product group set, and wherein the other heuristic solution is based on at least one product group characteristic and customer or default affinity rules.

In accordance with one or more aspects of the disclosed embodiment, each resolved product group set is orthogonal to each other product group set, and has a maximum number of mergeable product groups.

In accordance with one or more aspects of the disclosed embodiment, the product group set is dynamically allocated for retrieval and output, via the at least one storage and transport level, of product units forming the product group set into order containers holding the batches of mixed product units, wherein the product group set is dynamically allocated so as not to exceed a predetermined threshold of product units transported via the at least one storage and transport channel.

In accordance with one or more aspects of the disclosed embodiment, the controller effects dynamic resolution of the product group sets based on at least, a quantity of allocated product group sets relative to a predetermined threshold of product units transported via the at least one elevated storage and transport level, and quantities respectively of other allocated product groups sets relative to a respective threshold of each other elevated storage and transport level.

In accordance with one or more aspects of the disclosed embodiment, the controller effects dynamic allocation of the product group sets to the at least one elevated storage and transport level and balance allocated product group sets to the at least one elevated storage and transport level with other allocated product group sets allocated to each other elevated storage and transport level.

In accordance with one or more aspects of the disclosed embodiment, the customer orders are of mixed product units, each unit of which being stored, in the storage array, in cases of product units of common kind per case.

In accordance with one or more aspects of the disclosed embodiment, each customer order is of at least one of the mixed product units.

In accordance with one or more aspects of the disclosed embodiment, at least one of resolution and allocation of product group sets optimizes transport of product units with the asynchronous transport system per customer order.

In accordance with one or more aspects of the disclosed embodiment, the at least one asynchronous transport system comprises autonomous guided autonomous bots asynchronously traversing the at least one elevated storage and transport level.

In accordance with one or more aspects of the disclosed embodiment, each autonomous guided autonomous bot is configured to transport one case of product units of common kind.

In accordance with one or more aspects of the disclosed embodiment, at least one of resolution and allocation of product group sets minimizes bot transport of cases of product units per customer order.

In accordance with one or more aspects of the disclosed embodiment, the controller is programmed with store rules defining product groups and mergeability of product groups to each other.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. A product order fulfillment system of mixed product units, the product order fulfillment system comprising:

a storage array, with at least one elevated storage level, wherein mixed product units are input and distributed in the storage array in cases, of product units of common kind per case;

an automated transport system, with at least one asynchronous transport system, for level transport, and a lift for between level transport, communicably connected to the storage array so as to automatically retrieve and output, from the storage array, product units distributed in the cases in the at least one elevated storage level of the storage array, the output product units being one or more of mixed singulated product units, in mixed packed groups, or in mixed cases;

wherein the at least one asynchronous transport system, and the lift are configured so as to form more than one transport channel, at least one of which is separate and distinct from another transport channel, each transport channel being communicably connected with the at least one elevated storage level and the output, and the at least one transport channel effects orthogonal transport output, relative to each other transport channel, of the product units distributed in the storage array; and a controller communicably connected to the more than one transport channels, the controller being configured to:

register customer orders of product units and describe each order in one or more product groups of product units, each product group having a unique predetermined product group characteristic characterizing the product group and relates the product groups to each other;

heuristically resolve, based on the product group characteristic, the product groups of more than one order, to product group sets, each product group set being of a number of product groups, and orthogonal to each other product group set, and having a maximum number of mergeable product groups; and allocate each resolved product group set to the at least one transport channel for retrieval and output, via the at least one transport channel, of product units forming the product group set into order containers of mixed product units, wherein the product group set is allocated so as not to exceed a predetermined threshold of product units transported via the at least one transport channel;

wherein the controller is configured so as to effect dynamic resolution of the product group sets based on at least, a quantity of allocated product group sets relative to the predetermined threshold of product units transported via the at least one transport channel, and quantities respectively of other allocated product groups sets relative to a respective threshold of each other transport channel.

2. The product order fulfillment system of claim 1, wherein the controller is configured so as to effect dynamic allocation of the product group sets to the at least one transport channel and balance allocated product group sets to the at least one transport channel with other allocated product group sets allocated to each other transport channel.

3. The product order fulfillment system of claim 1, wherein the customer orders are of mixed product units, each unit of which being stored, in the storage array, in cases of product units of common kind per case.

4. The product order fulfillment system of claim 1, wherein each customer order is of at least one of the mixed product units.

5. The product order fulfillment system of claim 1, wherein the at least one transport channel is independent of each other of the more than one transport channel so that output of product units from the at least one transport channel is orthogonal to output from each other transport channel.

6. The product order fulfillment system of claim 1, wherein at least one of resolution and allocation of product group sets optimizes transport of product units with the asynchronous transport system per customer order.

7. The product order fulfillment system of claim 1, wherein the at least one asynchronous transport system comprises autonomous guided autonomous bots asynchronously traversing the at least one elevated storage level.

8. The product order fulfillment system of claim 7, wherein each autonomous guided autonomous bot is configured to transport one case of product units of common kind.

9. The product order fulfillment system of claim 7, wherein at least one of resolution and allocation of product group sets minimizes bot transport of cases of product units per customer order.

10. The product order fulfillment system of claim 1, wherein the at least one transport channel is connected with the at least one elevated storage level separate and distinct from each other transport channel.

11. The product order fulfillment system of claim 1, wherein the at least one transport channel is connected with a corresponding one or more of the at least one elevated storage level that are different than elevated storage levels of the storage array connected to and corresponding to each other transport channel.

12. The product order fulfillment system of claim 1, wherein the controller is programmed with store rules defining product groups and mergeability of product groups to each other.

13. A method for fulfilling product orders of mixed product units, the method comprising:

inputting and distributing mixed product units in a storage array of a product order fulfillment system, the storage array having at least one elevated storage level and the mixed product units are input and distributed in the storage array in cases, of product units of common kind per case;

automatically retrieving and outputting, with an automated transport system of the product order fulfillment system, from the storage array, product units distributed in the cases in the at least one elevated storage level of the storage array, the output product units being one or more of mixed singulated product units, in mixed packed groups, or in mixed cases, where the automated transport system is communicably connected to the storage array and has at least one asynchronous transport system, for level transport, and a lift for between level transport where:

the at least one asynchronous transport system, and the lift are configured so as to form more than one transport channel, at least one of which is separate and distinct from another transport channel, each transport channel being communicably connected with the at least one elevated storage level and the output, and the at least one transport channel effects orthogonal transport output, relative to each other transport channel, of the product units distributed in the storage array; and registering, with a controller communicably connected to the more than one transport channels, customer orders of product units and describing each order in one or more product groups of product units, each product group having a unique predetermined product group characteristic characterizing the product group and relates the product groups to each other;

heuristically resolving, with the controller, based on the product group characteristic, the product groups of more than one order, to product group sets, each product group set being of a number of product groups, and orthogonal to each other product group set, and having a maximum number of mergeable product groups; and allocating, with the controller, each resolved product group set to the at least one transport channel for retrieval and output, via the at least one transport channel, of product units forming the product group set into order containers of mixed product units, wherein the product group set is allocated so as not to exceed a predetermined threshold of product units transported via the at least one transport channel;

wherein the controller effects dynamic resolution of the product group sets based on at least, a quantity of allocated product group sets relative to the predetermined threshold of product units transported via the at least one transport channel, and quantities respectively of other allocated product groups sets relative to a respective threshold of each other transport channel.

14. The method of claim 13, wherein the controller effects dynamic allocation of the product group sets to the at least one transport channel and balances allocated product group sets to the at least one transport channel with other allocated product group sets allocated to each other transport channel.

15. The method of claim 13, wherein the customer orders are of mixed product units, each unit of which being stored, in the storage array, in cases of product units of common kind per case.

16. The method of claim 13, wherein each customer order is of at least one of the mixed product units.

17. The method of claim 13, wherein the at least one transport channel is independent of each other of the more than one transport channel so that output of product units from the at least one transport channel is orthogonal to output from each other transport channel.

18. The method of claim 13, wherein at least one of resolution and allocation of product group sets optimizes transport of product units with the asynchronous transport system per customer order.

19. The method of claim 13, wherein the at least one asynchronous transport system comprises autonomous guided autonomous bots asynchronously traversing the at least one elevated storage level.

20. The method of claim 19, wherein each autonomous guided autonomous bot is configured to transport one case of product units of common kind.

21. The method of claim 19, wherein at least one of resolution and allocation of product group sets minimizes bot transport of cases of product units per customer order.

22. The method of claim 13, wherein the at least one transport channel is connected with the at least one elevated storage level separate and distinct from each other transport channel.

23. The method of claim 13, wherein the at least one transport channel is connected with a corresponding one or more of the at least one elevated storage level that are different than elevated storage levels of the storage array connected to and corresponding to each other transport channel.

24. The method of claim 13, wherein the controller is programmed with store rules defining product groups and mergeability of product groups to each other.

* * * * *